US007657584B2

(12) United States Patent
Kawamura et al.

(10) Patent No.: US 7,657,584 B2
(45) Date of Patent: Feb. 2, 2010

(54) REORGANIZATION METHOD OF DATABASE AND A DATABASE REORGANIZATION SYSTEM

(75) Inventors: Nobuo Kawamura, Atsugi (JP); Masaru Kitsuregawa, Tokyo (JP); Kazuo Goda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 336 days.

(21) Appl. No.: 11/257,328

(22) Filed: Oct. 25, 2005

(65) Prior Publication Data
US 2007/0016582 A1 Jan. 18, 2007

(30) Foreign Application Priority Data
Jul. 15, 2005 (JP) ............... 2005-206999

(51) Int. Cl.
G06F 17/30 (2006.01)
G06F 17/00 (2006.01)
(52) U.S. Cl. ............... 707/205; 711/111; 711/112; 711/173
(58) Field of Classification Search ................. 707/200, 707/205
See application file for complete search history.

(56) References Cited

U.S. PATENT DOCUMENTS

| 5,956,745 | A * | 9/1999 | Bradford et al. ............ 711/137 |
| 6,411,964 | B1 * | 6/2002 | Iyer et al. ................... 707/200 |
| 6,535,893 | B1 * | 3/2003 | Friske et al. ................ 707/204 |
| 6,584,474 | B1 * | 6/2003 | Pereira ........................ 707/200 |
| 6,606,631 | B1 * | 8/2003 | Martin et al. ................ 707/101 |
| 6,748,379 | B2 * | 6/2004 | Martin, Jr. ..................... 707/7 |
| 6,934,725 | B1 * | 8/2005 | Dings .......................... 707/204 |
| 7,225,206 | B2 * | 5/2007 | Isip, Jr. ....................... 707/202 |
| 2002/0143763 | A1 * | 10/2002 | Martin et al. ................... 707/7 |
| 2004/0078519 | A1 * | 4/2004 | Bak et al. ..................... 711/114 |

OTHER PUBLICATIONS

Maruyama K. et al. Optimal reorganizaion of distrubuted space disk files, Nov. 1976, ACM, vol. 19 No. 11, pp. 634-642.*
"Online Database Reorganization Function", issued by Hitachi, Ltd., searched on Apr. 10, 2005, on the Internet, URL:http://www.hitachi.co.jp/Prod/comp/soft1/4vsp/products/dbt.html. (1 page).
"IBS Parallel Reorganization", issued by IBM, searched on Apr. 10, 2005, on the Internet, URL:http://www-6.ibm.com/jp/domino02/NewAIS/aisextr.nsf/ByLetterNo/DBA04099?OpenDocument &ExpandSection=1>. (10 pages).

* cited by examiner

*Primary Examiner*—James Trujillo
*Assistant Examiner*—Dawaune Conyers
(74) *Attorney, Agent, or Firm*—Antonelli, Terry, Stout & Kraus, LLP.

(57) ABSTRACT

Provided is a storage system in which a transaction of a database is quiesced, a pair of a first volume and a second volume is split so as to make settings to allow an access to be made only to the database in the first volume, the transaction is then released from the quiescent state, a sparse space is specified in the database stored in the second volume, only the specified sparse space in the second volume is partially reorganized, and the contents of the partially reorganized second volume are copied to the first volume such that the first volume and the second volume are resynchronized with each other to form the pair again.

8 Claims, 40 Drawing Sheets

| DATABASE AREA ID | TYPE | FILE ID | BLOCK LENGTH | LOGICAL VOLUME ID | PHYSICAL DEVICE ID (LUN) | RELATIVE LOCATION (LBA) |
|---|---|---|---|---|---|---|
| | DB | | | | | |
| | DB | | | | | |
| | LOG | | | | | |
| | LOG | | | | | |

DATABASE-DISK BLOCK CONVERSION TABLE225

FIG.4

| PHYSICAL ADDRESS LBN | 0 | 1 | 2 | 3 | 4 | 5 | 6 | ... |
|---|---|---|---|---|---|---|---|---|
| LOGICAL ADDRESS i | | 3 | 4 | 1 | | 2 | 0 | |

FIG.16

REORGANIZATION METHOD OF DATABASE AND A DATABASE REORGANIZATION SYSTEM

CLAIM OF PRIORITY

The present application claims priority from Japanese application P2005-206999 filed on Jul. 15, 2005, the content of which is hereby incorporated by reference into this application.

BACKGROUND

This invention relates to a storage system for operating a database, in particular, a reorganization method of a database.

Conventionally, a database management system (DBMS) for managing a database is designed to increase database responsiveness. A storage area of a storage system or the like is designed such that a storage area of a database is not changed frequently, so as to avoid complex management as much as possible. Therefore, in the storage area of a database, "fragment" is gradually caused with the elapse of operating time. The term "fragment" means generation of a fragmented space, an uncollected area, or imbalance in a space management structure. The fragment in the storage area degrades database responsiveness (I/O performance or search performance) leading to an inducement for unexpected use of the storage area.

In order to eliminate the fragment in the storage area, DBMS is generally provided with dedicated software. The software eliminates the fragmentation, collects the uncollected area, and balances the space management structure on the storage area of the database, so as to change the storage area into an ideal state without any fragment. This processing is called "reorganization".

An administrator of the DBMS is required to regularly implement the reorganization using reorganization software so as to eliminate the degradation of database responsiveness and the unexpected use of the storage area.

As regards such reorganization, there has been known a storage system, for example, in which data in a reorganization source is transferred to a reorganization destination storage system so as to reorganize a database in the reorganization destination. After the data has been reorganized in the reorganization destination, update occurred in the reorganization source during the reorganization is applied to the reorganization destination so as to switch the data to be used by the DBMS to the reorganization destination (for example, "Online database reorganization function", issued by Hitachi Ltd., searched on Apr. 10, 2005, on the Internet, which can be located with the listing hitachi.co.jp/Prod/comp/soft1/4vsp/products/dbr.html>).

Moreover, the amount of data has been increasing in databases in recent years. Accordingly, the reorganization of all data needs a long processing time. Therefore, there has been known a storage system in which reorganization is implemented only for the data in a storage area designated by an administrator or the like (for example, "IBS Parallel Reorganization", issued by IBM, searched on Apr. 10, 2005, on the Internet under the listing of 6.ibm.com/jp/domino02/NewAIS/aisextr.nsf/ByLetterNO/DBA04099?OpenDocument&ExpandSection=1>). In other words, data is divided to be stored into a plurality of storage areas, and only the data in a storage area designated by an administrator or the like is reorganized.

SUMMARY

Of the aforementioned conventional techniques, in the latter case, the processing time can be reduced as compared with the case where the entire database is reorganized. However, it is difficult for an administrator to determine the storage area in which the fragment requiring reorganization is actually caused among a plurality of storage areas storing the database. Therefore, even if the reorganization is implemented in the storage area designated by the administrator, there is a problem in that an improvement of database responsiveness and a reduction of use of the storage area cannot be efficiently realized.

In view of the above-mentioned problems, this invention has been made, and has an object to efficiently reorganize a database in a short time.

This invention provides a reorganization method of a database stored in a disk drive controlled by a computer, the disk drive including: a first volume that stores the database; and a second volume that forms a pair with the first volume to store a replication of the database, the method including: quiescing a transaction of the database by the computer; splitting the pair formed of the first volume and the second volume, and making settings to allow an access only to the database stored in the first volume; releasing the transaction from the quiescent state; specifying a sparse space in the database in the second volume; partially reorganizing only the specified sparse space in the second volume; and copying the contents of the partially reorganized second volume to the first volume such that the first volume and the second volume are resynchronized and form the pair again.

Accordingly, this invention optimizes a database in a remarkably short time as compared with total reorganization, thereby making it possible to improve database responsiveness and to efficiently reduce the use of a storage area. In particular, this invention can be applied to a resent large-scale database to implement partial reorganization without stopping a database from being operated, to thereby efficiently reorganize the database in a short time. As a result, degradation of database performance can be securely prevented. Moreover, since an administrator is not required to determine an area (or a range) to be reorganized, an amount of effort required for database operation can be remarkably reduced.

BRIEF DESCRIPTION OF THE DRAWINGS

FIG. 4 is an explanatory view showing an example of a database-disk block conversion table according to the first embodiment of this invention.

FIG. 16 is an explanatory view showing a relation between a logical address i and an LBN according to the first embodiment of this invention.

DETAILED DESCRIPTION OF THE PREFERRED EMBODIMENTS

First Embodiment

Hereinafter, an embodiment of this invention will be described with reference to the accompanying drawings.

Figure 1:
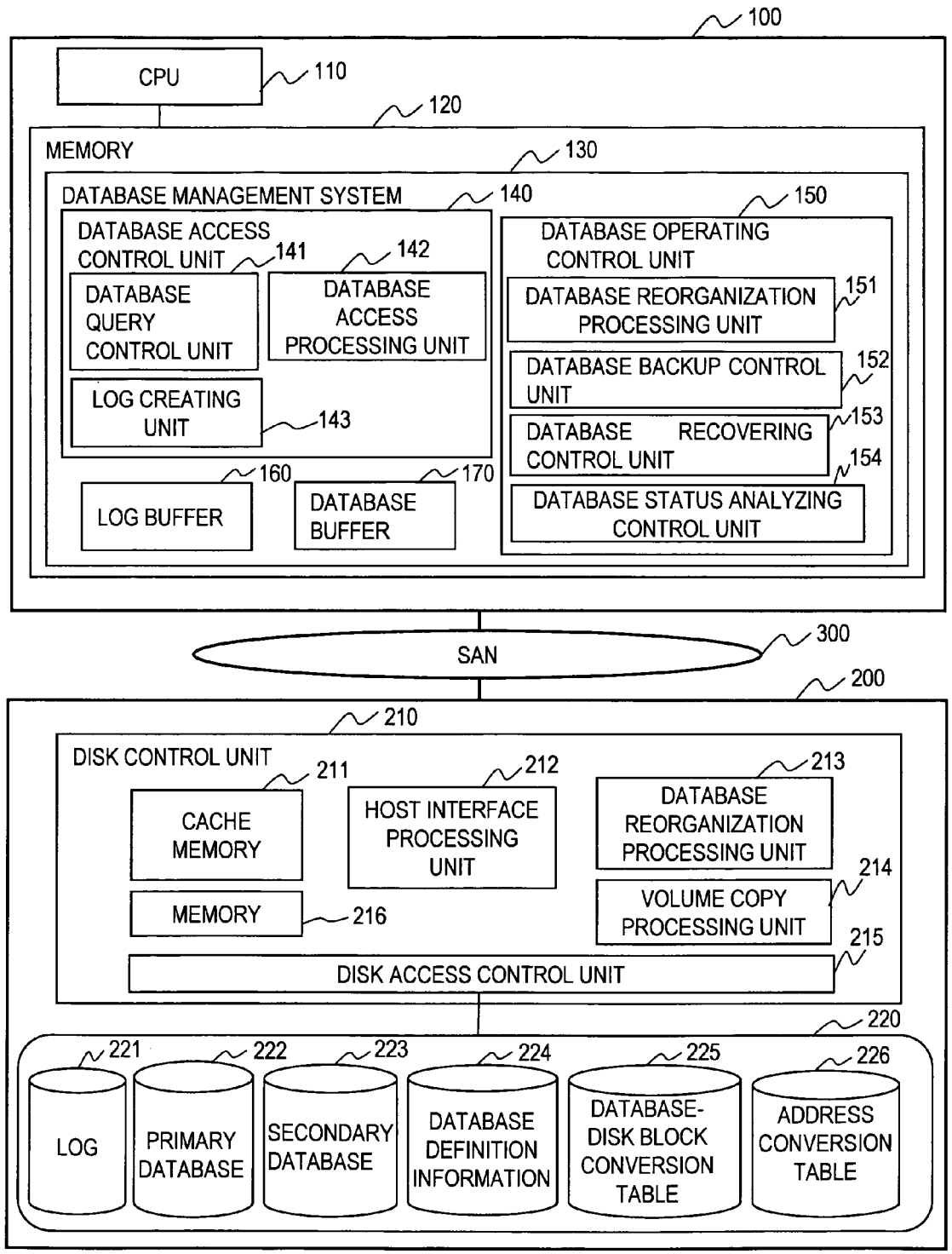
FIG. 1 is a block diagram of a database system according to a first embodiment of this invention.

FIG. 1 is a block diagram showing a database system showing a first embodiment of this invention.

A host computer 100 is connected to a storage system 200 through a storage area network (SAN) 300.

The host computer 100 makes a request for operation of data in the storage system 200 through the SAN 300. The storage system 200 returns the result of the operation request to the host computer 100. The connection between the host computer 100 and the storage system 200 is not limited to that through the SAN 300. Any connection may be used as long as a network function between the host computer 100 and the storage system 200 is realized.

The host computer 100 includes a CPU 110 and a memory 120. The CPU 110 executes various programs to control the host computer 100. The memory 120 stores a database management system 130. The database management system 130 is constituted by a program. The execution of the program by the CUP 110 allows the host computer 100 to function as the database management system 130.

The database management system 130 is not necessarily constituted by software. For example, the database management system 130 may be realized by an object or a hardware configuration. Moreover, the host computer 100 may be a virtual computer.

The database management system 130 includes a database access control unit 140, a database operating control unit 150, a log buffer 160, and a database buffer 170.

The database access control unit 140 reflects contents of a database stored in the database buffer 170 as data of a disk drive 220 in the storage system 200. At this time, when the contents in the database buffer 170 are updated, a log creating unit 143 described below stores the updated contents as log information in the log buffer 160. The stored log information is reflected in a log area 221 of the disk drive 220 in the storage system 200.

The database access control unit 140 includes a database query control unit 141, a database access control unit 142, and the log creating unit 143. The database query control unit 141 refers to a table space (indices) of the database so as to obtain a storage location of the database. The database access processing unit 142 writes the data to the database or reads the data from the database. The log creating unit 143 causes the storage system 200 to store a log indicating the contents of update of a database processing.

The database operating control unit 150 instructs the storage system 200 to execute a processing for database operation. More specifically, the database operating control unit 150 instructs the execution of database backup or a reorganization processing.

The database operating control unit 150 includes a database reorganization processing unit 151, a database backup control unit 152, a database recovering control unit 153, and a database status analyzing control unit 154.

The database reorganization processing unit 151 instructs the storage system 200 to execute a reorganization processing for eliminating a fragment or imbalance in the database space.

The database backup control unit 152 instructs the storage system 200 to execute a database backup creating processing.

The database recovering control unit 153 controls the recovery of the database.

The database status analyzing control unit 154 inquires of the storage system 200 for a database status so as to analyze the database status. For example, the database status analyzing control unit 154 analyzes a state of fragment or imbalance in the database space.

The storage system 200 includes a disk control unit 210 and the disk drive 220.

The disk control unit 210 controls the write and read of data to and from the disk drive 220.

The disk control unit 210 includes a cache memory 211, a host interface processing unit 212, a database reorganization processing unit 213, a volume copy processing unit 214, and a disk access control unit 215.

The cache memory 211 temporarily stores the data written to or read from the disk drive 220.

The host interface processing unit 212 analyzes a request sent from the host computer 100 and sends the request to other processing units in the disk control unit 210. The host interface processing unit 212 also returns the result received from other processing units in the disk control unit 210 to the host computer 100.

The database reorganization processing unit 213 executes a reorganization processing for eliminating the fragment or imbalance in the database space occurred in the disk drive 220.

The volume copy processing unit 214 controls the copy between volumes of the disk drive 220, synchronization between volumes, a cancellation of synchronization between volumes, and the like.

The disk access control unit 215 accesses the disk drive 220 based on a protocol such as SCSI or Fiber Channel.

The disk drive 220 includes at least one magnetic disk drive.

In the plurality of magnetic disk drives, a logical area is formed by a RAID configuration or the like. The logical area is logically divided into a plurality of areas (LU: logical units or logical volumes). The logical volume serving as an area for storing data is composed of at least one logical unit.

Each of the processing units and control units in this embodiment may be realized by an object, a program, a process, a thread, or the like, and may also be realized by a hardware configuration.

The disk drive 220 includes a plurality of data storage areas such as the log 221, a primary database 222, a secondary database 223, database definition information 224, a database-disk block conversion table 225, and an address conversion table 226. The disk drive 220 of this invention is not limited to a hard disk 226. Any disk drive can be used as long as it has a data storing function.

The log area 221 stores a differential log (log information) in the database processing.

The primary database 222 stores a database accessed by the host computer 100.

The secondary database 223 stores a replication of the primary database 222. During operation, the primary database 222 and the secondary database 223 are synchronized with each other. Specifically, data written from the host computer 100 to the primary database 222 is also written to the secondary database 223. When the primary database 222 and the secondary database 223 are synchronized with each other, the contents in the primary database 222 and those in the secondary database 223 are identical with each other.

The database definition information 224 stores configuration information on the database stored in the disk drive 220. The configuration information on the database includes, for example, a database name, data in each database and an index schema, and statistical information.

The database-disk block conversion table 225 stores a correlation between each data in the database and a physical location where the data is stored.

The address conversion table 226 is used for a database reorganization processing and a catching-up processing that follows the database reorganization processing. When the physical storage location of the data on the disk drive is changed between before and after the reorganization processing, the physical locations before and after the reorganization processing are stored in the address conversion table 226.

The address conversion table 226 may store a predetermined area on the memory 216 instead of a predetermined area on the disk drive 220.

Next, a configuration of the database stored in the disk drive 220 will be described.

The data to be stored in the disk drive 220 is mainly composed of "table data" corresponding to a main part of the database and "index data" used for searching or listing the table data.

Figure 2:
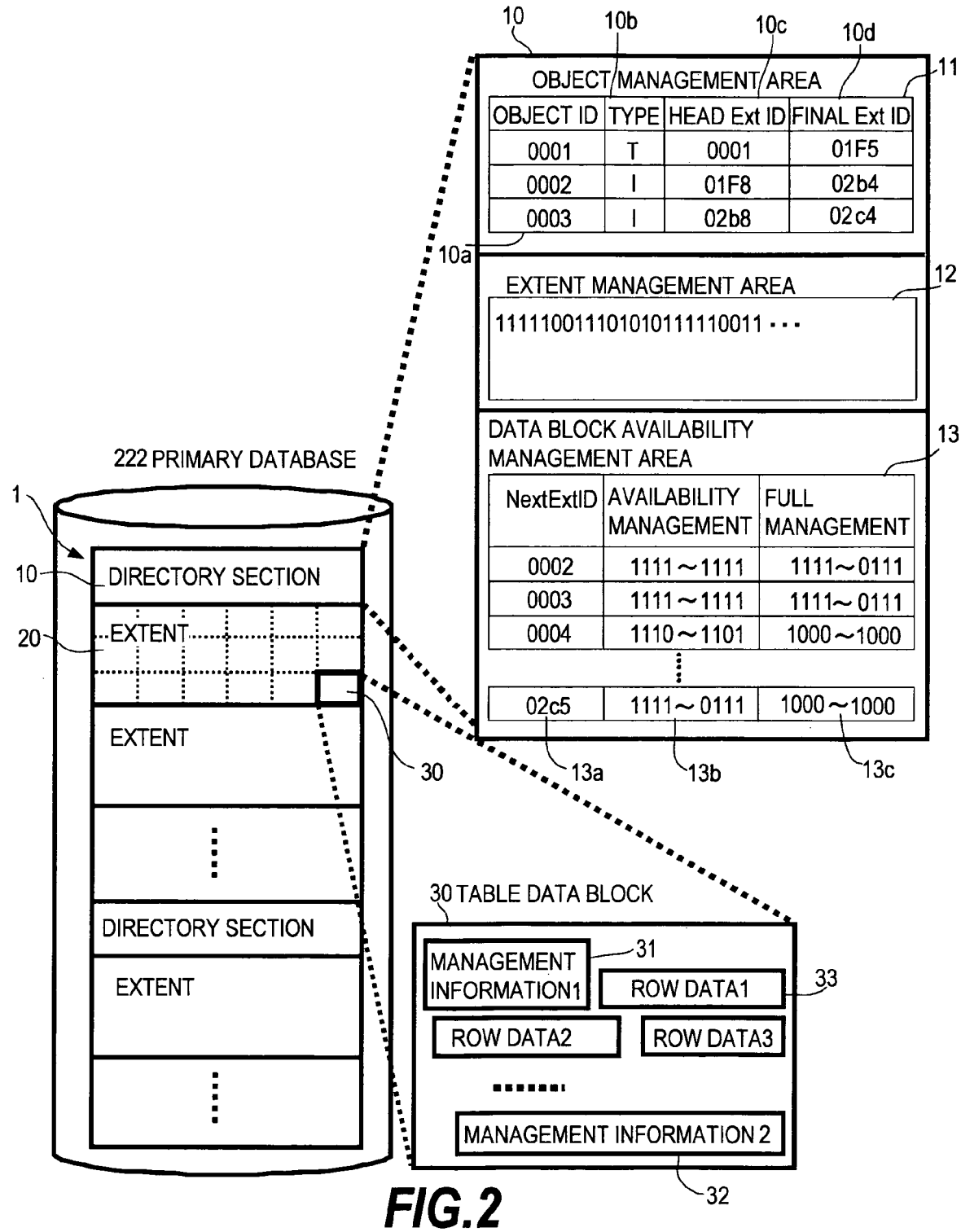
FIG. 2 is an explanatory view of table data according to the first embodiment of this invention.

FIG. 2 is an explanatory view showing an example of a data area 1 in the primary database 222.

The data area 1 in the primary database 222 is composed of a plurality of extents (segments) 20. Table data (table) or index data (index) is stored from one or a plurality of extents 20.

The table data is composed of a plurality of table data blocks (pages) 30 in the plurality of extents 20 starting from a directory section 10. The plurality of table data blocks 30 forms a file. Each of the table data blocks 30 contains row data corresponding to a minimum unit constituting the table data. A structure of the file is stored in the database-disk block conversion table 225 described below as shown in FIG. 4.

In the example shown in FIG. 2, the plurality of extents 20 is arranged in a row headed by the directory section 10 that stores management information of the extents 20 and the like. One extent 20 is composed of the plurality of table data blocks 30. In the example shown in FIG. 2, eighteen table data blocks 30 form one extent 20. For example, one table data is composed of the plurality of extents 20 with the directory section 10 as a header. It is only necessary that the extents 20 and the table data blocks 30 are arranged so as to be logically continuous on the primary database 222. The table data block 30 also stores an index or the like.

The directory section 10 arranged as the header of the table data includes an object management area 11 that manages objects stored in the plurality of extents 20 following the directory section 10, an extent management area 12 for managing a status of use of each of the extents 20, and a data block availability management area 13 for managing a status of use of the data blocks 30 in the extent 20.

The object management area 11 has an object ID 10a for storing an identifier of the object stored in the extent 20; a type 10b indicating type of object; a head extent ID 10c for storing a head extent ID of the plurality of extents 20 storing the object; and a final extent ID 10d storing the final extent ID of the plurality of extents 20 storing the object, which are set for each of the entries. As the object type 10b, for example, "T" indicates table data (table) and "I" indicates an index.

The example shown in FIG. 2 shows the case where one table data (the object ID=0001) and two indices (the object IDs=0002 and 0003) are managed in the areas with the extent IDs=0001 to 2c4 in the directory section 10. The object ID, the type, and the extent ID are provided by the database management system 140.

Next, the extent management area 12 consists of a bit map showing whether each of the extents 20 is in use or not for the head extent 20 (with the smallest extent ID) through the final extent 20 (with the largest extent ID) managed by the object management area 11. The extent 20 denoted by reference numeral "1" in FIG. 2 is in use, while the extent 20 denoted by the reference numeral "0" is not in use. In the illustrated example, the first to fifth extents 20 are in use, and the sixth and seventh extents 20 are not in use. The bit map is set by the database status analyzing unit 154 of the database operating control unit 150 in predetermined cycles or the like.

Next, the data block availability management area 13 indicates a status of use and full information on the bit map for each of the table data blocks 30 in each extent 20. As each entry, provided are a next extent ID 13a storing a next extent ID following its own extent 20, an availability management 13b indicating whether the area of each of the table data blocks 30 in the extent 20 is in use or not on the bit map, and a full management 13c indicating a status of an amount of data of each of the table data blocks 30 on the bit map.

In the availability management 13b, "1" indicates that the table data block 30 is in use, and "0" indicates that it is not in use. Since one extent 20 is composed of eighteen table data blocks 30 in this example, the availability management 13b of one extent 20 is represented by 18 bits. When the full management 13c is "1", the table data block 30 corresponding to the bit is full of data. When the full management 13c is "0", there still remains a free area to which data can be added. The full management 13c for one extent 20 is represented by 18 bits. Therefore, a 2-bit map shows use/unuse and data addition possibility/impossibility for a single table data block 30.

As described above, the directory section 10 manages the presence and absence of a free area in the data area 1 by the object management area 11, the extent management area 12, and the data block availability management area 13. As described below, the database reorganization processing unit 213 reads the directory section 10, to thereby determine the density of the space of the data area 1.

Next, in the table data blocks 30 forming the extent 20 corresponding to a unit area for reorganization, management information 1 (31) is set at the head of each of the table data blocks 30, and management information 2 (32) is set at the end. A plurality of the row data 33 are arranged between the management information 1 and 2.

Each of the management information 1 and 2 has an area for storing the date of data update. The date of the management information 1 and the date of the management information 2 are compared with each other to confirm consistency of the data.

The management information 2 stores positional information (for example, a logical address i) indicating the location of the table data block 30 on the primary database 222.

Figure 3:
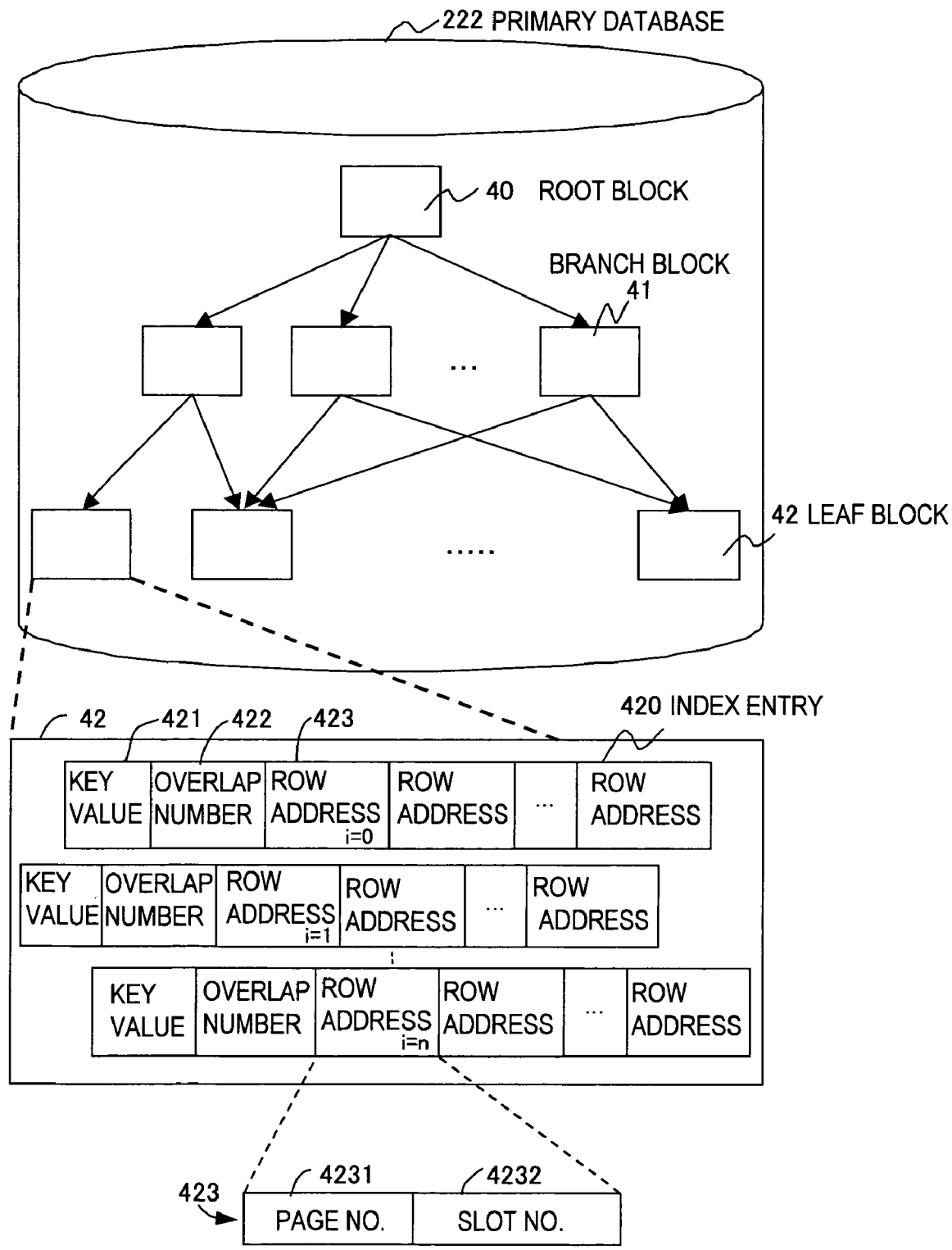
FIG. 3 is an explanatory view of index data according to the first embodiment of this invention.

FIG. 3 is an explanatory view showing an example of index data stored in the extent 20.

The index data is composed of the assembly of blocks. These blocks have a tree structure.

The tree structure includes a root block 40, branch blocks 41, and leaf blocks 42. The root block 40 stores addresses of the branch blocks 41. The branch block 41 stores addresses of the leaf blocks 42 as a reference target. The leaf block 42 stores an index entry 420. The index entry 420 of the leaf block 42 is composed of a key value 421, an overlap number 422, and a row address 423. As the key value 421, a search key for searching data in the database is stored. In each block, the key values 421 are arranged in a predetermined order (for example, in an ascending order). As the overlap number 422, information indicating the number of overlaps in the reference target. As the row address 423, an address indicating a destination to which storage of the row data constituting the table data is stored. The row address 423 is composed of a page number 4231 indicating a logical address on the LU and a slot number 4232 indicating an amount of offset from the page number 4231. The row addresses 423 corresponding to the respective key values 421 are arranged in a row. On the other hand, the arrangement between the key values 421 becomes sometimes discontinuous on the LU by insertion or deletion of the data.

By referring to the address conversion table 226, logical block number (LBN) indicating a physical location on the LU (the primary database 222 or the secondary database 223) can be referred to as the logical address i of the page number 4231. The result obtained by multiplying the LBN by a block size of the LU (for example, 16 KB) corresponds to a logical block address (LBA) indicating a physical storage location of the data block on the LU. The slot number 4232 indicates an amount of offset from the LBA indicated by the address of the page number 4231 so as to designate an actual location of the row data.

The database management system 130 searches the index data by using the search key to obtain the row address of the table data. Then, the database management system 130 uses the obtained row address to access the table data.

FIG. 4 is an exemplary table of the database-disk block conversion table 225.

The database-disk block conversion table 225 is composed of a database area ID 2251, a type 2252, a file ID 2253, a block length 2254, a logical volume ID 2255, a physical device ID 2256, and a relative location 2257.

The database area ID 2251 is a unique identifier assigned to each database area storing the database.

The type 2252 indicates the type of the database stored in the database area. As the type, information such as a DB (indicating a database) and a log is stored.

The file ID 2253 is a unique identifier assigned to each file when the database area stored in the database area ID 2251 is composed of a plurality of files.

The block length 2254 indicates a length (size) of a table data block constituting the database area.

The logical volume ID 2255 is an identifier for identifying a logical volume of the database area ID 2251 in which a configuration file is stored.

The physical device ID 2256 is an identifier for identifying a physical device to which the logical volume (LU) identified by the logical volume ID is mapped. More specifically, the identifier is an LUN (Logical Unit Number) individually assigned to each of the LUs.

The relative location 2257 indicates the area in the LU where the file is stored, by the relative location of the LU. More specifically, an LBA (Logical Block Address) is stored.

The file constituting the database in this embodiment is mapped to the logical volume as a file system recognized by an operating system (OS) running in the host computer 100. The logical volume is mapped as a device file corresponding to the disk drive 220 serving as a physical device of the storage system 200.

In the storage system 200, the device file corresponds to the LU. Therefore, the files constituting the database area are finally mapped to a magnetic disk drive of the disk drive serving as a physical device. The corresponding physical information includes a physical device ID for identifying the magnetic disk drive in the storage system 200 and the LBA corresponding to the relative location in the physical device.

Figure 5:
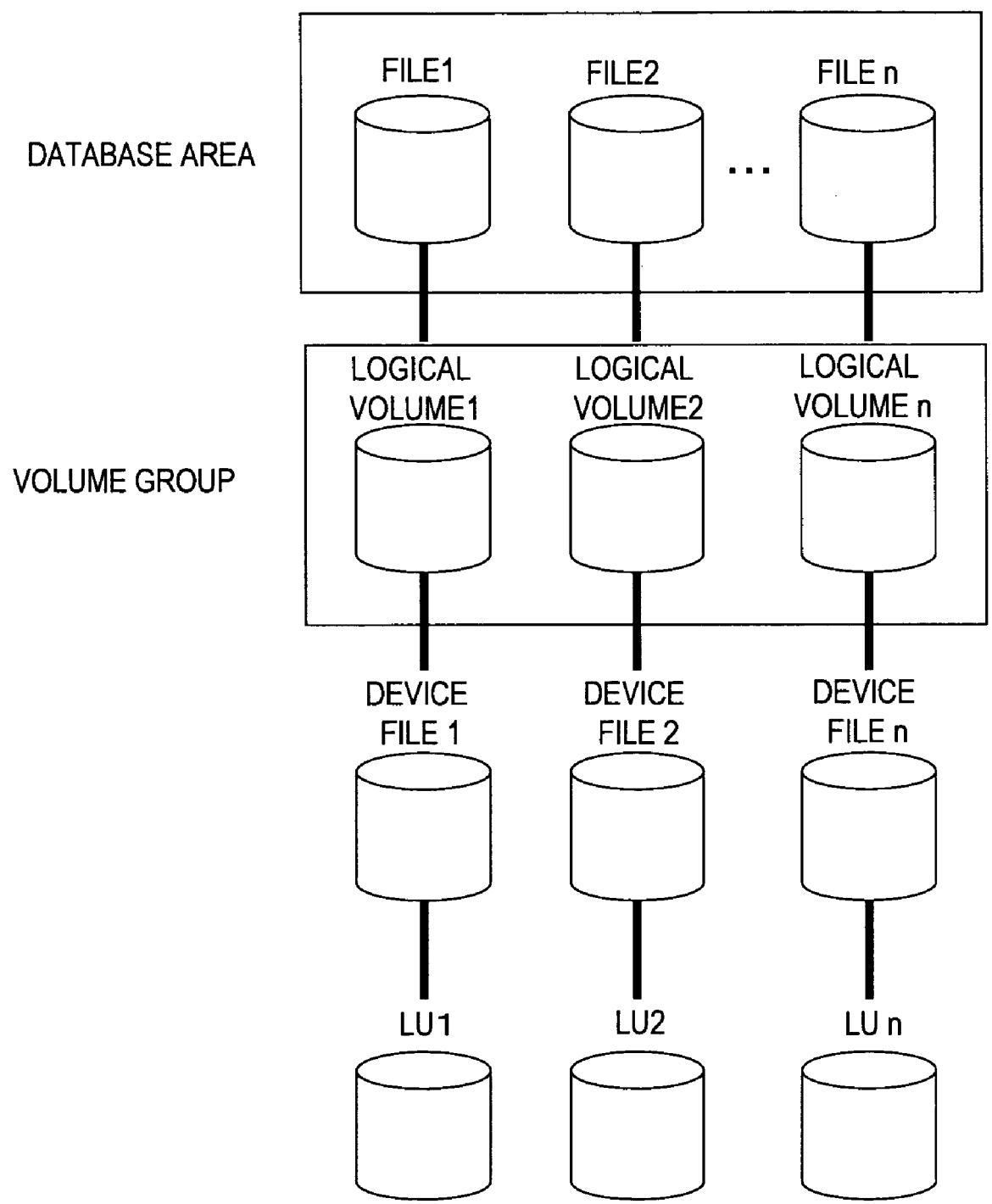
FIG. 5 is an explanatory view showing a relation of LU mapping according to the first embodiment of this invention.

FIG. 5 is an explanatory view showing a relation of mapping.

FIG. 5 shows an example associated with mapping of the database areas recognized by the host computer 100, the logical volumes recognized by the operating system running in the host computer 100, the device files, and the LUs in the storage system 200.

The database management system 130 recognizes the database area storing data as being constituted by a plurality of files. Each of the constituting files corresponds to a file of the operating system running in the host computer 100. In FIG. 5, the case is supposed where the database area is recognized as a RAW device corresponding to a device file in the operating system.

The file of the operating system is managed as a device file corresponding to a physical disk drive. The device file is mapped to the LU in the storage system 200.

Next, processing of the database system in this embodiment will be described.

Figure 6:
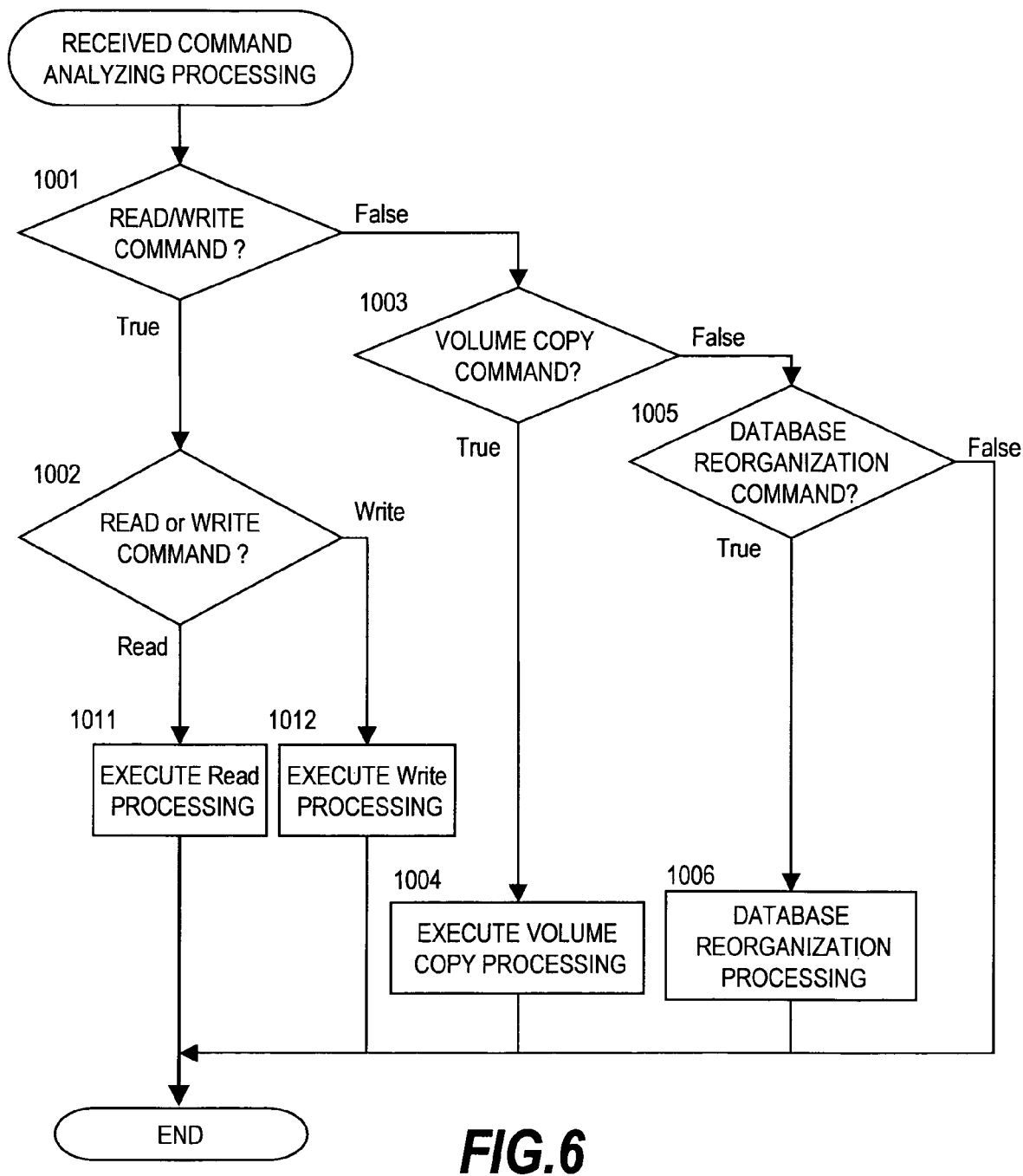
FIG. 6 is a flowchart showing an example of processing performed in a disk control unit of a storage system.

FIG. 6 is a flowchart of a received command analyzing processing of the storage system 200.

The storage system 200 performs the processing based on a request from the host computer 100.

The host interface processing unit 212 receives the request from the host computer 100 and analyzes the contents of the request.

When the request from the host computer 100 is a read request (Read command) or a write request (Write command) (step 1001), the process proceeds to a step 1002. In the step 1002, it is determined whether the request from the host computer 100 is the Read command or the Write command.

Figure 7:
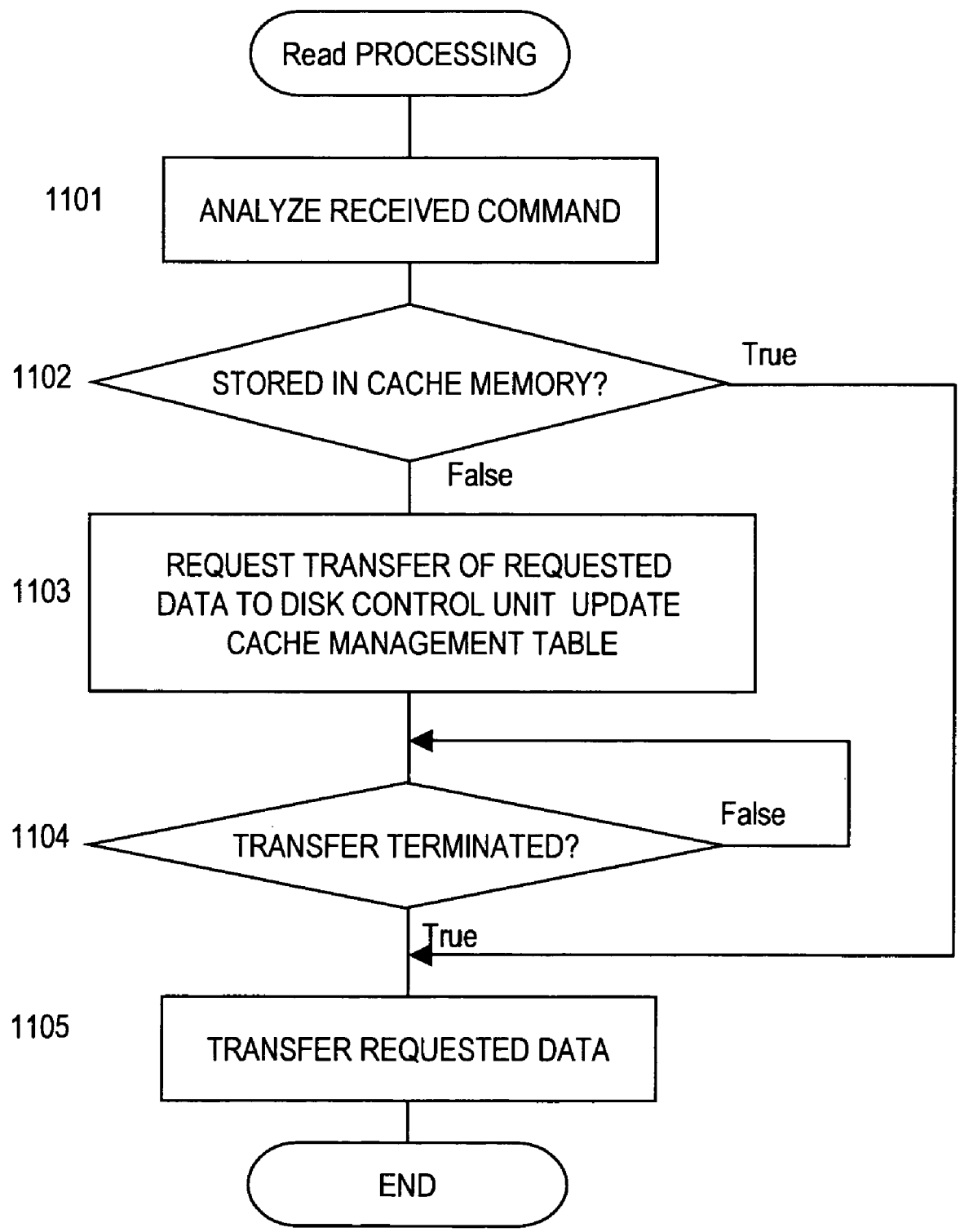
FIG. 7 is a flowchart of a Read processing according to the first embodiment of this invention.
Figure 8:
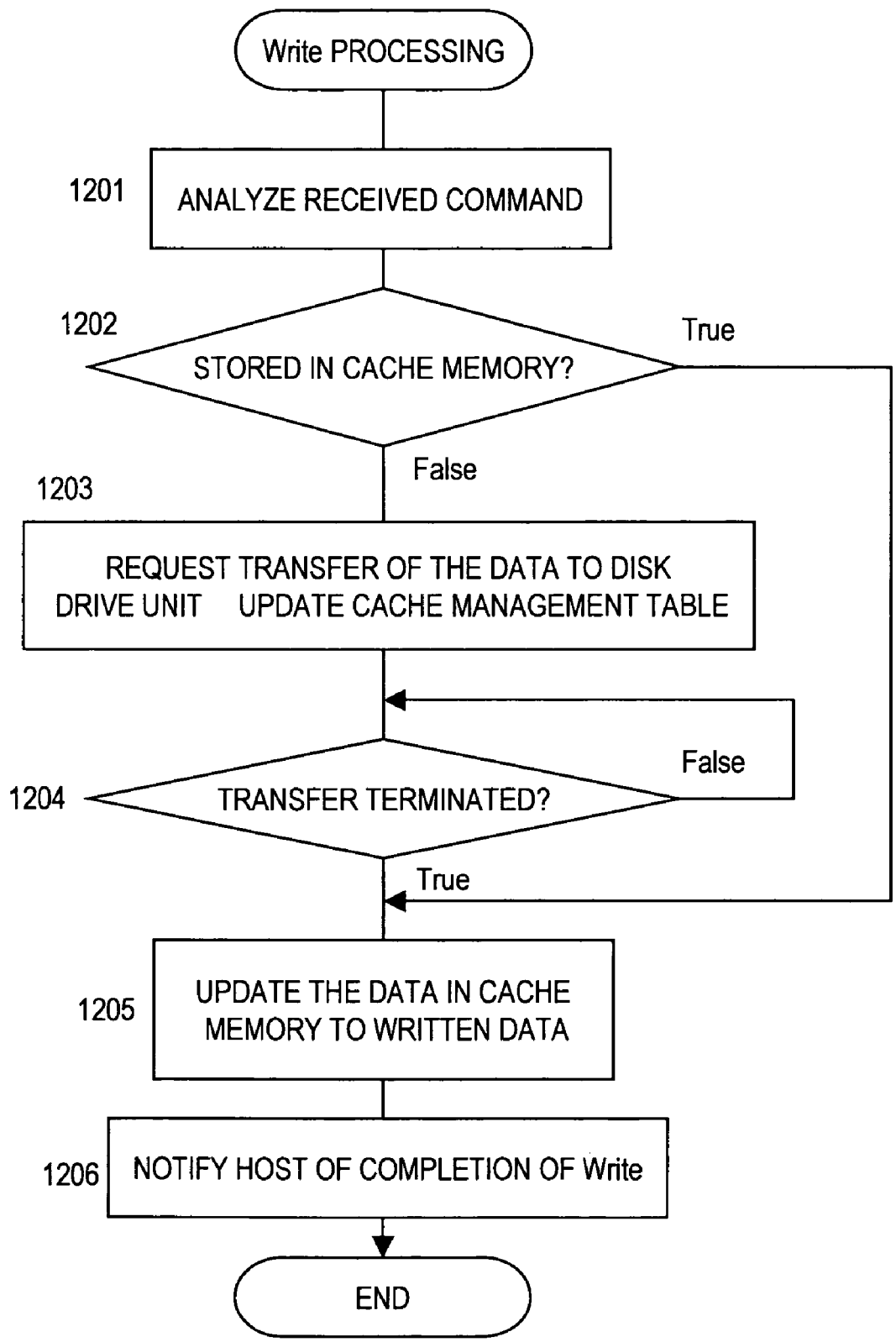
FIG. 8 is a flowchart of a Write processing according to the first embodiment of this invention.

When the request from the host computer 100 is the Read command, a Read processing shown FIG. 7 is executed (step 1011). When the request from the host computer 100 is the Write command, a Write processing shown in FIG. 8 is executed (step 1012).

Figure 9:
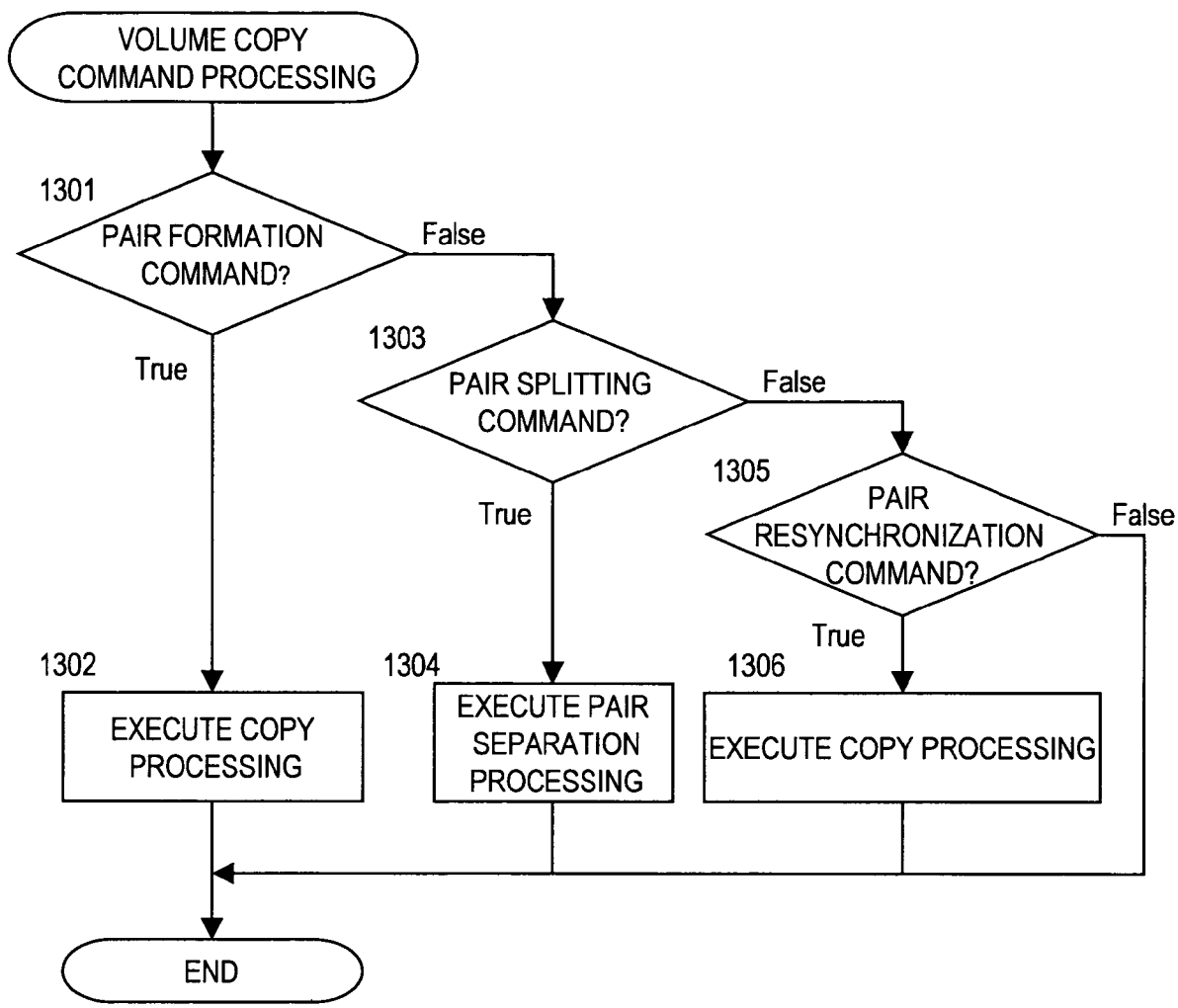
FIG. 9 is a flowchart of a volume copy processing according to the first embodiment of this invention.

When the request from the host computer 100 is a volume copy command (step 1003), a volume copy processing shown in FIG. 9 is executed (step 1004).

Figure 11:
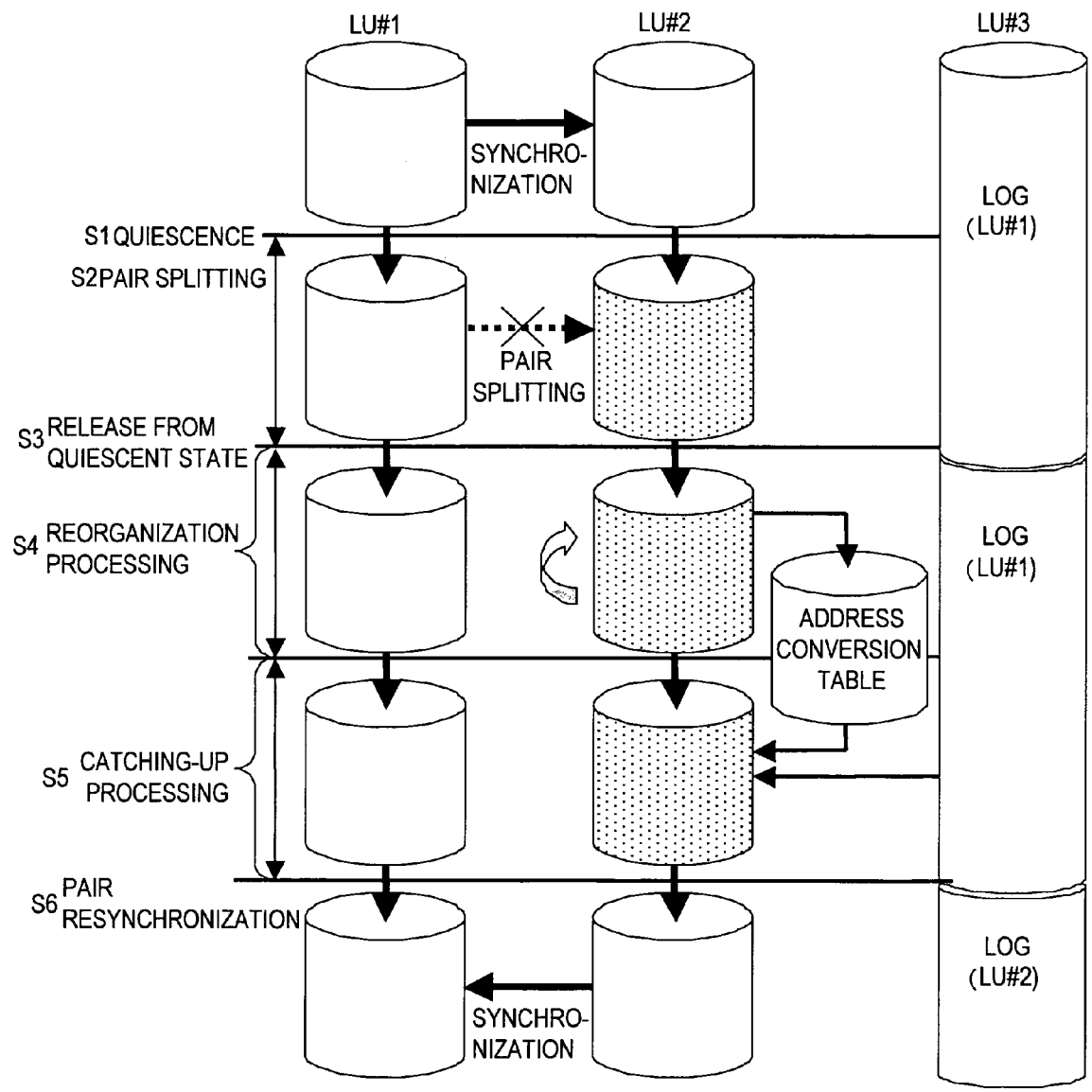
FIG. 11 is an explanatory view of a reorganization processing of a disk drive according to the first embodiment of this invention.

When the request from the host computer 100 is a database reorganization command (a total reorganization command or a partial reorganization command) (step 1005), a database reorganization processing shown in FIG. 11 is executed (step 1006). In this embodiment, an administrator or the like designates the database area (or the data area 1, the table data, or the index data) to be reorganized in the database management system 140, and issues any one of the total reorganization command for total reorganization of the database and the partial reorganization command for partial reorganization of the database to the disk control unit 210.

When the request from the host computer 100 is not any of the above commands, the processing is terminated.

FIG. 7 is a flowchart of the Read processing.

This processing is executed by the host interface processing unit 212.

First, the received command is analyzed to obtain the contents of the received command and an address of the access target (step 1101).

Next, it is determined whether or not data of the obtained address of the access target is stored in the cache memory 211 (step 1102).

When it is determined that the data is stored in the cache memory 211, the process proceeds to a step 1105.

When it is determined that the data is not stored in the cache memory 211, a transfer request for reading the requested data and transferring the read data to the cache memory 211 is sent to the disk access control unit 215 (step 1103). In the step 1103, information indicating update of the data of an address of the destination of transfer in the cache memory 211, to which the transfer request is transferred, is registered in a cache management table provided for the cache memory 211.

In response to the transfer request, the data is transferred from the disk drive 220 to the cache memory 211. Then, it is determined whether or not the data transfer is completed (step 1104).

When it is determined that the data transfer is not completed yet, the host interface processing unit 212 waits until the data transfer is terminated. When it is determined that the data transfer is completed, the process proceeds to a step 1105.

In the step 1105, the requested data stored in the cache memory 211 is transmitted to the host computer 100. Thereafter, the processing is terminated.

By the above-described Read processing, the requested data is transmitted to the host computer 100.

FIG. 8 is a flowchart of a Write processing.

The write processing is executed by the host interface processing unit 212.

First, the received Write command is analyzed so as to obtain the contents of the command, an address of the access target, and the data to be written (step 1201).

Next, it is determined whether or not data already present at the obtained address of the access target is stored in the cache memory 211 (step 1202).

When it is determined that the data is stored in the cache memory 211, the process proceeds to a step 1205.

When it is determined that the data is not stored in the cache memory 211, a transfer request for reading the data present at the address and transferring the read data to the cache memory 211 is sent to the disk access control unit 215 (step 1203). In this step, information indicating update of the data of the address of the destination of transfer in the cache memory 211, to which the data is transferred, is registered in the cache management table provided for the cache memory 211.

In response to the transfer request, the data is transferred from the disk drive 220 to the cache memory 211. Then, it is determined whether or not the data transfer is terminated (step 1204).

When it is determined that the data transfer is not terminated yet, the host interface processing unit 212 waits until the data transfer is terminated. When it is determined that the data transfer is completed, the process proceeds to the step 1205.

In the step 1205, the data stored in the cache memory 211 is updated to written data instructed by the Write command.

When the data update is completed, the process proceeds to a step 1206 where the completion of the Write processing is informed to the host computer 100. Thereafter, the processing is terminated.

FIG. 9 is a flowchart of a volume copy processing.

This processing is executed by the host interface processing unit 212 and the volume copy processing unit 214.

The host interface processing unit 212 receives a request from the host computer 100 to analyze the contents of the request. When the request is a volume copy command, the command is sent to the volume copy processing unit 214. The volume copy command includes a copy processing and a pair separating processing. Any one of the processing is selected.

When the request from the host computer 100 is a pair formation command (step 1301), the volume copy processing unit 214 executes the copy processing (step 1302). Specifically, the contents of the copy source logical volume are entirely copied to a copy destination logical volume. By this processing, the copy source logical volume and the copy destination logical volume are synchronized with each other.

When the request from the host computer 100 is a pair splitting command (step 1303), the volume copy processing unit 214 executes the pair separating processing (step 1304). More specifically, the synchronization between the two logical volumes is cancelled.

When the request from the host computer 100 is a pair resynchronization command (step 1305), the volume copy processing unit 214 executes the volume copy processing (step 1306). This processing is the same as that in the step 1302.

When the request is not any of the above-described commands, the processing is terminated.

Figure 10:
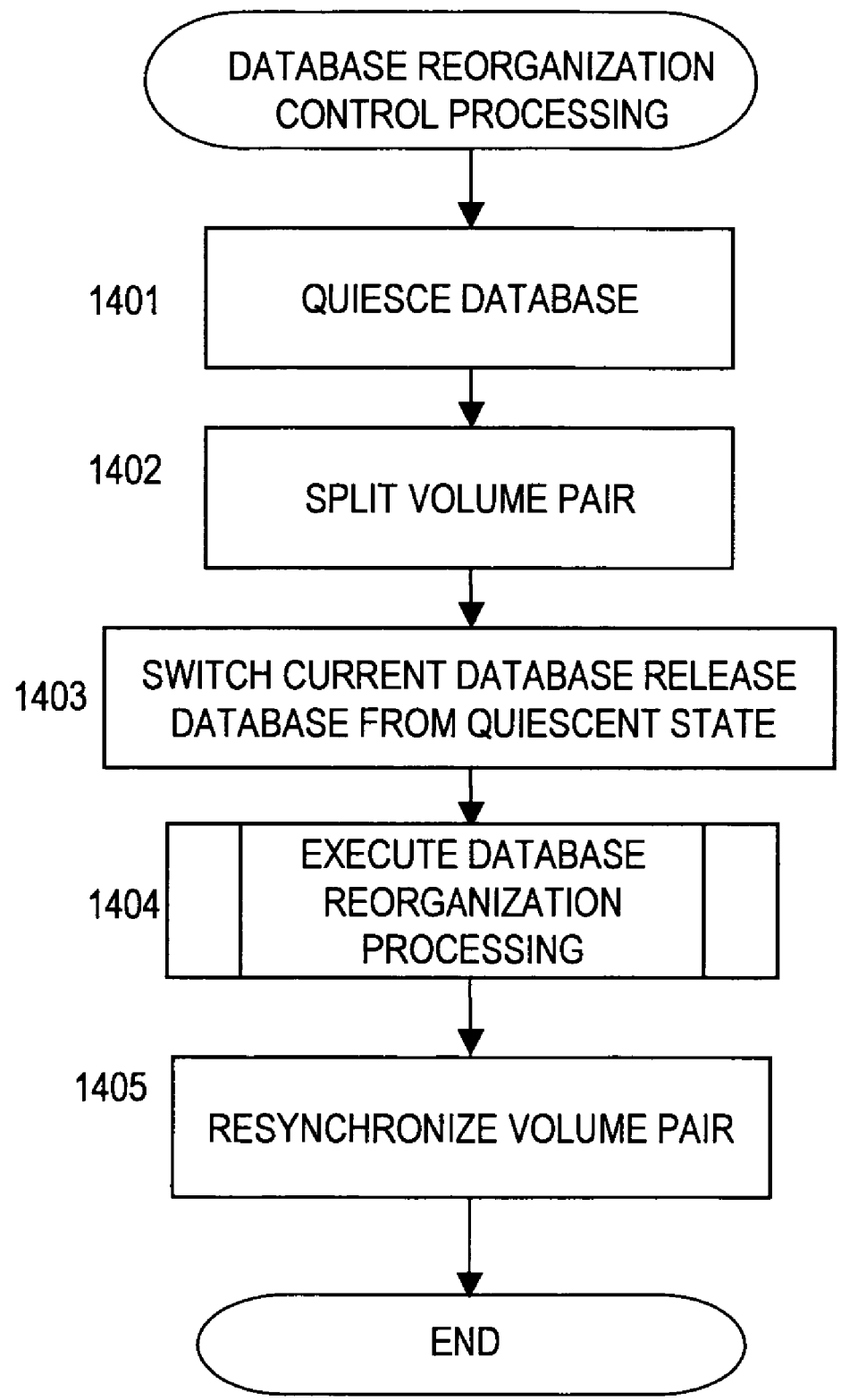
FIG. 10 is a flowchart of a database reorganization control processing according to the first embodiment of this invention.

FIG. 10 is a flowchart of a database reorganization control processing.

This processing is executed by the database reorganization control unit 151 in the host computer 100.

First, when the database reorganization control unit 151 starts the database reorganization control processing, it quiesces the database that is instructed to be reorganized by a command from an administrator or the like (step 1401 and S1 in FIG. 11). More specifically, the database reorganization control unit 151 sends a request of stopping the acceptance of a transaction to the database and completing all the transactions being executed to the database access control unit 140.

Next, a volume pair is split (step 1402 and S2 in FIG. 11). More specifically, the database reorganization control unit 151 sends a pair splitting command to the storage system 200. As a result, the synchronization between the primary database 222 and the secondary database 223 corresponding to the synchronized volume pair is cancelled to split the volume pair.

Next, a volume accepting the processing of the database (a current database) is switched uniquely to the primary database 222. Thereafter, the database is released from the quiescent state (step 1403 and S3 in FIG. 11). More specifically, the database reorganization control unit 151 sends a request of limiting the current database to the primary database 222 to the database access control unit 140. The database reorganization processing unit 151 sends a request of starting the acceptance of a transaction to the database to the database access control unit 140. By this processing, only the primary database 222 becomes a target of access from the host computer 100.

Next, a database reorganization processing shown in FIGS. 11 and 12 described below is implemented (step 1404 and S4 in FIG. 11). More specifically, the database reorganization control unit 151 sends a database reorganization command to the storage system 200. The database reorganization processing unit 213 of the disk control unit 210 in the storage system 200 receives the database reorganization command (the total reorganization command or the partial reorganization command) from the host computer 100 to execute the reorganization.

When the database reorganization processing is completed, a catching-up processing of reading an update history of the database for the primary database 222 generated during a reorganization period from logs (LU#1) and applying the update history to the secondary database 223 (S5 in FIG. 11) is implemented so as to resynchronize the volume pair (step 1405 and S6 in FIG. 11). More specifically, the database reorganization control unit 151 sends a volume pair resynchronization command to the storage system 200. As a result, the primary database 222 and the secondary database 223 are resynchronized with each other as a volume pair.

In the resynchronization, the fragment and imbalance in the database space are eliminated from the contents of the secondary database 223 after the completion of the database reorganization processing. By copying the contents of the secondary database 223 to the primary database 222, the contents of the primary database 222 and those of the secondary database 223 both become the contents after the completion of the database reorganization processing.

By the above-described processing, the database is reorganized.

FIG. 11 is an explanatory view of a reorganization processing of the disk drive.

The processing is executed by the database reorganization processing unit 213 in the storage system 200.

FIG. 11 shows three LUs (LU#1, LU#2, and LU#3). These LUs are set as the areas of the primary database 222, the secondary database 223, and the log 221, respectively.

During the operation, the LU#1 and the LU#2 are synchronized with each other. An access to the LU#1, in other words, the primary database 222 is also performed to the LU#2, in other words, the secondary database 223. As a result, the contents of the LU#1 and those of the LU#2 are always identical with each other. Moreover, a log of the access result is stored in the LU#3.

First, in the reorganization processing, the database is quiesced (S1) to stop the acceptance of a transaction. When the quiescence of the database is completed, the synchronization between the LU#1 and the LU#2 is cancelled to split the volume pair into the LU#1 and the LU#2 (S2).

After the split of the volume pair, the database is released from the quiescent state (S3) to restart the acceptance of a transaction. At this time, the setting is changed so that the database access is made only to the LU#1.

In this state, the reorganization processing of the LU#2 is implemented (S4). Since the LU#1 and the LU#2 are separated from each other to be in an unsynchronized state, system operation is not affected by the reorganization processing. A log of the access to the primary database 222 (LU#1) during the reorganization processing is stored in the LU#3.

When the reorganization of the LU#2 is completed, a catching-up processing is executed by using the logs stored in the LU#3 (S5).

When the catching-up processing is completed, the data in the LU#1 which accepts accesses and that in the LU#2 become logically equivalent to each other.

Next, the contents of the LU#2 are copied to the LU#1 to synchronize the LU#2 and the LU#1 with each other (S6).

Upon the completion of synchronization, the reorganization processing is completed.

Figure 12:
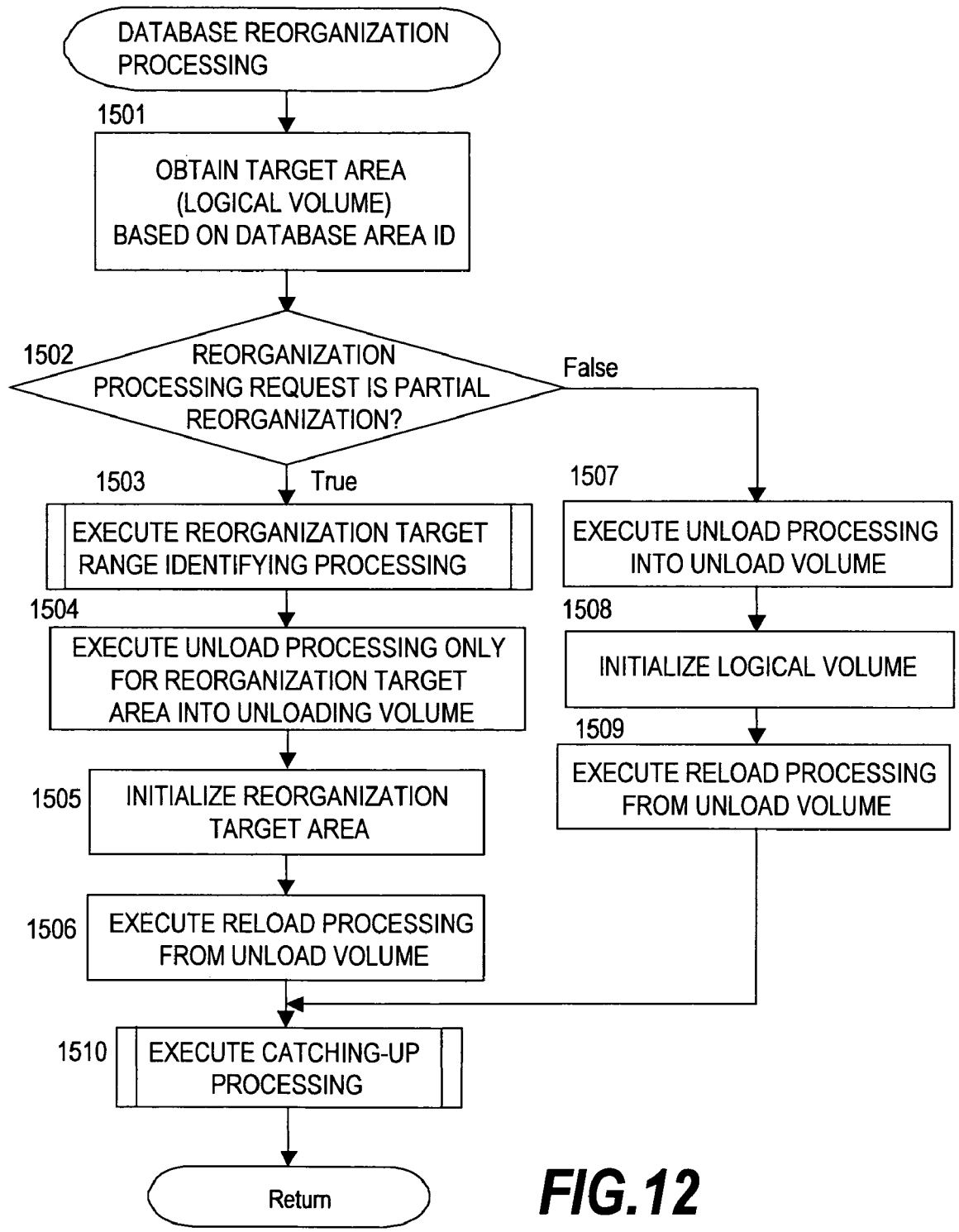
FIG. 12 is a flowchart of the database reorganization processing according to the first embodiment of this invention.

FIG. 12 is a flowchart of the above-described database reorganization processing.

This processing is executed by the database reorganization processing unit 213 of the storage system 200.

The database reorganization processing unit 213 first obtains a designated database area ID of the database. The database area ID corresponds to a file designated by an administrator or the like from the host computer 100. Referring to the database definition information 224 and the database-disk block conversion table 225, an identifier indicating an area (logical volume) storing the database is obtained (step 1501).

Figure 14:
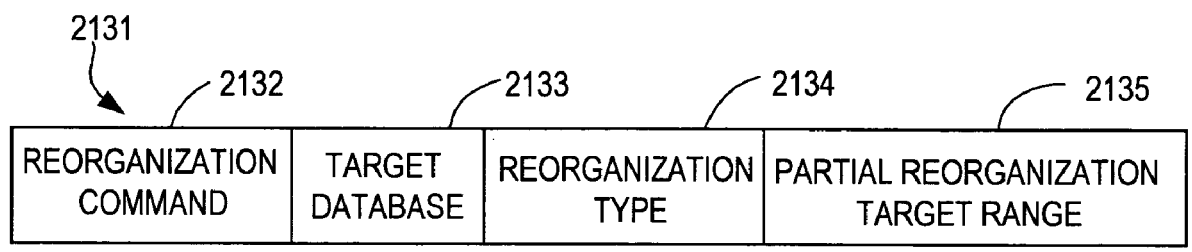
FIG. 14 is an explanatory view of a reorganization command according to the first embodiment of this invention.

Next, it is determined whether the reorganization command received from the host computer 100 is a total reorganization command or a partial reorganization command (step 1502). Herein, FIG. 14 shows an example of the reorganization command. A reorganization command 2131 is composed of a command type 2132 indicating the type of command, a target database 2133 indicating a database name of the reorganization target, a reorganization type 2134 indicating that the target of reorganization is all of or a part of the target database 2133, and a partial reorganization target range 2135 designating a target to be reorganized when the reorganization type is partial reorganization. A value indicating the reorganization is set for the command type 2132, and a value indicating any of the total reorganization and the partial reorganization is set for the reorganization type 2134. When the reorganization type 2134 is partial reorganization, an element specifying the target of reorganization such as a filling rate or an I/O cost described below is set for the partial reorganization target range 2135.

When the received reorganization command is the partial reorganization command, the database reorganization processing unit 213 proceeds to a step 1503 to identify a part of the data area 1 to be reorganized. On the other hand, when the received reorganization command is a total reorganization command, the database reorganization processing unit 213 proceeds to a step 1507.

In the step 1503 where the partial reorganization command is received, a filling rate or an I/O cost of the data in the data area 1 corresponding to the database area ID is detected as described below. A space with the filling rate being equal to or lower than a threshold value Th1 or a space with the I/O cost being equal to or higher than a threshold value Th is identified (determined) as a data space to be partially reorganized.

Herein, the data filling rate indicates a rate of the table data blocks 30 filled with the data to all the table data blocks 30 constituting the extent 20 shown in FIG. 2. For example, the data filling rate is given by:

$$\text{Filling rate} = \text{the number of full data blocks/a total number of data blocks in the extent 20} \quad (1)$$

When the filling rate is high, the extent 20 has a high rate of the table data blocks 30 filled with the data. When the filling rate is low, the extent 20 includes a large number of free data blocks. The I/O cost is a value indicating the discontinuity of the LBAs designated by the adjacent index data.

Specifically, in the step 1503, when it is determined that the data area 1 of the designated database corresponds to a target range of the partial reorganization, the extent 20 including a large number of free data blocks, in other words, the extent 20 having the above-described filling rate being equal to or lower than the threshold value Th1 is designated among the extents 20 shown in FIG. 2. Alternatively, in the leaf block shown in FIG. 3, the LBAs indicated by the adjacent row addresses on the LU are separated from each other by a threshold value Th2 or more, the leaf block is regarded as a target of the partial reorganization. The threshold value Th2 is appropriately set according to the performance or the capacity of the disk drive 220.

Next, a new logical volume (hereinafter, referred to as an "unload volume") having the same capacity as (or larger than) that of the reorganization target area determined in the step 1503 is created on the disk drive 220. The reorganization target area of the database to be reorganized is logically copied to the created unload volume to be initialized (step 1504). At this time, the contents of the logical volume are copied to the unload volume in consideration of the arrangement of each data on the disk drive so as to eliminate the fragment or the imbalance in the space of the reorganization target area in the database.

The copy to the unload volume is performed, for example, in such a manner that the same table data block 30 or the same index block is stored in the physically continuous areas. The data is stored in the unload volume based on a predesignated filling rate target value. The processing in the step 1504 will be referred to as an "unload processing" below.

As described above, although the unload volume to which the data in the database is partially copied by the unload processing and the logical volume (the secondary database 223) that stored the database are logically equivalent to each other, the physical arrangement of each data is not necessarily equivalent.

Next, the logical volume (the secondary database 223) corresponding to the copy source of the data for which the unload processing has been completed is initialized (step 1505).

Subsequently, the contents of the unload volume are copied to the initialized logical volume (step 1506). In this case, in contrast with the copy in the unload processing in the step 1504, the contents of the unload volume are copied without any change as the above-described copy processing in FIG. 9. This processing is referred to as a reload processing.

By the processing in the steps 1503 through 1506, the partial reorganization of the designated database is completed.

On the other hand, when it is determined in the step 1502 described above that the reorganization command is the total reorganization command, the processing proceeds to a step 1507 so as to reorganize all the data in the designated database.

In the step 1507, a new unload volume having the same capacity as (or larger than) that of the designated database is created. Then, the unload processing of logically copying all the data in the database to be reorganized from the secondary database 223 to the created unload volume is performed. At this time, as in the step 1504 described above, the contents of the logical volume are copied to the unload volume in consideration of the arrangement of each data on the disk drive so as to eliminate the fragment or the imbalance in the database space.

For example, the same table data block or the same index block is stored in the physically continuous areas. The data is stored in the unload volume based on a preset filling rate target value.

Next, the logical volume corresponding to the copy source of the data for which the unload processing has been completed is initialized (step 1508).

Next, the contents of the unload volume are copied to the initialized logical volume (step 1509). In this processing, in contrast with the copy in the unload processing in the step 1507, the contents of the logical volume are copied without any change as the above-described copy processing in FIG. 9.

By the processing in the steps 1507 through 1509, the reorganization of the entire designated database is completed.

When the partial reorganization in the steps 1503 through 1506 or the total reorganization in the steps 1507 through 1509 is completed, logs of the primary database 222 recorded during the database reorganization processing are applied and reflected to the unload volume, for which the database reorganization has been completed, in a step 1510 so as to implement a catching-up processing. The catching-up processing is described below with reference to FIG. 18.

When the catching-up processing is completed, the database reorganization processing unit 213 informs the completion of the database reorganization processing to the host computer 100 to return to the flowchart of FIG. 10.

Figure 13:
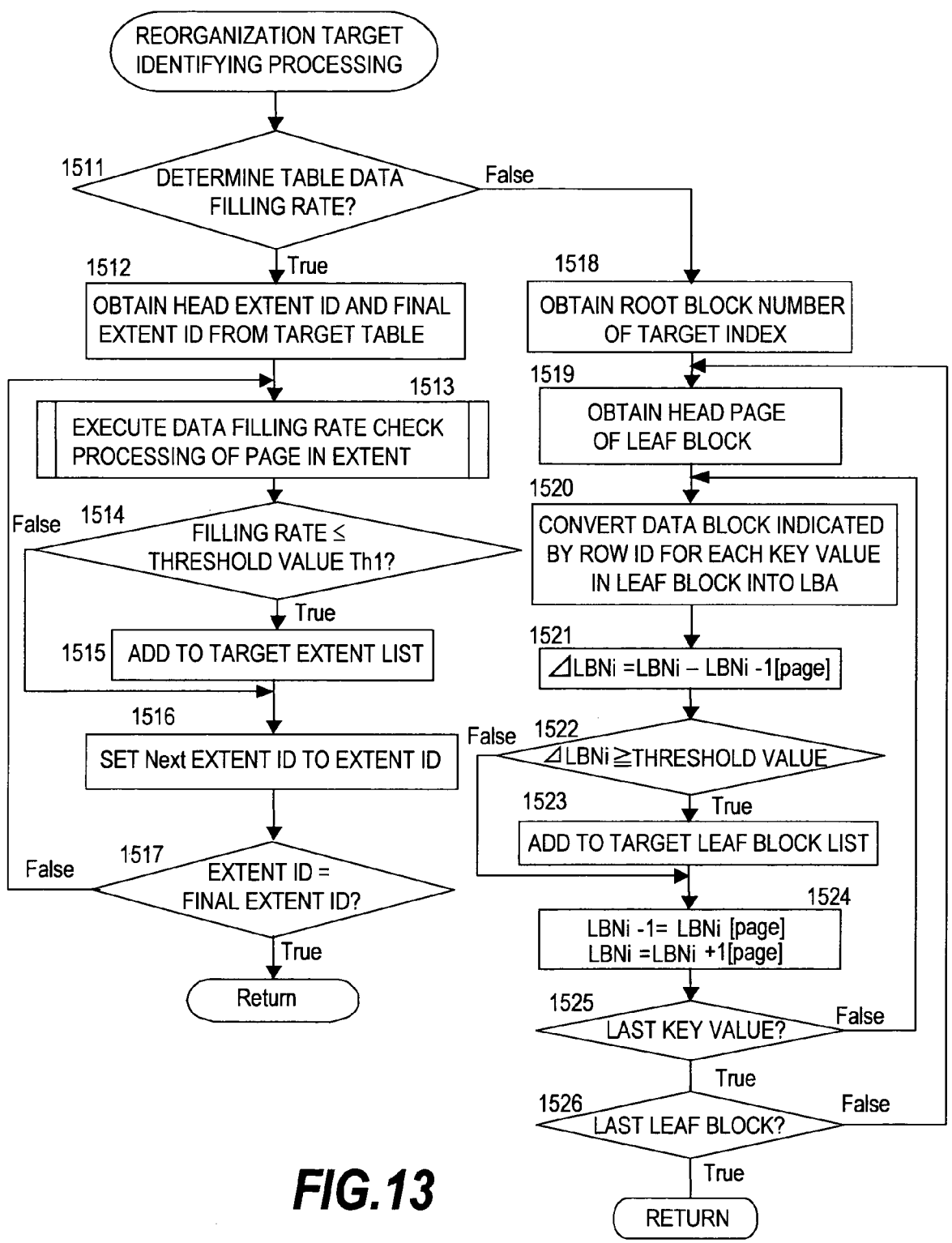
FIG. 13 is a flowchart showing an example of a reorganization target identifying processing of the database reorganization processing according to the first embodiment of this invention.

FIG. 13 is a flowchart showing an example of a subroutine of the reorganization target range identifying processing performed in the above-described step 1503.

First, in a step 1511, the partial reorganization target range 2135 is read from the reorganization command received by the database reorganization processing unit 213 so as to determine whether or not an element specifying the reorganization target is the filling rate. When the reorganization target range is determined by the filling rate, the process proceeds to a step 1512. When the reorganization target range is determined by the I/O cost, the process proceeds to a step 1518.

In the step 1512, the directory section 10 shown in FIG. 2 is read from the data area 1 of the designated database so as to obtain the head extent ID 10c and the final extent ID 10d for the object ID whose type 10b indicates 'I' (table) from the object management area 11.

Next, after the step 1513, the filling rate of each of the extents 20 is sequentially calculated from the head extent ID 10c to the final extent ID 10d.

First, in the step 1513, from the full management 13c in the data block availability management area 13, the number of the table data blocks 30 being full (="1") with no free data area (the number of full data blocks) among the table data blocks 30 constituting the extent 20 is obtained so as to calculate the filling rate according to the above-described Formula (1).

Then, in the step 1514, it is determined whether or not the obtained filling rate is equal to or smaller than the preset threshold value Th1. The threshold value Th1 is set to, for example, a rate such as 50%. When the filling rate is equal to or smaller than the threshold value Th1, it is determined that a sparse space increases in the extent 20. Therefore, the process proceeds to a step 1515 to set the partial reorganization. On the other hand, when the filling rate exceeds the threshold value Th1, it is determined that the extent 20 is filled with the data with no need of partial reorganization. Accordingly, the process proceeds to a step 1516.

Figure 15:
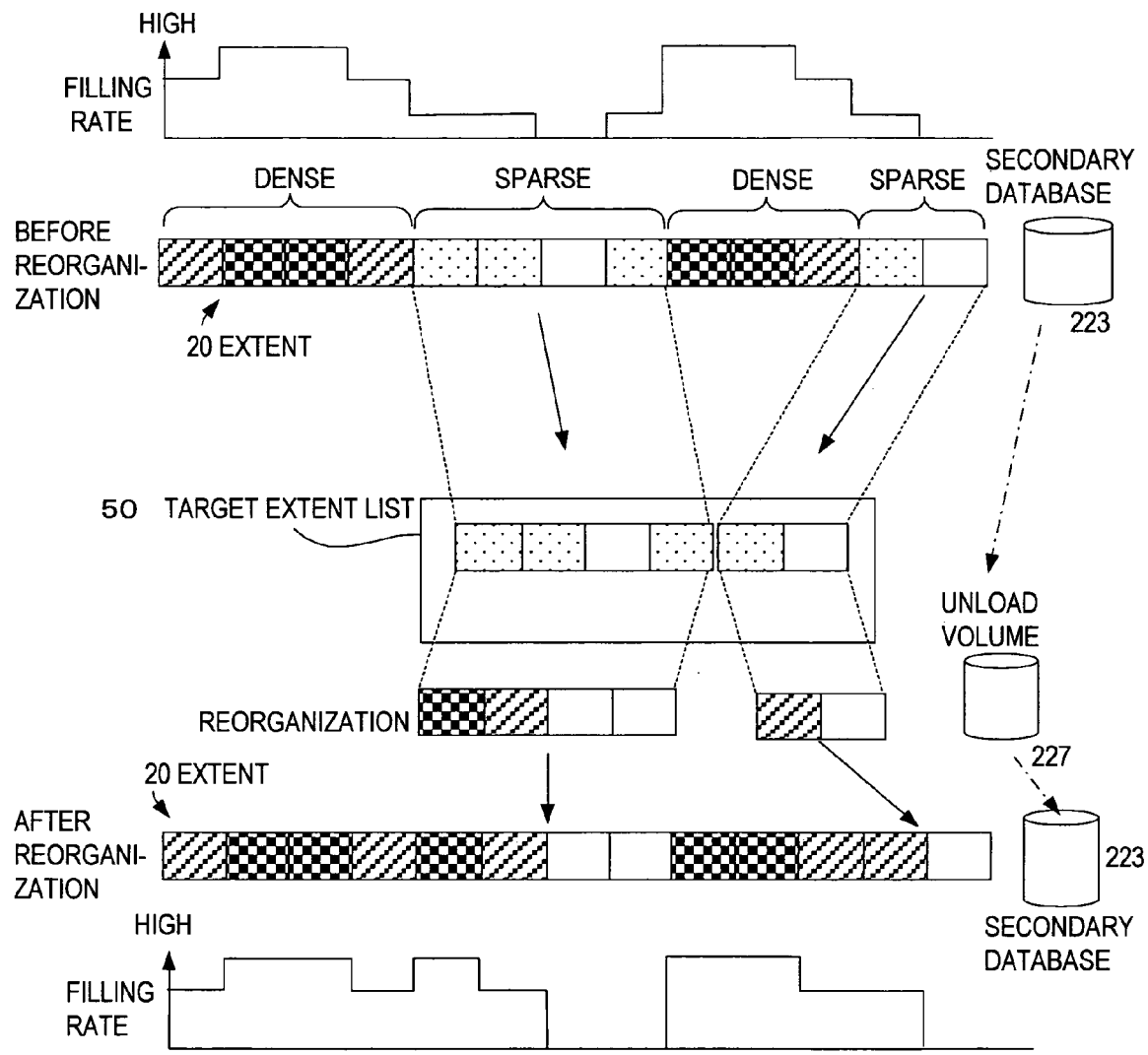
FIG. 15 is an explanatory view showing a state of partial reorganization based on a filling rate according to the first embodiment of this invention.

In the step 1515 when the filling rate is equal to or smaller than the threshold value Th1, an extent ID of the extent 20 with the filling rate being the threshold value Th1 or smaller is added to a target extent list 50 shown in FIG. 15. The target extent list 50 is a preset area in the memory 216 of the disk control unit 210 or the like. The target extent list 50 is cleared upon the completion of partial reorganization.

Next, the current extent ID is set for the next extent ID 13a indicated in the data block availability management area 13 shown in FIG. 2. When the extent ID does not exceed the final extent ID 10d, the process returns to the step 1513 to determine the filling rate for the next extent 20. When the next extent ID 13a exceeds the final extent ID 10c, the subroutine is terminated.

By the processing in the above-described steps 1512 through 1517, as shown in FIG. 15, from the information in the full management 13c of the table data blocks 30 constituting each of the extents 20, the extent IDs of the sparse spaces with the rate of the data blocks filled with the data being the threshold value Th1 or smaller are sequentially accumulated in the target extent list 50 as targets of the partial reorganization.

When the element specifying the reorganization target is the filling rate, the reorganization is partially performed for the extents 20 stored in the target extent list 50 in the above-described steps 1504 through 1506 in FIG. 12. As a result, in the partial reorganization, the sparse spaces of the extents 20 before the reorganization shown in the upper part of FIG. 15 are added to the target extent list 50. The added spaces are reloaded on the secondary database 223 as the extents 20 of dense spaces with the filling rate increased by the partial reorganization as shown in the lower part of FIG. 15. As a result, the extents 20 with a high filling rate are logically continuous to enable efficient improvement of database responsiveness and reduction in use of the storage area.

On the other hand, when it is determined in the step 1511 described above that the element specifying the reorganization target is the I/O cost, a processing in steps 1518 through 1525 is performed.

Herein, the I/O cost will be described. The disk drive 220 in the storage system 200 reads and writes data after a head seeks a target sector, the sector obtained by division on a plurality of cylinders being a minimum recording area.

Time required for reading and writing data by random access (I/O response time) is represented by the sum of head seek time, rotation time required for the disk to rotate at 360 degrees, and transfer time required for the head to read data. Among them, the seek time has the greatest effect. The seek time has an extremely large value as compared with the rotation time and the transfer time.

The management of the disk drive 220 uses a block obtained by assembling a plurality of sectors as a unit of access. In the above-descried tree structure shown in FIG. 3, the head row addresses 423 of the adjacent key values 421 in the leaf block 42 have a smaller I/O response time and higher database responsiveness as the LBNs indicated by the logical addresses i of the page numbers 4231 become closer. Specifically, in the index entry of the leaf block 42 shown in FIG. 3, when the page number (the logical address i) of the row address corresponding to the key values 421 at the head shown in the upper part of FIG. 3 is set in an ascending order toward the key value 421 in the lower part of FIG. 3 with i=0 to n, the logical addresses i are sequentially read when the LBNs indicated by the logical addresses i are as shown in FIG. 16. Then, the order of the LBNs is 6, 3, 5 and so on. As a result, the head seek is frequently performed to increase the I/O response time and to lower the database responsiveness.

Therefore, in this embodiment, the physical locations on the disk respectively indicated by logical addresses i (Page) and i−1 (Page) corresponding to the head row addresses 423 of the adjacent key values 421 are LBNi (Page) and LBNi−1 (Page). A difference ΔLBNi between the LBNs indicated by the addresses i of the adjacent key values 421 is given by:

$$\Delta LBNi = LBNi(\text{Page}) - (LBNi-1(\text{Page})) \qquad (2)$$

The obtained value is used as the I/O cost.

As a value of the ΔLBNi indicating the I/O cost increases, the head seek time and the I/O response time also increase. As the value of the ΔLBNi decreases, the head seek time and the I/O response time decrease. Specifically, the ΔLBNi corresponding to the I/O cost indicates a distance between the adjacent key values 421 on the LU.

Hereinafter, a processing in the steps 1518 to 1526 for identifying a target range of partial reorganization will be described.

In the step 1518, the directory section 10 shown in FIG. 2 is read from the designated data area 1 of the database so as to obtain the object ID with the type 10b indicating "i" (index data=index) from the object management area 11. In this manner, the page number of the root block 40 of the index data is obtained.

Then, from the tree structure shown in FIG. 3, a head address of the leaf block 42 is obtained (step 1519). Next, for the obtained index entry of the leaf block 42, the logical address i of the head row address 423 associated with each of the key values 421 is converted into the LBN. The conversion into the LBN is performed, for example, in the following manner. The LBN corresponding to the logical address i−1 indicated by the head row address 423 of the head key value 421 is obtained as the LBNi−1 (Page) from the address conversion table 226. The LBN corresponding to the logical address i indicated by the head row address 423 of the next key value 421 is obtained as the LBNi (Page) from the address conversion table 226 (step 1520). Then, the ΔLBNi corresponding to the I/O cost is calculated according to the above Formula (2) (step 1521).

Next, it is determined whether or not the calculated ΔLBNi corresponding to the I/O cost is equal to or larger than the threshold value Th2 (step 1522). When the ΔLBNi corresponding to the I/O cost is equal to or larger than the threshold value Th2, the I/O cost is large (high discontinuity). Thus, the area is determined to be a target of partial reorganization, and the process proceeds to a step 1523. When the ΔLBNi corresponding to the I/O cost is smaller than the threshold value Th2, the I/O cost is small. Therefore, it is determined that the partial reorganization is not required so that the process proceeds to a step 1524.

Figure 17:
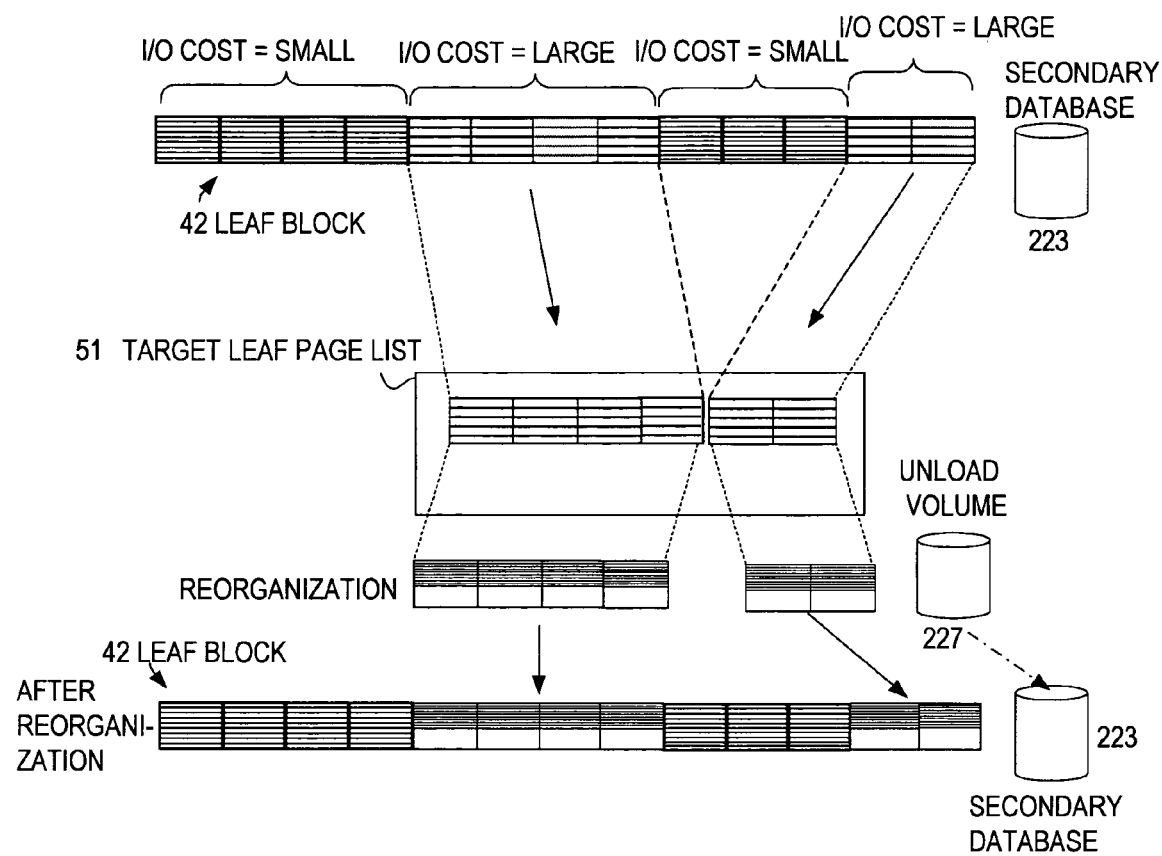
FIG. 17 is an explanatory view showing a state of partial reorganization based on an I/O cost according to the first embodiment of this invention.

In the step 1523, since the I/O cost of the leaf block 42 is large, the leaf block 42 is added to the preset target leaf page list 51 shown in FIG. 17. The addition to the leaf page list 51 is set by, for example, the key value 421, the head row address 423, and the like.

In the step 1524, the row addresses i and i−1, for which the I/O cost is calculated, are moved to the next key values 421, respectively. Specifically, the row addresses are moved as LBNi−1=LBNi (Page) and LBNi=LBNi+1 (Page).

When the key value 421 does not reach its end in the leaf block 42, the process returns to the step 1520 so as to determine the I/O cost based on the head row addresses 423 of the next adjacent key values 421 (step 1525).

Then, in a step 1526, when the key value 421 reaches its end in the leaf block 42, the next leaf block 42 is set. Returning to the step 1519, the I/O costs are compared in the next leaf block 42. When the I/O cost comparison is terminated for all the leaf blocks 42, the subroutine is terminated.

By the processing in the steps 1518 through 1525 described above, as shown in FIG. 17, based on the ΔLBNi corresponding to the I/O cost of each of the leaf blocks 42, the key values 421 and the row addresses 423 of discontinuous spaces (sparse spaces) with the ΔLBNi between the key values 421 being the threshold value Th2 or larger are sequentially accumulated in the target leaf page list 51 as a target of partial reorganization.

When the element specifying the reorganization target is the I/O cost, the reorganization is partially performed using the leaf block 42 stored in the target leaf page list 51 as a unit area in the above-described steps 1504 through 1506 in FIG. 12. As a result, in the partial reorganization, among the leaf blocks 42 before the reorganization shown in the upper part of FIG. 17, the leaf block 42 including a large discontinuous space providing the large I/O cost is added to the target leaf page list 51. Then, by the partial reorganization, as shown in the lower part of FIG. 17, the leaf block 42 is reloaded into the secondary database 223 as the leaf block 42 including a dense space with the increased continuity between the key values 421. As a result, by the reorganization into the leaf block 42 with the low I/O cost, the database responsiveness can be efficiently improved.

Figure 18:
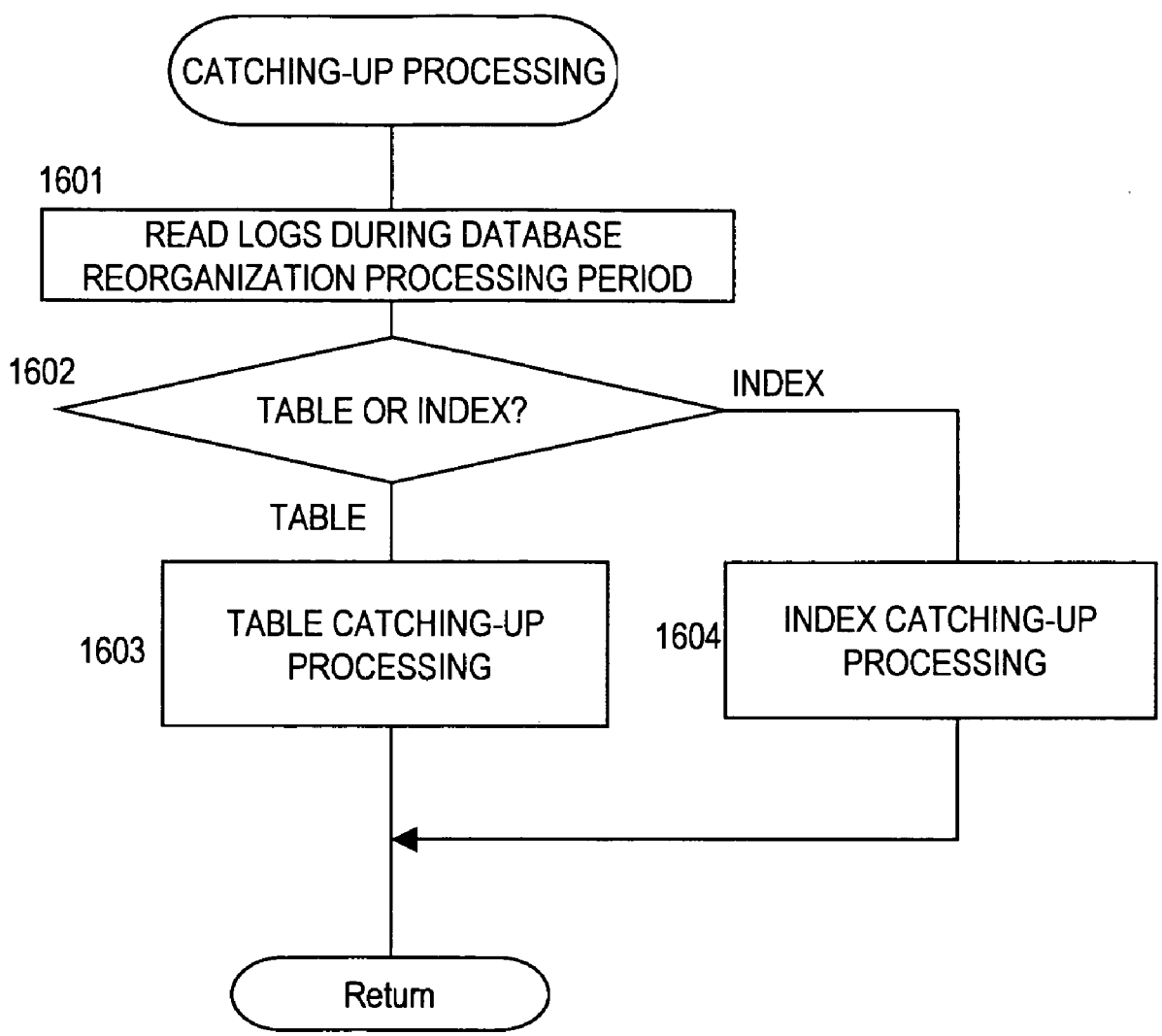
FIG. 18 is a flowchart of a catching-up processing according to the first embodiment of this invention.

FIG. 18 is a flowchart of a catching-up processing.

This processing is executed by the database reorganization processing unit 213.

First, logs recorded during the execution of the database reorganization processing are read from the log area 221 one by one (step 1601).

Next, it is determined whether the read log is table data or index data (step 1602).

When it is determined that the read log is table data, a table catching-up processing is executed (step 1603). This processing will be described below with reference to FIG. 20.

When it is determined that the read log is index data, an index catching-up processing is executed (step 1604). This processing will be described below with reference to FIG. 29.

Actually, after the completion of the table catching-up processing, the index catching-up processing is executed using the address conversion table 226 to which the address is added by the table catching-up processing.

When the table catching-up processing and the index catching-up processing are executed, the process returns to the flowchart of FIG. 10.

Next, the catching-up processing will be described.

In this embodiment, the database reorganization processing unit 213 extracts necessary ones from the logs recorded during the reorganization processing period and aggregates the extracted logs for each of the row addresses of the database. By using the aggregated logs, the database catching-up processing is executed.

Figure 19A:
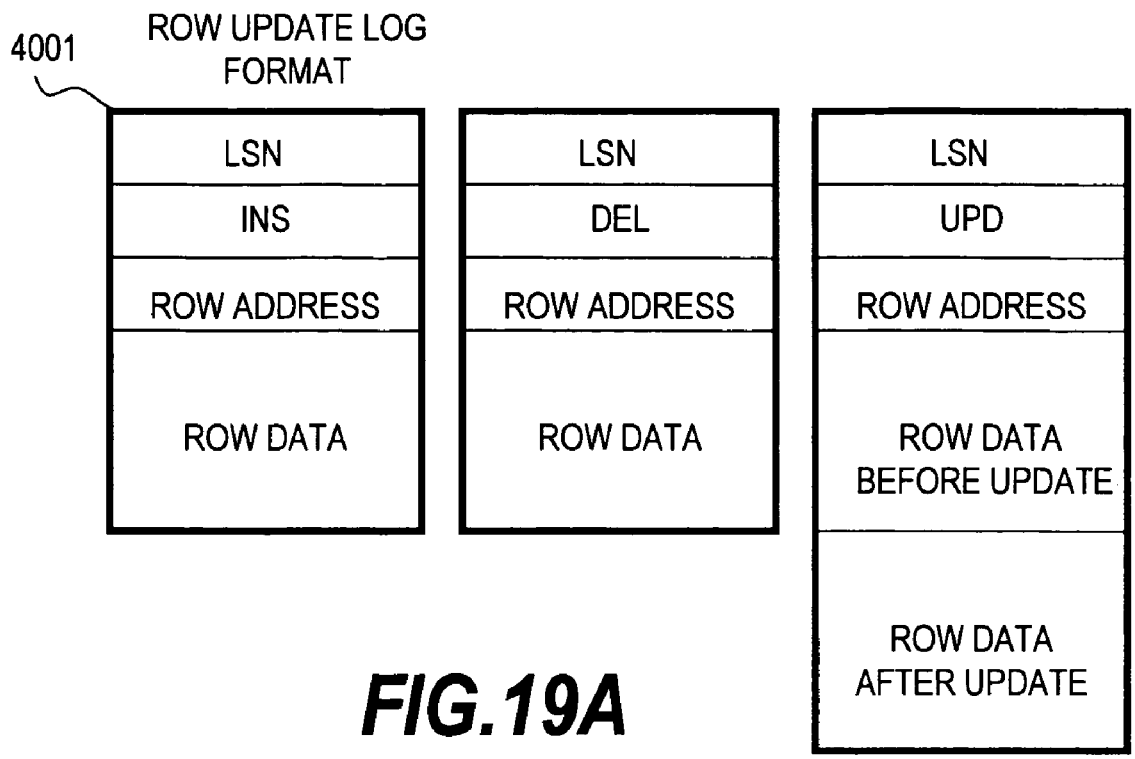
FIG. 19A is an explanatory view of logs extracted from logs in a reorganization period according to the first embodiment of this invention.
Figure 19B:
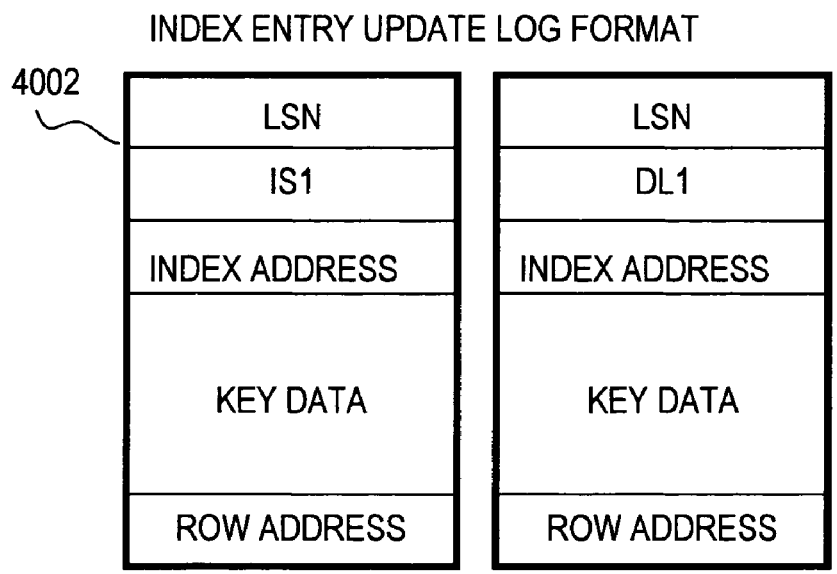
FIG. 19B is another explanatory view of logs extracted from logs in the reorganization period according to the first embodiment of this invention.

FIGS. 19A and 19B are explanatory views of logs extracted from the logs recorded during the reorganization period.

As logs for the row data 33 in the table data block 30, row insertion, row deletion, and row update are extracted. As logs (index logs) for the index entry of the index block (the leaf block 42 or the like), index entry insertion and index entry deletion are extracted. The extracted logs are stored in a buffer provided in the memory 216 of the disk device 210 as described below.

The other logs, for example, logs indicating a change of the database structure such as new assignment of the table data block 30, release of the table data block 30, or block division are not extracted because they are not required to be taken into consideration for the database after reorganization.

The log for the row of the table data block 30 (a row update log 4001) is composed of a log sequence number (LSN), a log type, a row address, and row data as shown in FIG. 19A.

The LSN is a number assigned to each log in the order of recording of logs. As the log type, the type of operation of the log is stored. The log type "INS" indicates insertion, "DEL" indicates deletion, and "UPD" indicates update. The row address indicates an address (a logical address) at which a target row is stored.

In FIG. 19A, when the log type indicates insertion, new row data to be inserted is stored in the row data. When the log type is deletion, the row data becomes blank. When the log type is update, the row data before update and row data after update are stored.

The log for the index entry (an index log 4002) is composed of a log sequence number (LSN), a log type, an index address, key data, and row address as shown in FIG. 19B.

As the log type, the type of operation for the index entry is stored. In FIG. 19B, the log type "IS1" indicates the insertion of the index entry, and "DL1" indicates the deletion of the index entry.

When the log type is insertion, new key data to be inserted is stored in the key data. When the log type is deletion, the key data becomes blank.

As the row address, an address of the row corresponding to the index entry is stored.

Figure 20:
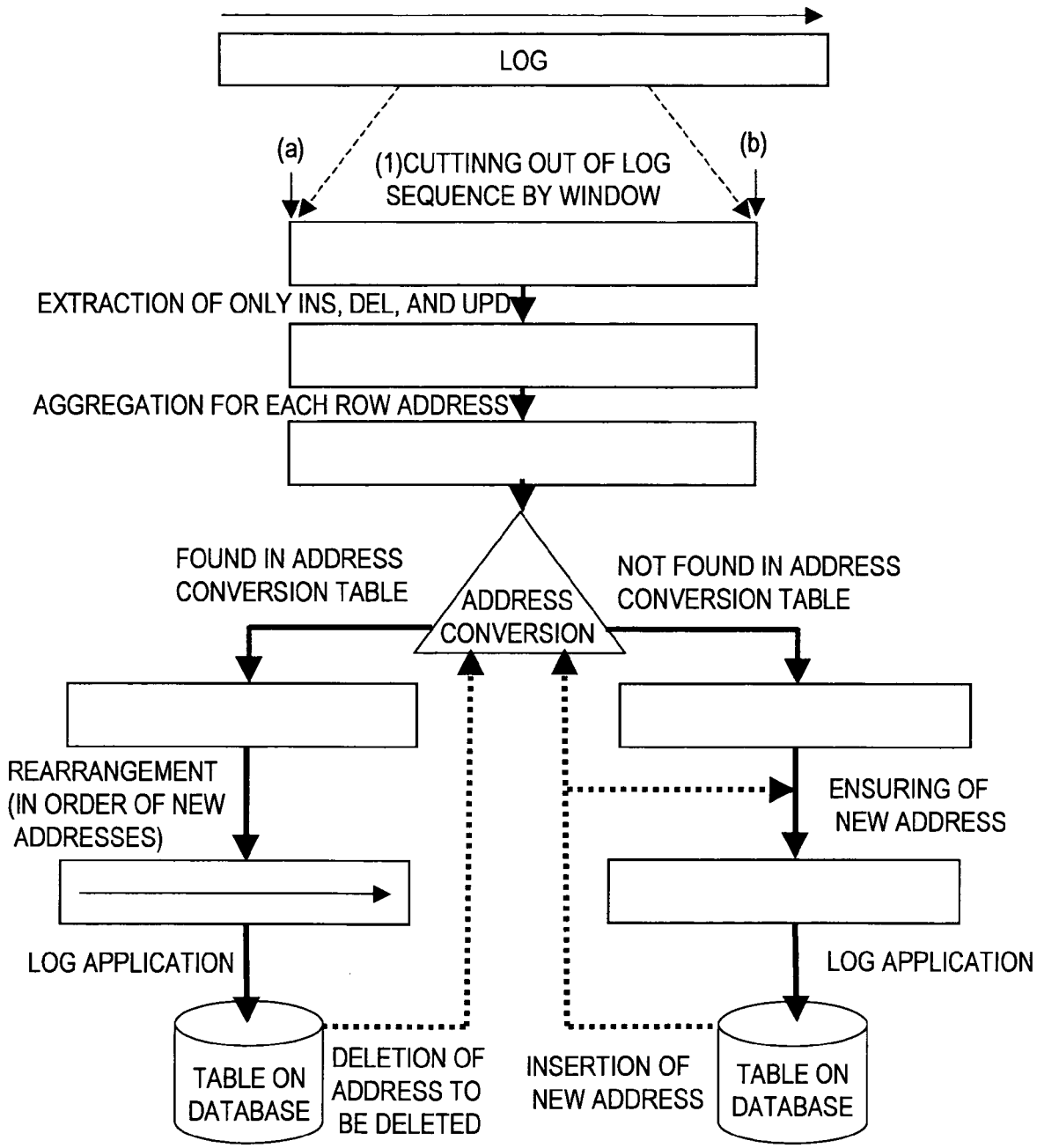
FIG. 20 is a flowchart showing an outline of a table catching-up processing according to the first embodiment of this invention.

FIG. 20 is a flowchart showing the outline of the table catching-up processing.

This processing is executed by the database reorganization processing unit 213.

First, logs recorded during the reorganization processing are cut out and obtained from the log area 221 where the logs are stored in time series.

Logs recorded during the execution of the table catching-up processing are required to be taken into consideration not only during the reorganization processing but also after the reorganization processing. In order to cope with it, conceivable methods include a method of performing another catching-up processing on a log recorded during a catching-up processing after the completion of the catching-up processing of the logs recorded during the reorganization processing, and a method of performing a catching-up processing in parallel on logs recorded during the catching-up processing of the logs being reorganized.

Next, insertion (INS), deletion (DEL), and update (UPD) logs are extracted from the cutout log sequence.

Subsequently, the extracted log sequence is aggregated for each row address. More specifically, the extracted log sequence is aggregated for each row address so as to be arranged in time series for each row address. Then, the extracted log sequence is converted into a single log for each row address. The log conversion will be described below with reference to FIGS. 21A and 21B.

Then, the log is applied to the row data for each row address. At this time, it is determined whether or not the row address corresponding to a target of log application is recorded in the address conversion table 226.

When the row address is recorded in the address conversion table 226, the row address after the reorganization processing can be referred to by referring to the address conversion table 226.

On the other hand, when the row address is not recorded in the address conversion table 226, the insertion is performed during the reorganization processing on the address of a row that was not present before the reorganization processing. By referring to a row address of the log, it can be determined whether or not the row address is recorded in the address conversion table 226.

For the row addresses recorded in the address conversion table 226, a processing of rearranging the addresses after the address conversion and aggregating them into a single log is implemented. For example, the log after the aggregation is "deletion", a row of the row address is deleted.

On the other hand, for the row address that is not recorded in the address conversion table 226, a new row address area is inserted so that data is written to the inserted row address. The new row address is recorded in the address conversion table 226.

Figure 21A:
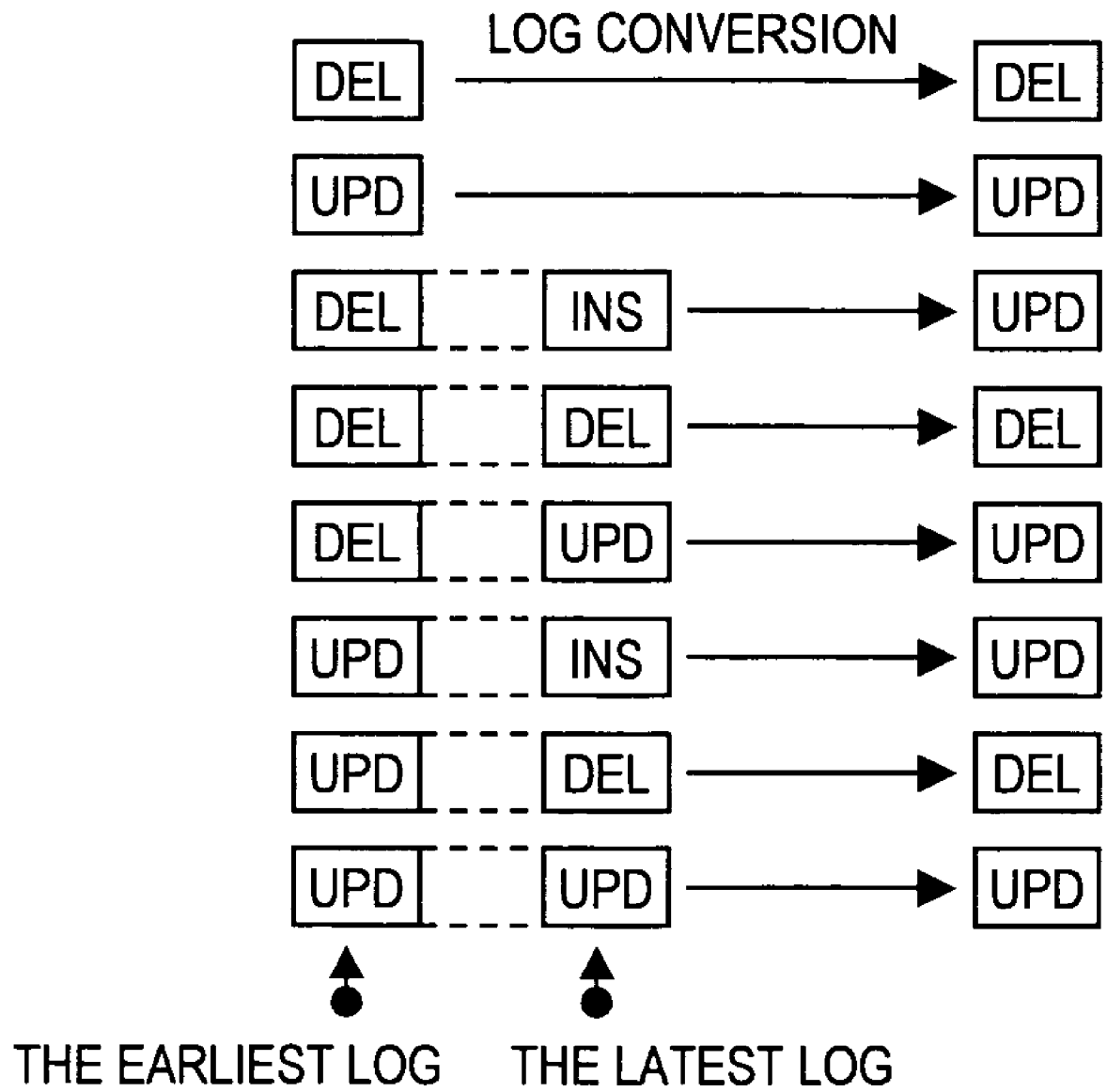
FIG. 21A is an explanatory view of log aggregation according to the first embodiment of this invention.
Figure 21B:
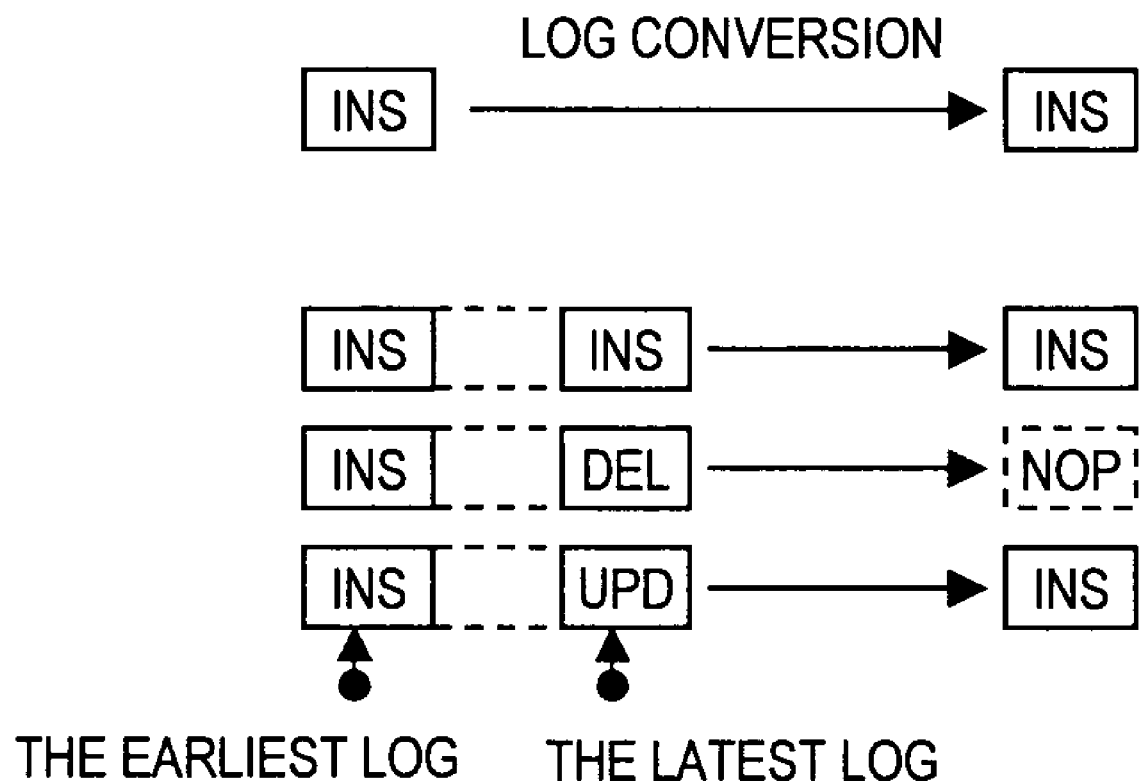
FIG. 21B is another explanatory view of log aggregation according to the first embodiment of this invention.

FIGS. 21A and 21B are explanatory views showing log aggregation.

In FIG. 21A, when the operation performed on the row of the row address that is already present in the primary database 222 is "DEL" (deletion) or "UPD" (update) alone, the log remains as a "DEL" or "UPD" log without any change.

When a plurality of logs are recorded in the row designated by the row address, only the earliest log (the first recorded log) and the latest log (the final recorded log) are extracted from the plurality of logs so as to be subjected to a conversion processing.

When the earliest log is "DEL" and the latest log is "INS" (insertion), the operation on the row address is converted into single "UPD".

When the earliest log is "DEL" and the latest log is "DEL", the operation on the row address is converted into single "DEL".

When the earliest log is "DEL" and the latest log is "UPD", the operation on the row address is converted into single "UPD".

When the earliest log is "UPD" and the latest log is "INS", the operation on the row address is converted into single "UPD".

When the earliest log is "UPD" and the latest log is "DEL", the operation on the row address is converted into single "DEL".

When the earliest log is "UPD" and the latest log is "UPD", the operation on the row address is converted into single "UPD".

On the other hand, in FIG. 21B, when the operation performed on the row address that was not present before the reorganization processing, in other words, the earliest log is "INS", the log is changed as a log that is not recorded in the address conversion table 226.

In this case, when the operation performed on the row address is "INS" alone, the log remains as the "INS" log.

When a plurality of logs are recorded in the row designated by the row address, only the earliest log (the first recorded log) and the latest log (the final recorded log) are extracted from the plurality of logs so as to be subjected to a conversion processing.

When the earliest log is "INS" and the latest log is "INS", the operation on the row address is converted into single "INS".

When the earliest log is "INS" and the latest log is "DEL", the operation on the row address is converted into "NOP" (No Operation). Actually, no operation is performed on the row address.

When the earliest log is "INS" and the latest log is "UPD", the operation on the row address is converted into single "INS".

Figure 22:
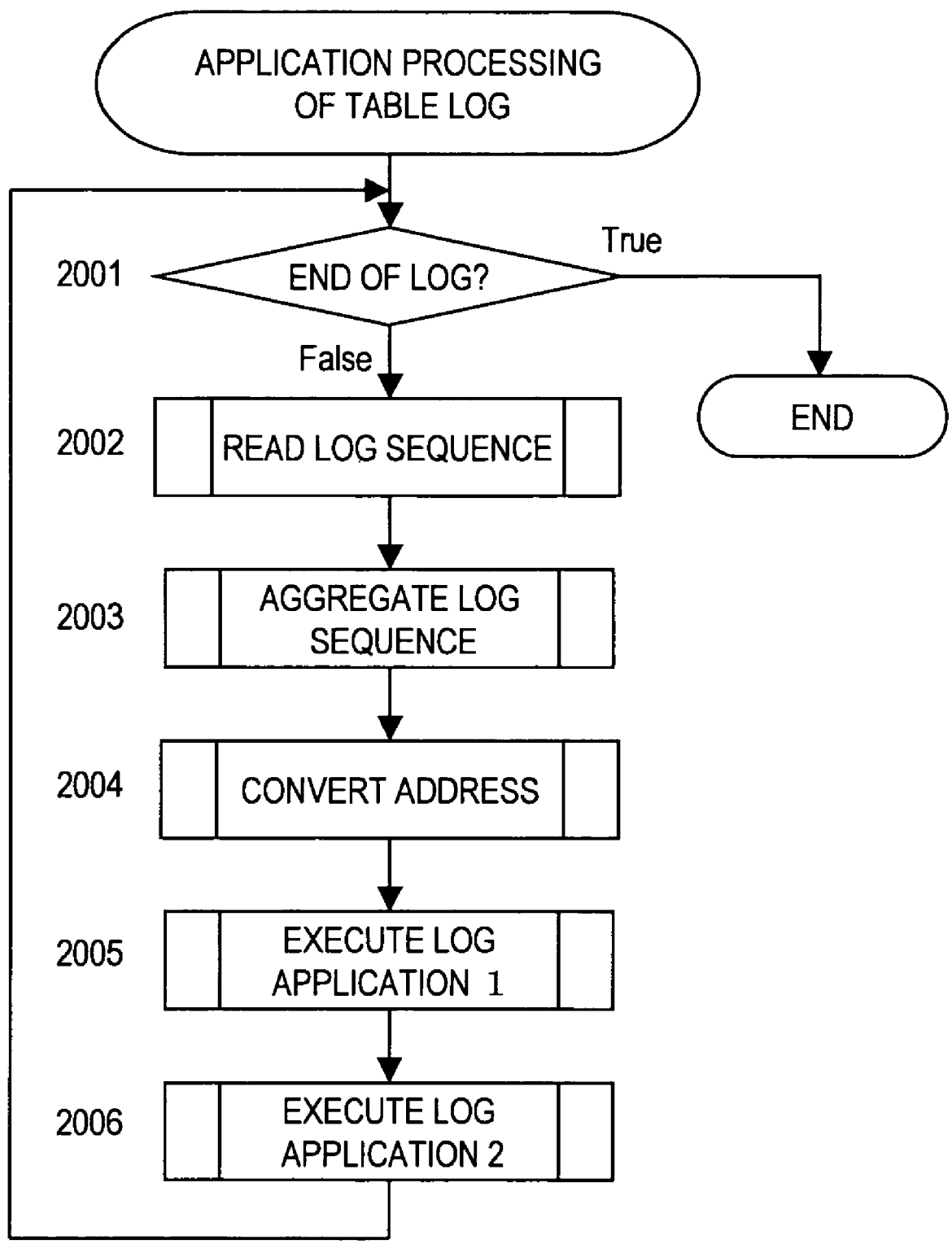
FIG. 22 is a flowchart showing a table catching-up processing according to the first embodiment of this invention.

FIG. 22 is a flowchart showing the table catching-up processing.

This processing is executed by the database reorganization processing unit 213.

First, it is determined whether or not the logs are read to the end or not (step 2001).

When it is determined that the logs are read to the end, the processing is terminated.

On the other hand, when it is determined that the logs are not read to the end yet, a read processing of the log sequence is implemented (step 2002). By this processing, necessary logs are extracted from the log area 221 as a log sequence. The extracted log sequence is stored in a buffer A set on the memory 216.

Next, an aggregation processing of the log sequence stored in the buffer A is implemented (step 2003). By this processing, the log sequence is converted into a single log for each row address so as to be stored in a buffer B.

Next, an address conversion processing is performed on the aggregated logs (step 2004). By this processing, logs recorded in the address conversion table 226 and logs not recorded in the address conversion table 226 are distinguished from each other. The row addresses before and after the reorganization are converted based on the address conversion table 226 so as to be stored in different buffers (buffers C and D), respectively. The buffers C and D, and the buffer B described below are all preset on the memory 216.

Next, a log application processing 1 for applying the logs stored in the buffer C to the table of the database is implemented (step 2005).

Next, a log application processing 2 for applying the logs stored in the buffer D to the table of the database is implemented (step 2006).

The above-described processing is executed until the read operation of all the logs is completed.

The steps 2005 and 2006 are not always required to be implemented in the order of processing shown in the flowchart. The processing may be started in each of the buffers C and D when the logs are stored in the buffers C and D.

The buffers A to D are provided for the memory 216 of the disk control device 210.

Figure 23:
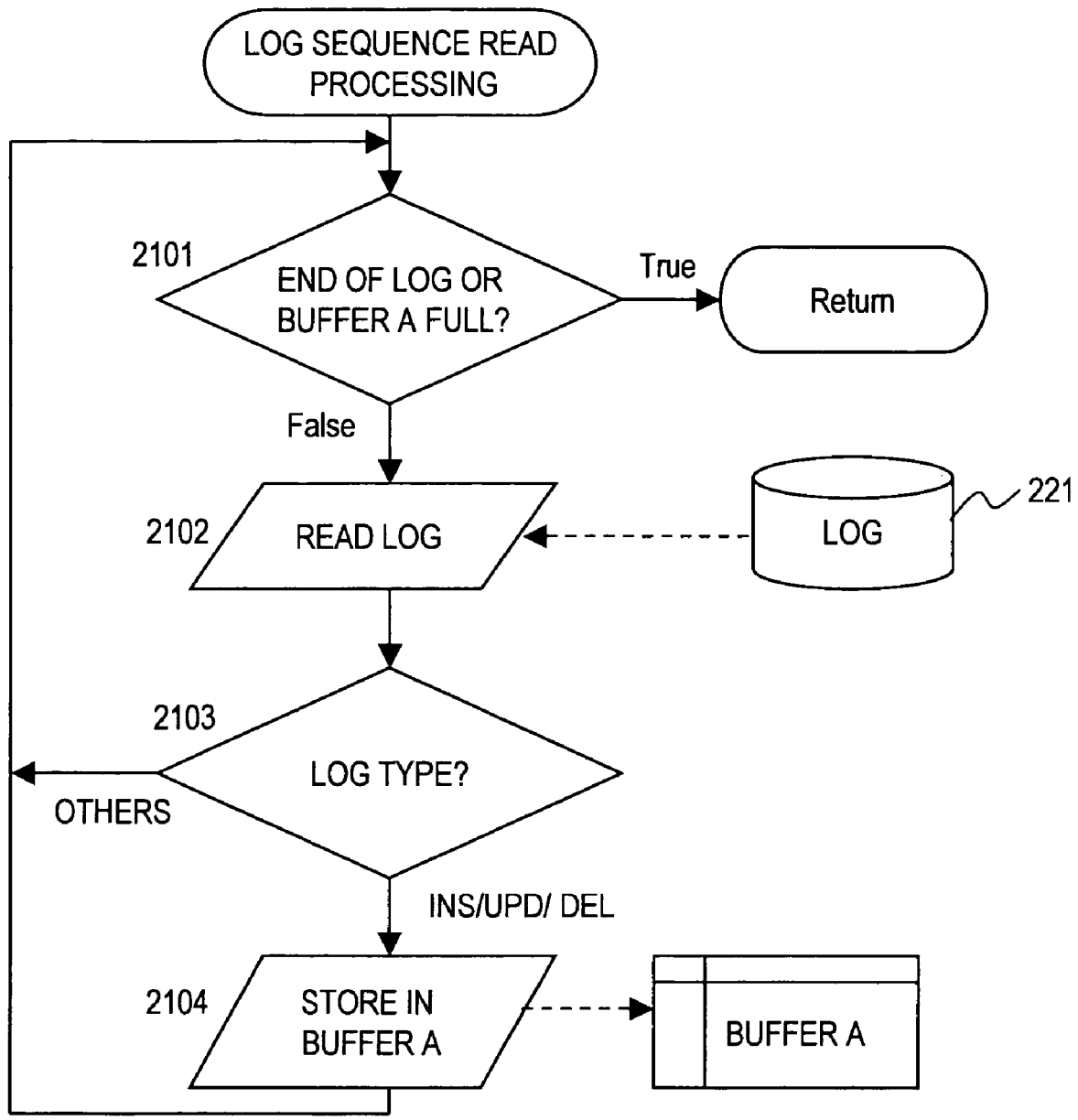
FIG. 23 is a flowchart showing a log read processing according to the first embodiment of this invention.

FIG. 23 is a flowchart of the reading processing of the log sequence in the step 2002 shown in FIG. 22.

This processing is executed by the database reorganization processing unit 213.

First, it is determined whether or not the logs are read to the end or whether or not the logs are stored to the upper capacity limit set for the buffer A so that the buffer A becomes full (step 2101).

When it is determined that the logs are read to the end or the buffer A is full, the process returns to the flowchart shown in FIG. 22.

On the other hand, when it is determined that the logs are not read to the end and the buffer A is not full yet, the logs being reorganized, which are recorded in the log area 221, are read (step 2102).

Next, the type of the read log is determined (step 2103). When the type of the read log is INS (insertion), UPD (update), or DEL (deletion), the process proceeds to a step 2140 so that the log is stored in the buffer A.

On the other hand, when the type of the read log is not any of INS (insertion), UPD (update), and DEL (deletion), the process returns to the step 2101 because the log is not required to be applied.

By the above-described log sequence read processing, the log necessary for the catching-up processing, in other words, the INS (insertion), the UPD (update), or the DEL (deletion) log is extracted so as to be stored in the buffer A.

Figure 24:
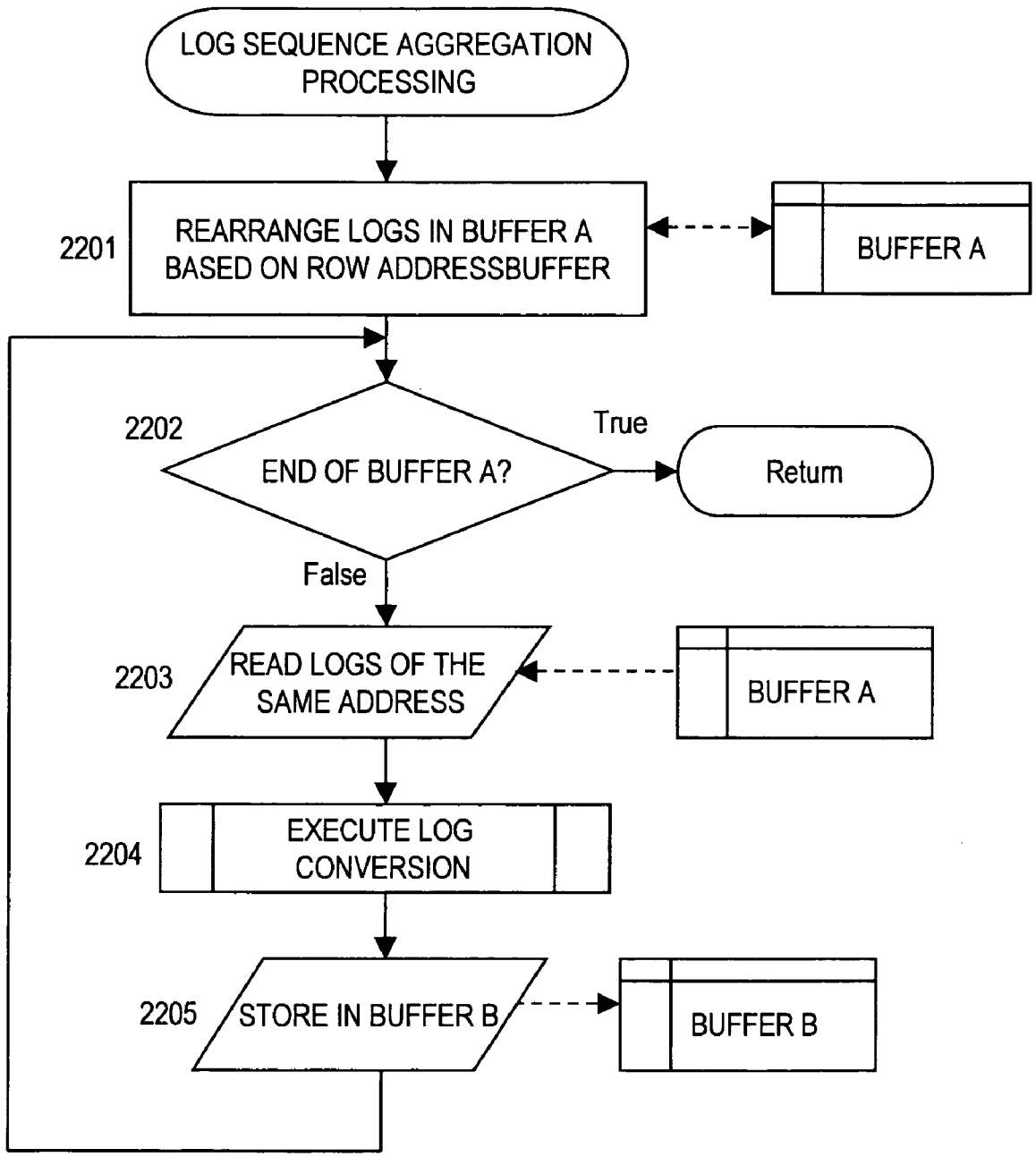
FIG. 24 is a flowchart showing a log aggregation processing according to the first embodiment of this invention.

FIG. 24 is a flowchart of an aggregation processing of the log sequence in the step 2003 shown in FIG. 22.

This processing is executed by the database reorganization processing unit 213.

As described above, after the extracted log sequence is aggregated for each row address, the log is converted.

First, the logs stored in the buffer A are rearranged in the order of the row addresses (step 2201).

Next, it is determined whether or not the rearranged logs are read to the end from the buffer A (step 2202). When it is determined that the rearranged logs are read to the end, the processing returns to the flowchart shown in FIG. 22.

When it is determined that the rearranged logs are not read to the end yet, the logs of the same row address are read from the buffer A (step 2203).

Next, the read logs of the same row address are converted (step 2204). The processing will be described below with reference to FIG. 25. By this processing, the operation of the same row address is converted into a single log.

Next, the log obtained by the conversion is stored in the buffer B for each row address (step 2205). Then, the process returns to the step 2202 so as to process the next row address.

Figure 25:
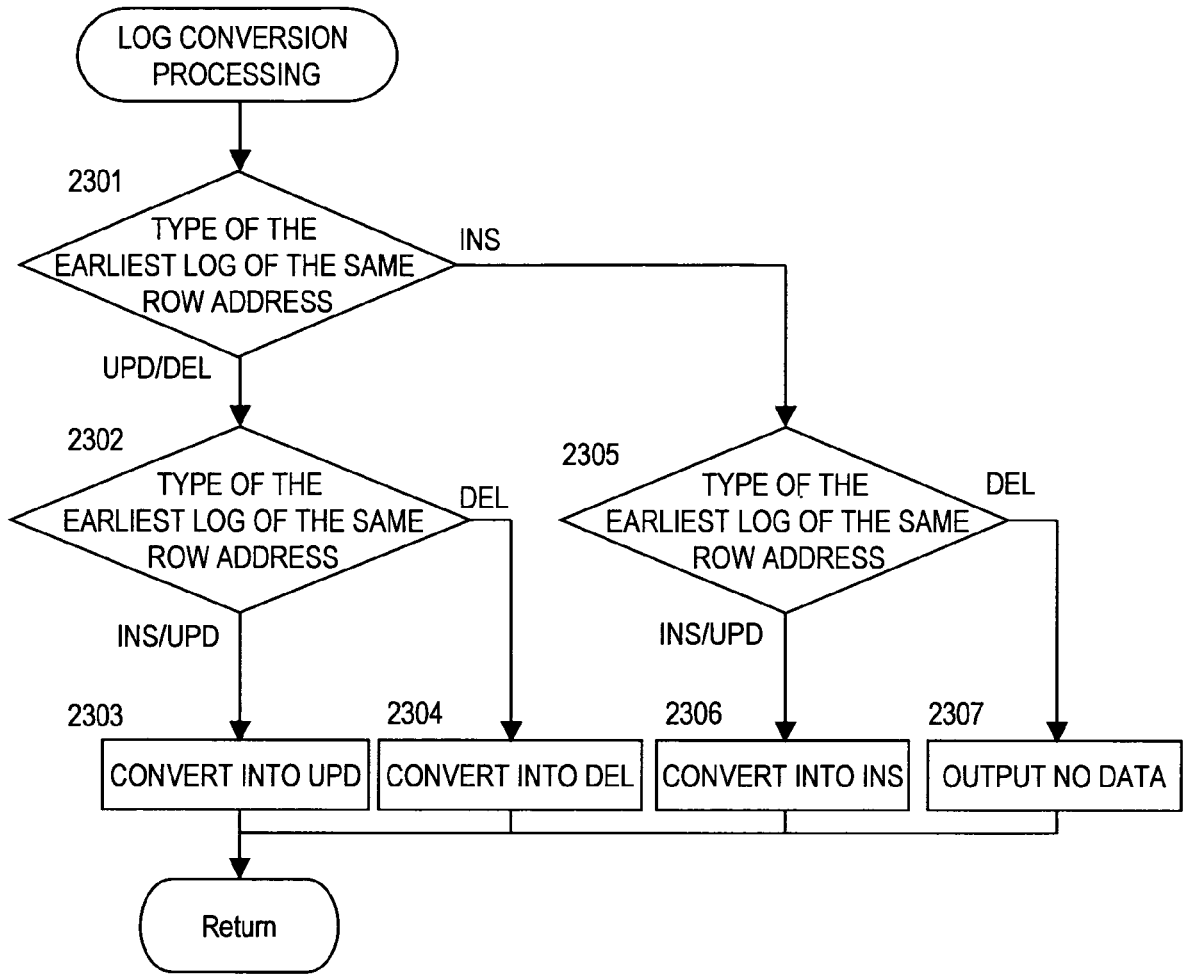
FIG. 25 is a flowchart showing log conversion according to the first embodiment of this invention.

FIG. 25 is a flowchart of the log conversion in the step 2203 shown in FIG. 24.

This processing is executed by the database reorganization processing unit 213.

First, the type of the earliest log among the logs of the same row address is determined (step 2301). When it is determined that the type of the earliest log is update (UPD) or deletion (DEL), the process proceeds to a step 2302. When it is determined that the type of the earliest log is insertion (INS), the process proceeds to a step 2305.

In the step 2302, the type of the latest log among the logs of the same row address is determined. When it is determined that the type of the latest log is INS or UPD, the logs of the row address are converted into UPD in a step 2303.

On the other hand, when it is determined that the type of the latest log is DEL, the logs to the row address are converted into DEL in a step 2304.

Similarly, in the step 2305, the type of the latest log among the logs of the same row address is determined. When it is determined that the type of the latest log is INS or UPD, the logs to the row address are converted into INS in a step 2306.

On the other hand, when it is determined that the type of the latest log is DEL, the logs to the row address are not output in a step 2307.

After the completion of the log conversion, the process returns to the processing shown in FIG. 24.

Figure 26:
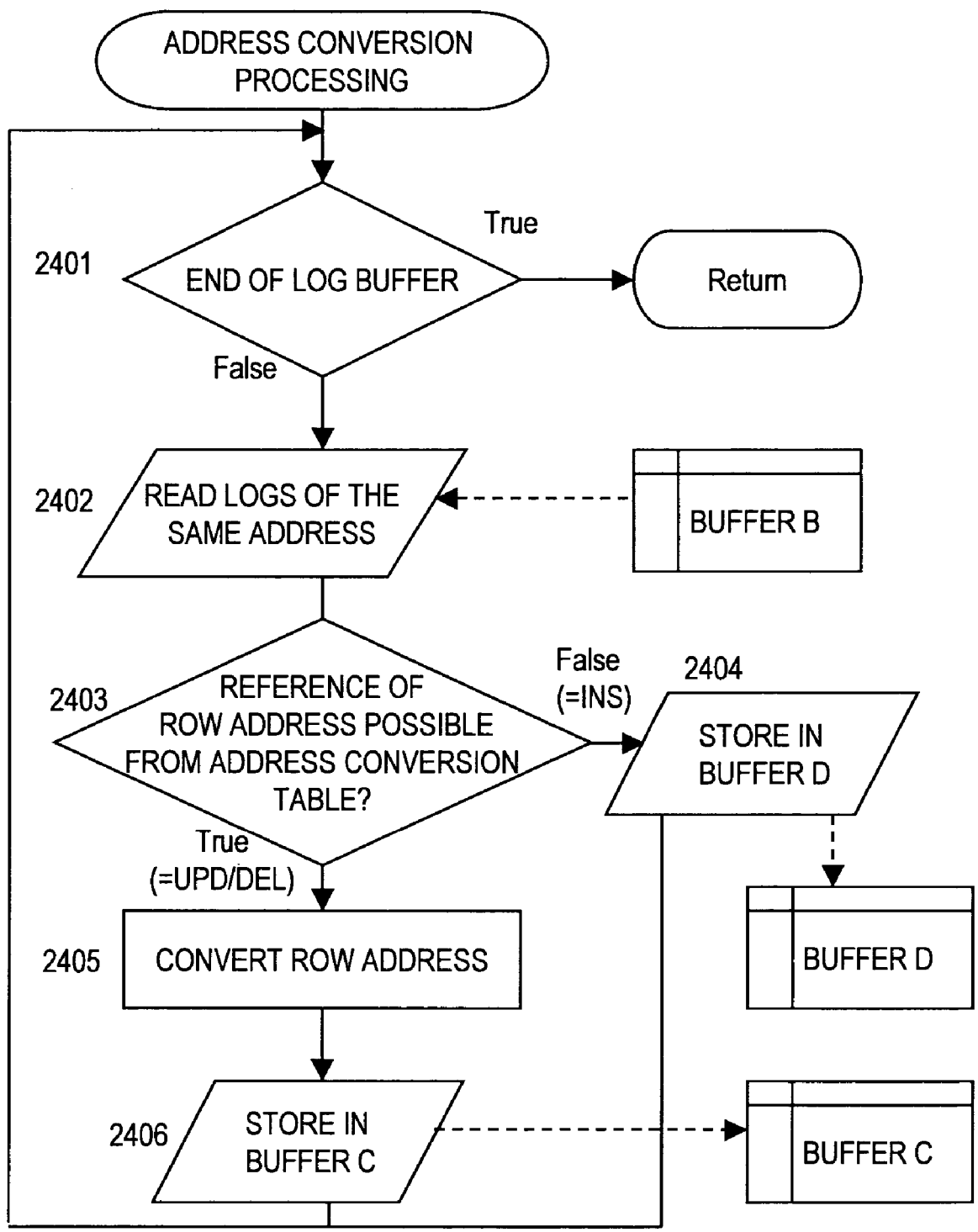
FIG. 26 is a flowchart showing an address conversion processing according to the first embodiment of this invention.

FIG. 26 is a flowchart showing the address conversion processing in the step 2004 in FIG. 22.

This processing is executed by the database reorganization processing unit 213.

First, it is determined whether or not the logs stored in the buffer B are read to the end (step 2401). When it is determined that the logs are read to the end, the process returns to the flowchart shown in FIG. 22.

When it is determined that the logs are not read to the end yet, the logs of the same row address are read from the buffer B (step 2402).

Next, it is determined whether or not the row address of the read logs is recorded in the address conversion table 226 (step 2403). When it is determined that the row address is not recorded in the address conversion table 226, the process proceeds to a step 2404 so that the logs are stored in the buffer D.

When it is determined that the row address is recorded in the address conversion table 226, the process proceeds to a step 2405 so that the row address of the log is converted into a row address after the reorganization processing based on the address conversion table 226.

Next, the log whose row address is converted is stored in the buffer C (step 2406).

Figure 27:
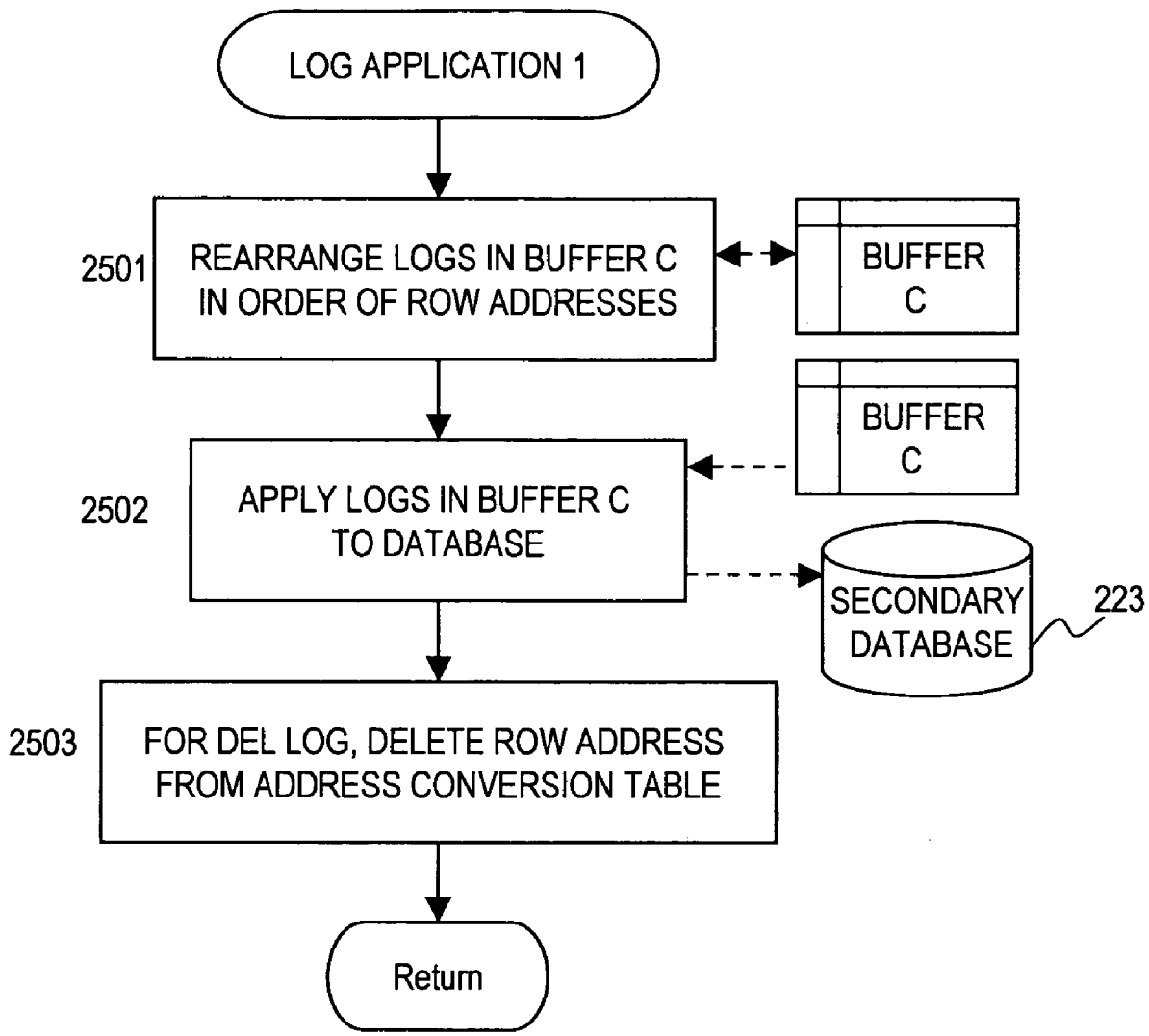
FIG. 27 is a flowchart showing a log application processing 1 according to the first embodiment of this invention.

FIG. 27 is a flowchart of the log application processing 1 in the step 2205 shown in FIG. 22.

This processing is executed by the database reorganization processing unit 213.

First, the logs stored in the buffer C are rearranged in the order of the row addresses (step 2501).

Next, the rearranged logs are read so as to be applied to the database to the disk drive 220 (step 2502). More specifically, the read logs are applied to the row address indicated by the log on the database.

For the log DEL (deletion) of the applied logs, the row address indicated by the DEL log is deleted from the address conversion table 226 (step 2503).

After the completion of the log application processing 1, the process returns to the processing shown in FIG. 22.

Upon application of the log, the logs may be separated for each magnetic disk drive of the disk drive 220 to perform a parallel processing for each magnetic disk drive, thereby increasing the speed of the log application processing.

Figure 28:
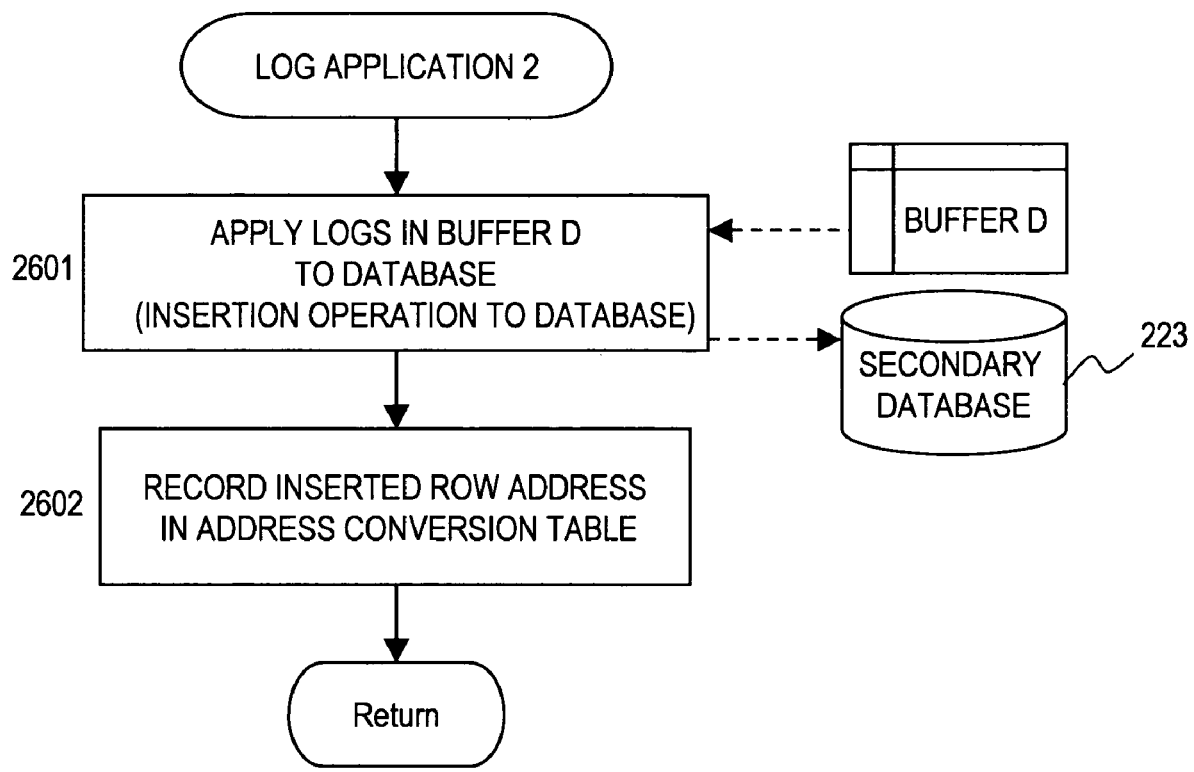
FIG. 28 is a flowchart showing a log application processing 2 according to the first embodiment of this invention.

FIG. 28 is a flowchart of the log application processing 2 in the step 2006 shown in FIG. 22.

This processing is executed by the database reorganization processing unit 213.

First, the logs stored in the buffer D are read so as to be applied to the database in the disk drive 220 (step 2601). Since the logs in this case are all INS as shown in FIG. 21B, specifically, the insertion to the database is performed based on the logs (step 2601).

Next, the row address of the applied logs is registered on the address conversion table 226 (step 2602).

After the completion of the log application processing 2, the process returns to the processing shown in FIG. 22.

As described above, by the table catching-up processing shown in FIG. 22, the logs for the row block recorded during the reorganization processing are applied to the database after the reorganization processing.

Next, the index catching-up processing will be described.

Figure 29:
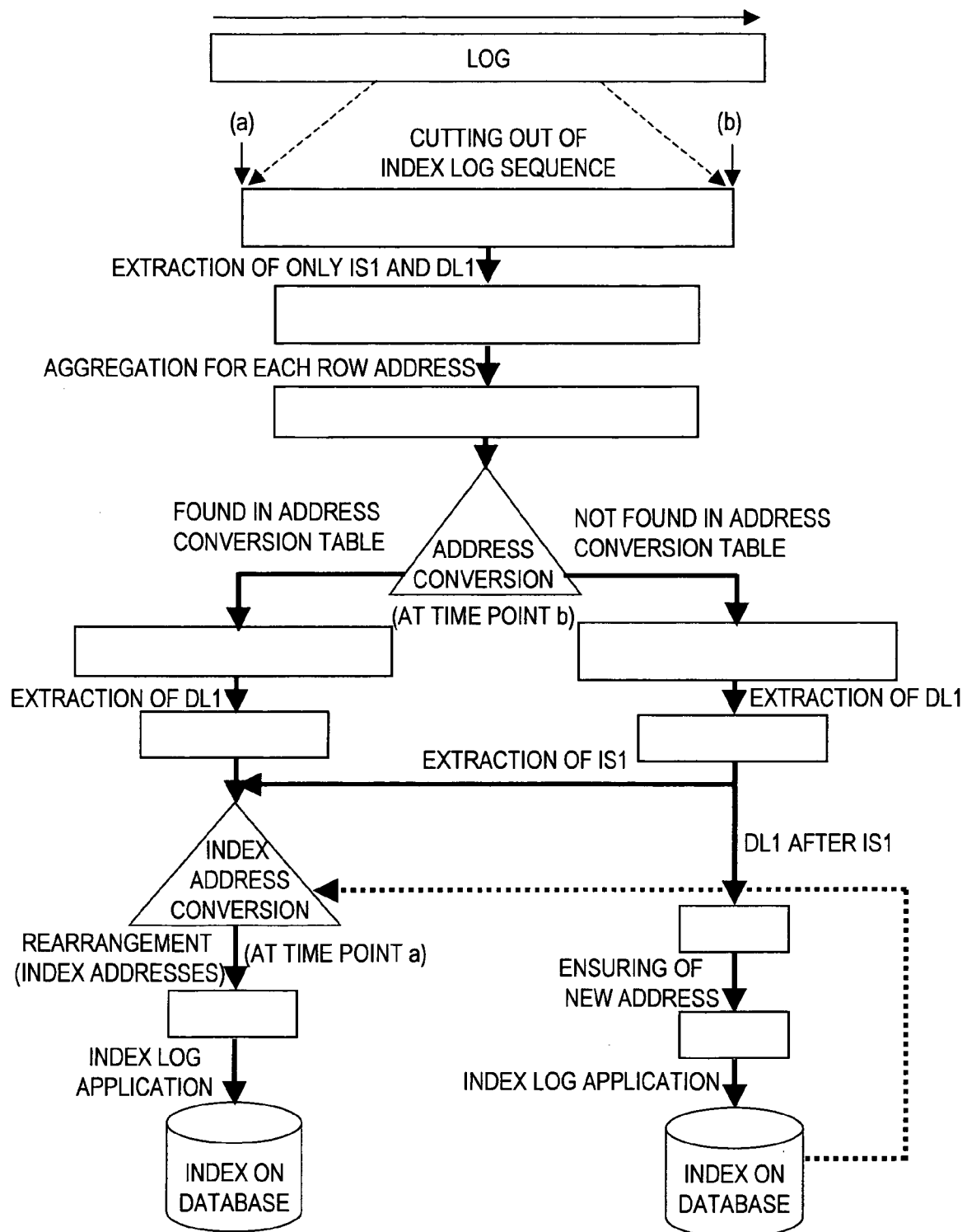
FIG. 29 is a flowchart showing the outline of an index catching-up processing according to the first embodiment of this invention.

FIG. 29 is a flowchart showing the outline of the index catching-up processing.

This processing is executed by the database reorganization processing unit 213.

First, index logs recorded during the reorganization processing are cut out and obtained from the logs stored in time series.

Logs recorded during the implementation of the index catching-up processing are required to be taken into consideration not only during the reorganization processing but also after the reorganization processing. In order to cope with it, conceivable methods include a method of performing another catching-up processing on a log recorded during a catching-up processing after the completion of the catching-up processing of the logs being reorganized, and a method of performing a catching-up processing in parallel on logs recorded during the catching-up processing of the logs being reorganized.

Next, IS1 (insertion) and DL1 (deletion) index logs are extracted from the cutout index logs.

Next, the extracted index logs are aggregated for each row address. More specifically, the index logs are aggregated for each of the row addresses indicated by the extracted index logs so as to be arranged in time series. Then, the index logs are converted into an index log for each row address. The conversion into the index log will be described below with reference to FIG. 32.

Then, it is determined whether or not the row address is recorded in the address conversion table 226.

When the row address is recorded in the address conversion table 226, a row address after the reorganization processing can be referred to from the row addresses contained in the index log by referring to the address conversion table 226. On the other hand, when the row address is not recorded in the address conversion table 226, the row address is inserted during the reorganization processing into an address of a row that was not present before the reorganization processing.

Whether the row address is recorded or not recorded on the address conversion table 226 can be determined by referring to the row address of the index log. For the row addresses recorded in the address conversion table 226, a row address with "DL1" as the earliest index log is extracted.

Next, the index address is converted based on the address conversion table 226.

In this case, when the index address is not converted, in other words, for the index address whose index entry is deleted during the reorganization processing, the index address cannot be converted and thus the index entry is deleted according to the index log.

First, when the index address is converted based on the address conversion table 226, the logs are rearranged in the order of index addresses. Then, the rearranged index logs are applied to the database.

On the other hand, for a row address which is not recorded in the address conversion table 226, a row address having IS1 as the earliest index log is extracted. When the earliest index log of the row address which is not recorded in the address conversion table 226 is IS1 and the latest index log is DL1, the index log is treated as a log recorded in the address conversion table 226. For this index log, a new row address area is inserted. This new row address is recorded in the address conversion table 226.

Figure 30A:
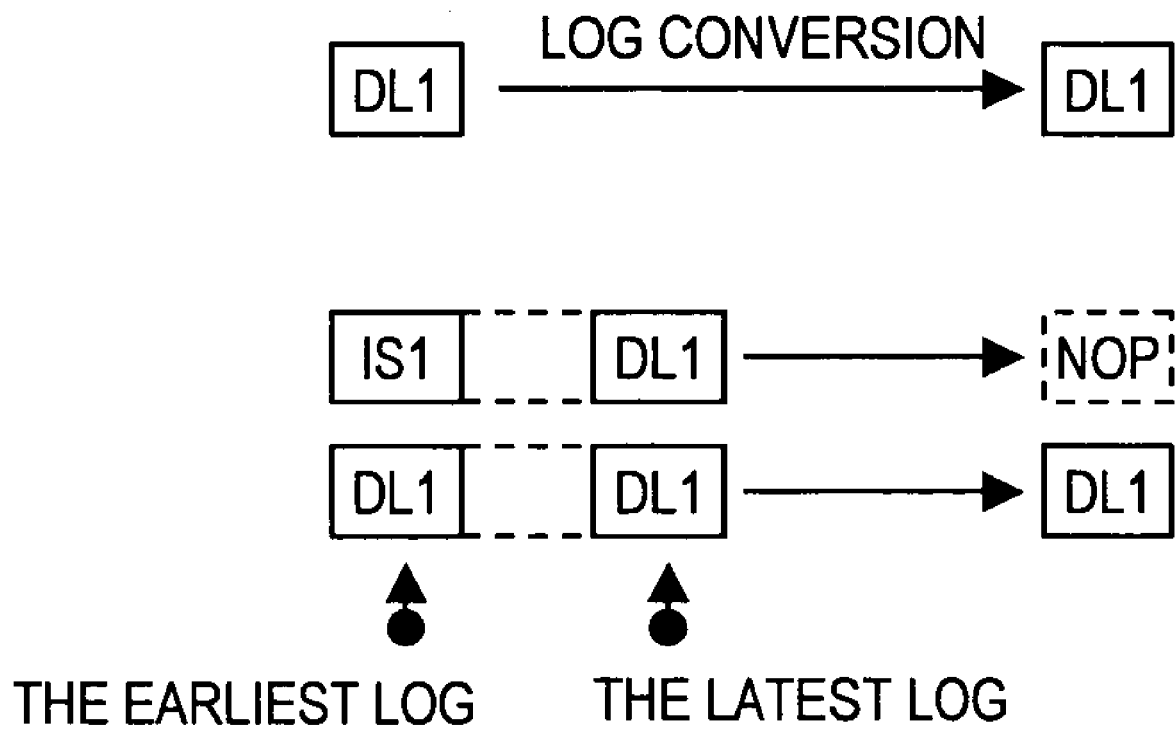
FIG. 30A is an explanatory view showing address conversion of an index log according to the first embodiment of this invention.
Figure 30B:
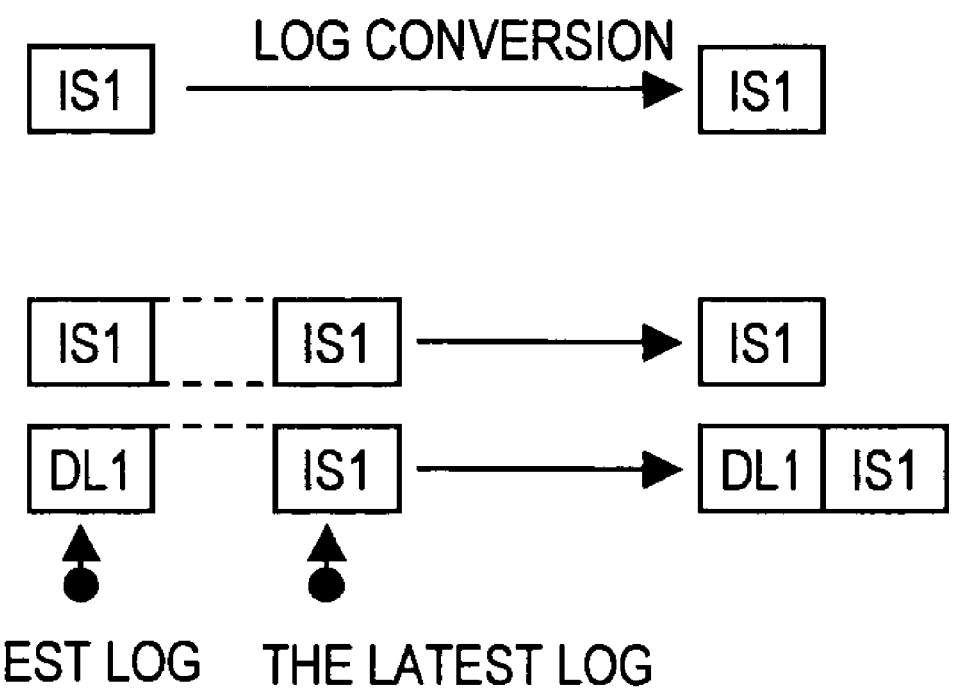
FIG. 30B is another explanatory view showing the address conversion of the index log according to the first embodiment of this invention.

FIGS. 30A and 30B are explanatory views of address conversion of the index log.

For the index log of an index address which was not present before the reorganization processing, a row address corresponding to the index address is converted based on the address conversion table 226, as shown in FIG. 30A.

In this case, when the operation performed on the row address is "DL1" alone, the log remains as a "DL1" log.

On the other hand, when a plurality of index logs are recorded for the same index address, only the earliest index log (the first recorded index log) and the latest index log (the final recorded index log) are obtained from the plurality of index logs so as to be subjected to the conversion processing.

When the earliest log is "IS1" and the latest log is "DL1", the operation on the index address is converted into "NOP" (No Operation). Actually, no operation is performed on the index address.

When the earliest log is "DL1" (deletion) and the latest log is "DL1", the operation on the row address is converted into single "DL1".

When the operation performed on the index entry of the index address that is already present in the database is "IS1" (insertion) alone, the index log remains as an "IS1" log without any change as shown in FIG. 30B.

On the other hand, when a plurality of index logs are recorded for the same index address, only the earliest index log (the first recorded index log) and the latest index log (the final recorded index log) are obtained from the plurality of index logs so as to be subjected to the conversion processing.

When the earliest log is "IS1" and the latest log is also "IS1", the operation on the row address is converted into single "IS1".

When the earliest log is "DL1" (deletion) and the latest log is "IS1", the operation on the row address is converted into two logs "DL1" and "IS1".

Figure 31:
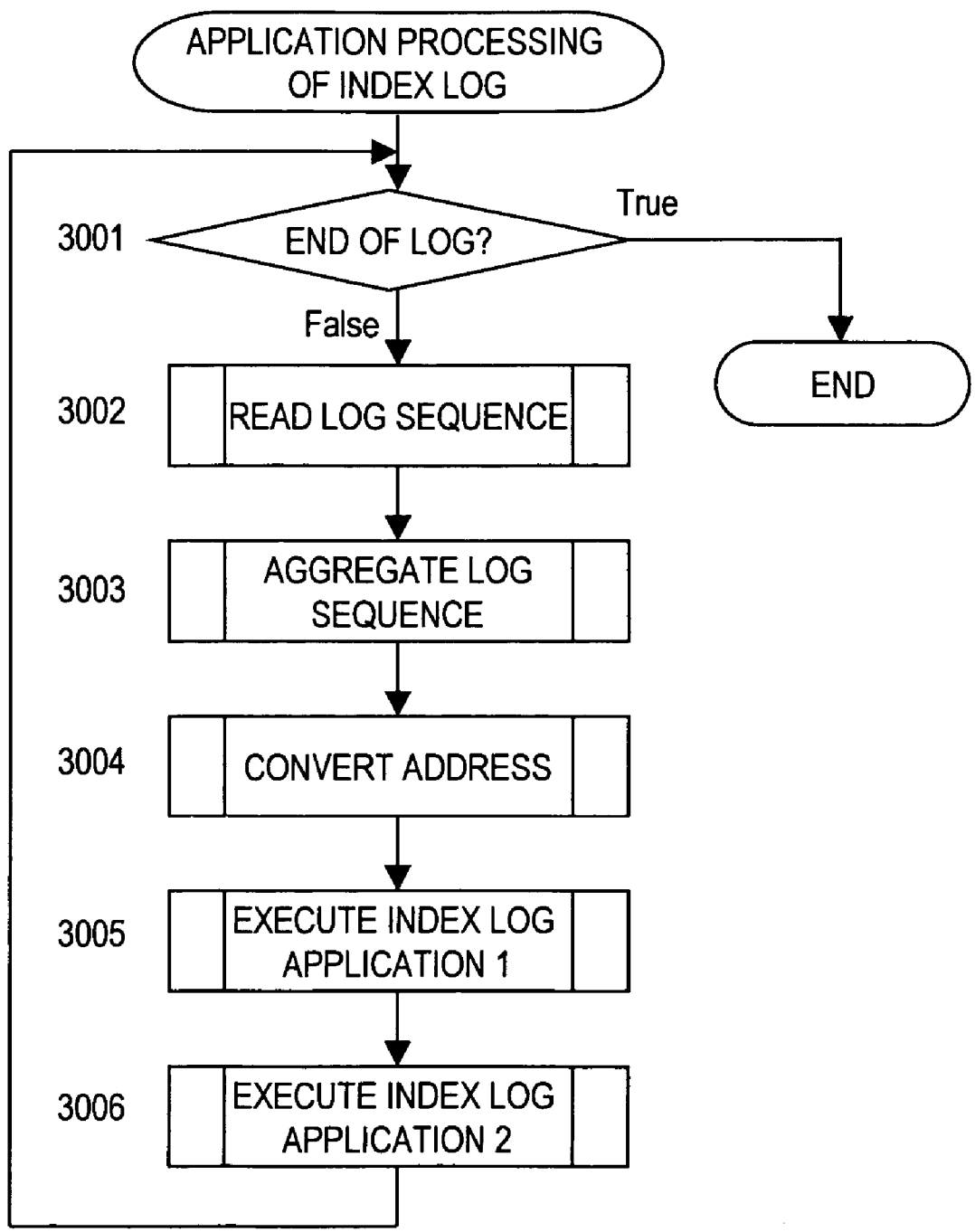
FIG. 31 is a flowchart showing the index catching-up processing according to the first embodiment of this invention.

FIG. 31 is a flowchart showing the index catching-up processing.

This processing is executed by the database reorganization processing unit 213.

First, it is determined whether or not the index logs are read to the end or not (step 3001).

When it is determined that the index logs are read to the end, the processing is terminated.

On the other hand, when it is determined that the index logs are not read to the end yet, a read processing of the index logs is implemented (step 3002). By this processing, necessary index logs are extracted from the log area 221 as a log sequence. The extracted log sequence is stored in a buffer E.

Next, an aggregation processing of the index log sequence stored in the buffer E is implemented (step 3003). By this processing, the index log sequence is converted into index log for each row address so as to be stored in a buffer F.

Next, an address conversion processing is performed (step 3004). By this processing, index logs recorded in the address conversion table 226 and index logs not recorded in the address conversion table 226 are distinguished from each other and stored in different buffers (buffers G and H), respectively. The buffers E to H are all preset on the memory 216.

Next, an index log application processing 1 for applying the index logs stored in the buffer G to the table of the database is implemented (step 3005).

Next, an index log application processing 2 for applying the index logs stored in the buffer H to the table of the database is implemented (step 3006).

The above-described processing is executed until the read operation of all the index logs is completed.

The steps 3005 and 3006 are not always required to be implemented in the order of processing shown in the flowchart. The processing may be sequentially started in each of the buffers G and H when the logs are stored in the buffers G and H.

The buffers E to H are provided for the memory 216 of the disk control device 210.

Figure 32:
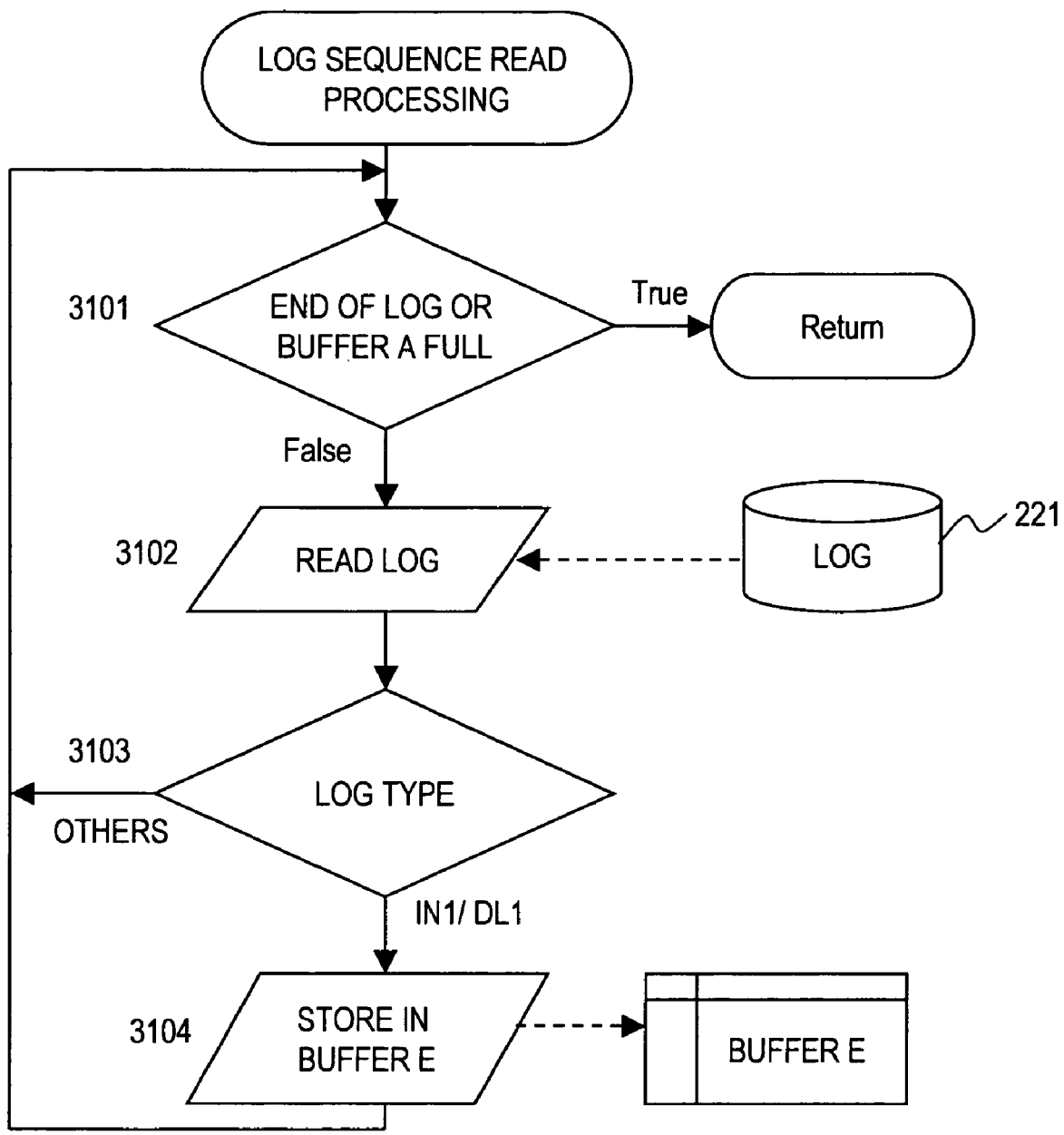
FIG. 32 is a flowchart showing an index log read processing according to the first embodiment of this invention.

FIG. 32 is a flowchart of the reading processing of the index log sequence in the step 3002 shown in FIG. 31.

This processing is executed by the database reorganization processing unit 213.

First, it is determined whether or not the index logs are read to the end or whether or not the index logs are stored to the upper capacity limit set for the buffer E so that the buffer E becomes full (step 3101).

When it is determined that the index logs are read to the end or the buffer E is full, the process returns to the flowchart shown in FIG. 31.

On the other hand, when it is determined that the index logs are not read to the end and the buffer E is not full yet, the logs being reorganized, which are recorded in the log area 221, are read (step 3102).

Next, the type of the read log is determined (step 3103). When the type of the read log is IN1 (insertion) or DL1 (deletion), the process proceeds to a step 3104 so that the log is stored in the buffer E.

On the other hand, when the type of the read log is not any of IN1 (insertion) and DL1 (deletion), the process returns to the step 3101 because the log is not required to be applied.

By the above-described log sequence read processing, the log necessary for the catching-up processing, in other words, the IS1 (insertion) and the DL1 (deletion) index log are extracted so as to be stored in the buffer E.

Figure 33:
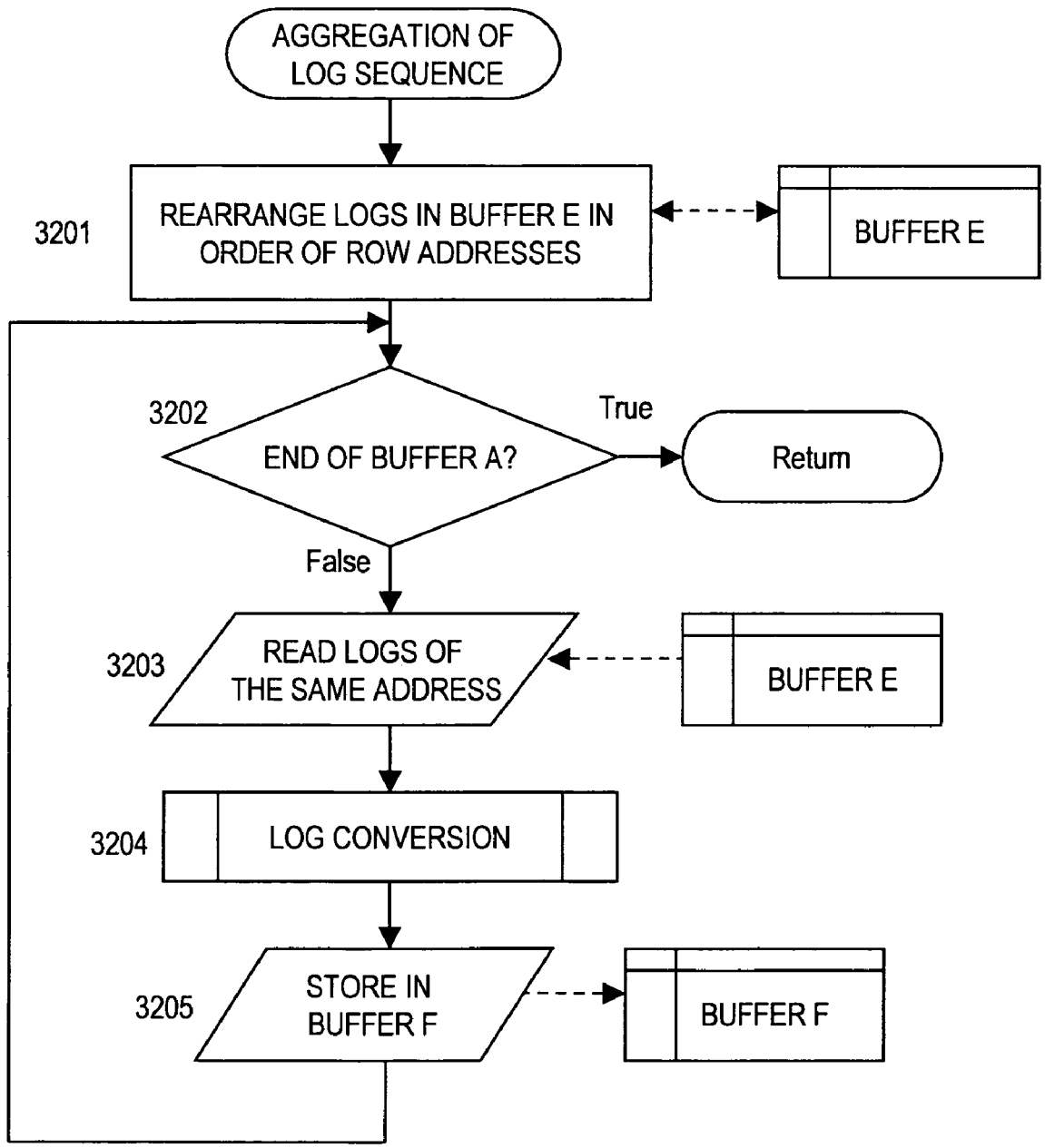
FIG. 33 is a flowchart showing an index log aggregation processing according to the first embodiment of this invention.

FIG. 33 is a flowchart of an aggregation processing of the index log sequence in the step 3003 shown in FIG. 31.

This processing is executed by the database reorganization processing unit 213.

As described above, after the extracted log sequence is aggregated for each row address, the index log is converted.

First, the index log sequence stored in the buffer E are rearranged in the order of the row addresses (step 3201).

Next, it is determined whether or not the rearranged index logs, which are stored in the buffer E, are read to the end (step 3101). When it is determined that the rearranged index logs are read to the end, the processing returns to the flowchart shown in FIG. 31.

When it is determined that the rearranged index logs are not read to the end yet, the index logs of the same row address are read from the buffer E (step 3203).

Next, the read index logs of the same row address are converted (step 3204). The processing will be described below with reference to FIG. 34. By this processing, the operation of the same row address is converted into an index log on the same row address basis.

Next, the index log obtained by the conversion is stored in the buffer F (step 3205). Then, the process returns to the step 3202 so as to process the next row address.

Figure 34:
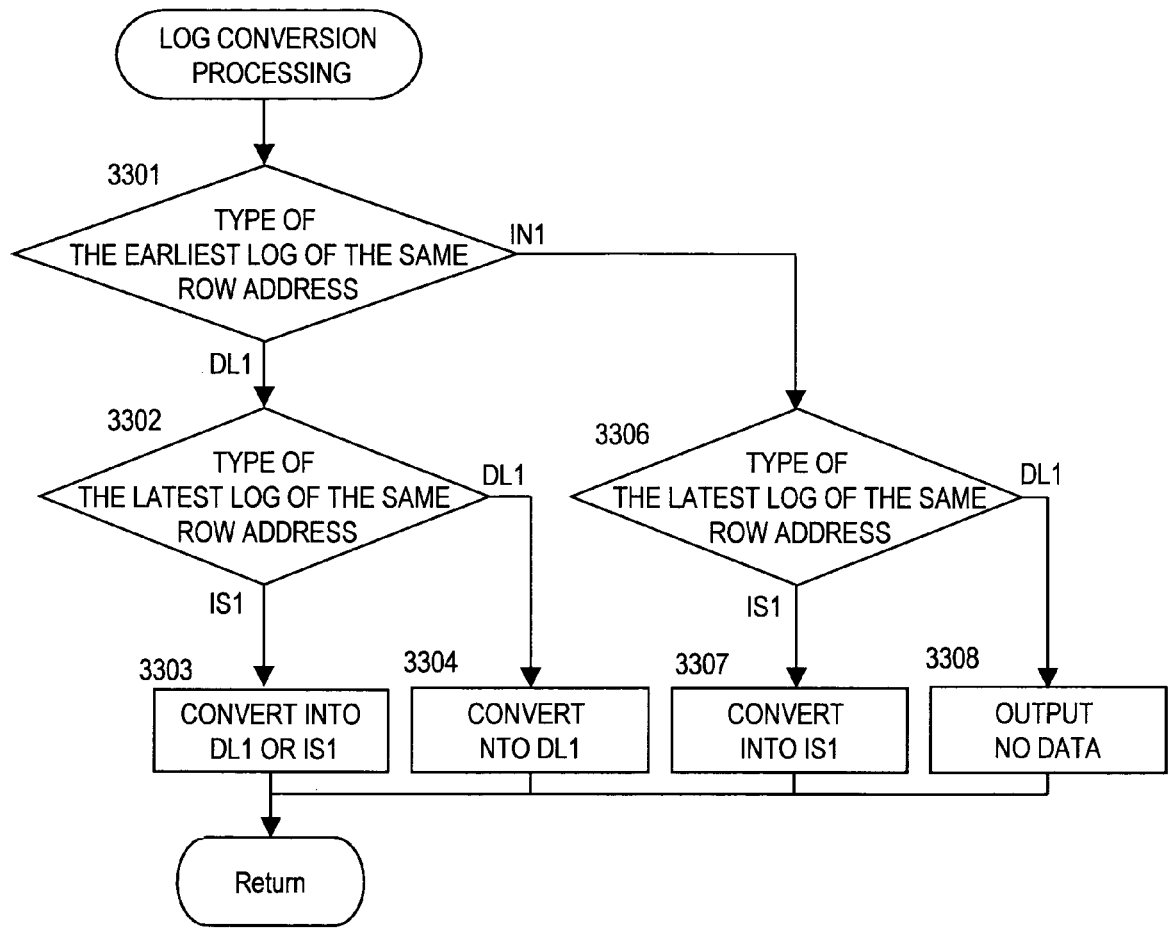
FIG. 34 is a flowchart showing index log conversion according to the first embodiment of this invention.

FIG. 34 is a flowchart of the index log conversion shown in FIG. 33.

This processing is executed by the database reorganization processing unit 213.

First, the type of the earliest index log among the index logs of the same row address is determined (step 3301). When it is determined that the type of the earliest index log is DL1, the process proceeds to a step 3302. When it is determined that the type of the earliest index log is IS1, the process proceeds to a step 3305.

In the step 3302, the type of the latest index log among the index logs of the same row address is determined. When it is determined that the type of the latest index log is IS1, the index logs of the row address are converted into DL1 or IS1 in a step 3303.

On the other hand, when it is determined that the type of the latest index log is DL1, the index logs to the row address are converted into DL1 in a step 3304.

Similarly, in the step 3305, the type of the latest index log among the index logs of the same row address is determined. When it is determined that the type of the latest index log is IS1, the index logs to the row address are converted into IS1 in a step 3306.

On the other hand, when it is determined that the type of the latest index log is DL1, the index logs to the row address are not output in a step 3307.

After the completion of the index log conversion, the process returns to the processing shown in FIG. 33.

Figure 35:
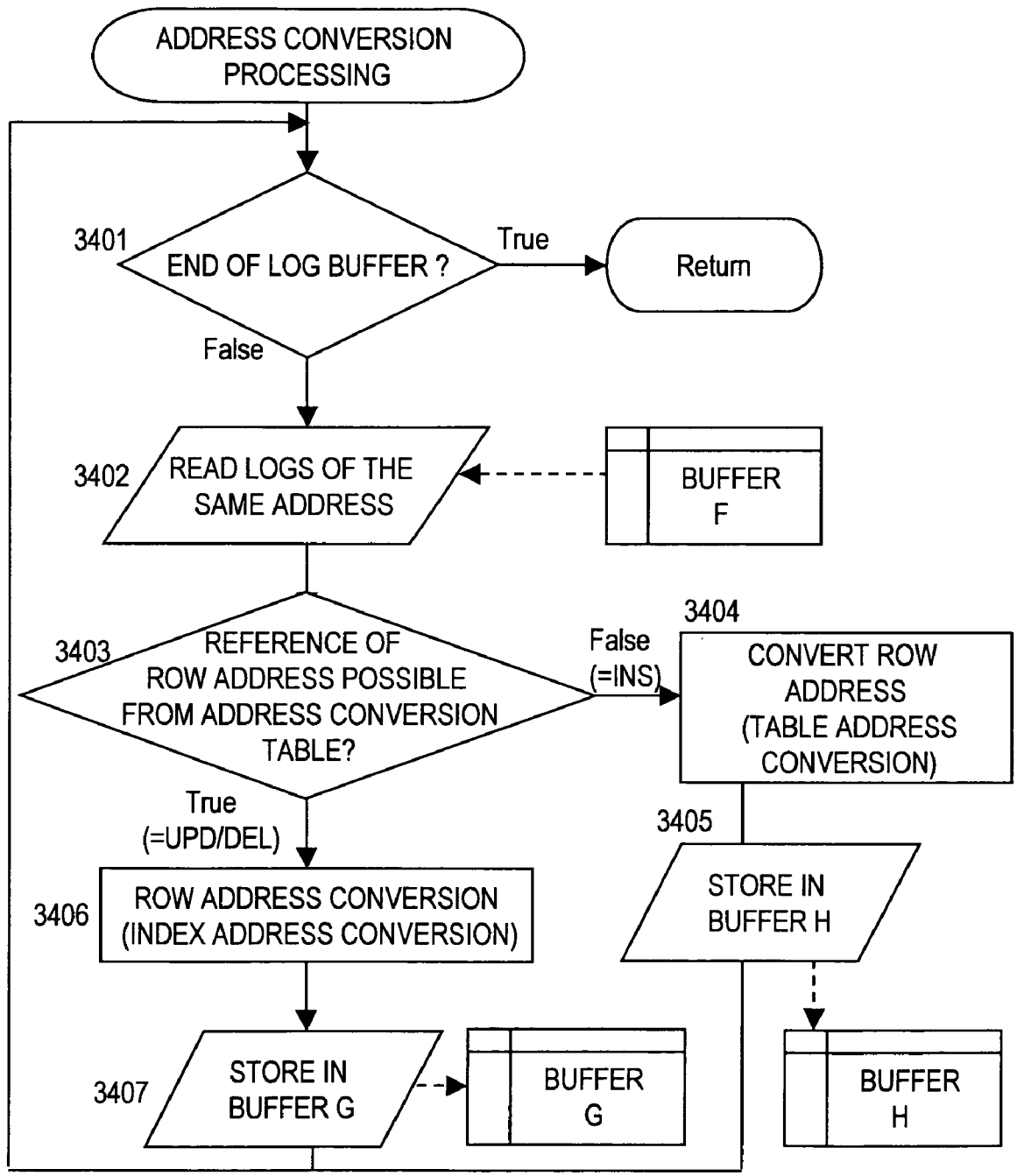
FIG. 35 is a flowchart showing an address conversion processing according to the first embodiment of this invention.

FIG. 35 is a flowchart showing the address conversion processing in the step 3004 in FIG. 31.

This processing is executed by the database reorganization processing unit 213.

First, it is determined whether or not the index logs stored in the buffer F are read to the end (step 3401). When it is determined that the index logs are read to the end, the process returns to the flowchart shown in FIG. 31.

When it is determined that the index logs are not read to the end yet, the index logs of the same row address are read from the buffer F (step 3402).

Next, it is determined whether or not a row address of the read index log is recorded in the address conversion table 226 so that the row address can be referred to from the address conversion table 226 (step 3403). When it is determined that the row address is not recorded in the address conversion table 226, the process proceeds to a step 3404.

In the step 2404, the index log is converted into a row address after conversion based on the address conversion table 226. The index log whose row address is converted is stored in a buffer H (step 3405)

On the other hand, when it is determined that the row address is recorded in the address conversion table 226, the process proceeds to a step 3406. In this step, an index address of the row index log is converted into an index address after conversion based on the address conversion table 226.

Then, the log whose row address is converted is stored in a buffer G (step 3407).

Figure 36:
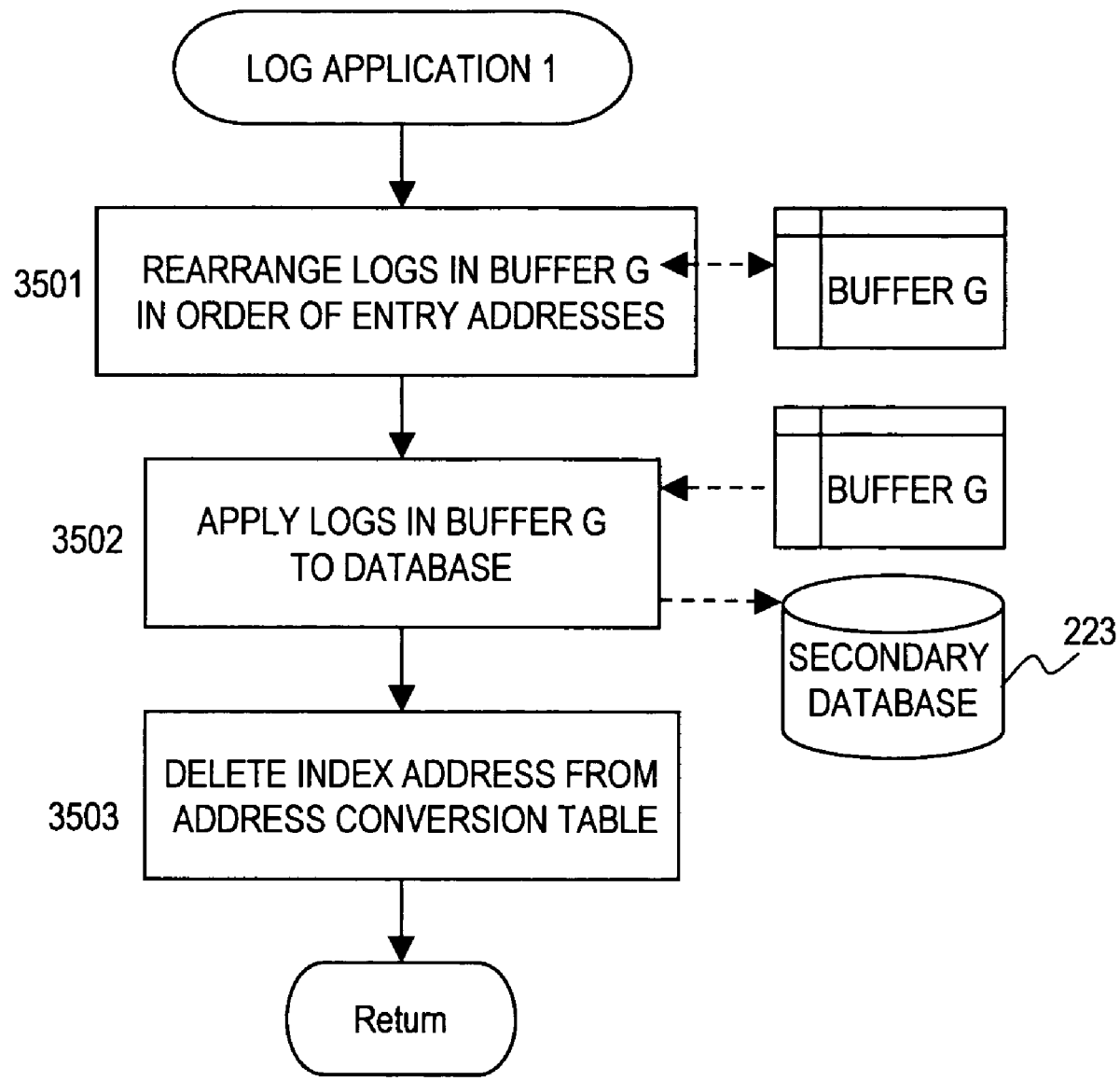
FIG. 36 is a flowchart showing an index log application processing 1 according to the first embodiment of this invention.

FIG. 36 is a flowchart of the index log application processing 1 in the step 3005 in FIG. 31.

This processing is executed by the database reorganization processing unit 213.

First, the index logs stored in the buffer G are rearranged in the order of index addresses (step 3501).

Next, the rearranged index logs are read so as to be applied to the database in the disk drive 220 (step 3502). More specifically, the contents of the index logs are applied to the index entries of the index addresses indicated by the read index logs.

For an index log indicating DL1 (deletion), the index address indicated by the index log is deleted from the address conversion table 226 (step 3503).

After the completion of the index log application processing 1, the process returns to the processing shown in FIG. 31.

Upon application of the logs, the logs may be separated for each of the magnetic disk drives of the disk drive 220 so as to perform a parallel processing for each of the magnetic disk drives, thereby increasing the speed of the log application processing.

Figure 37:
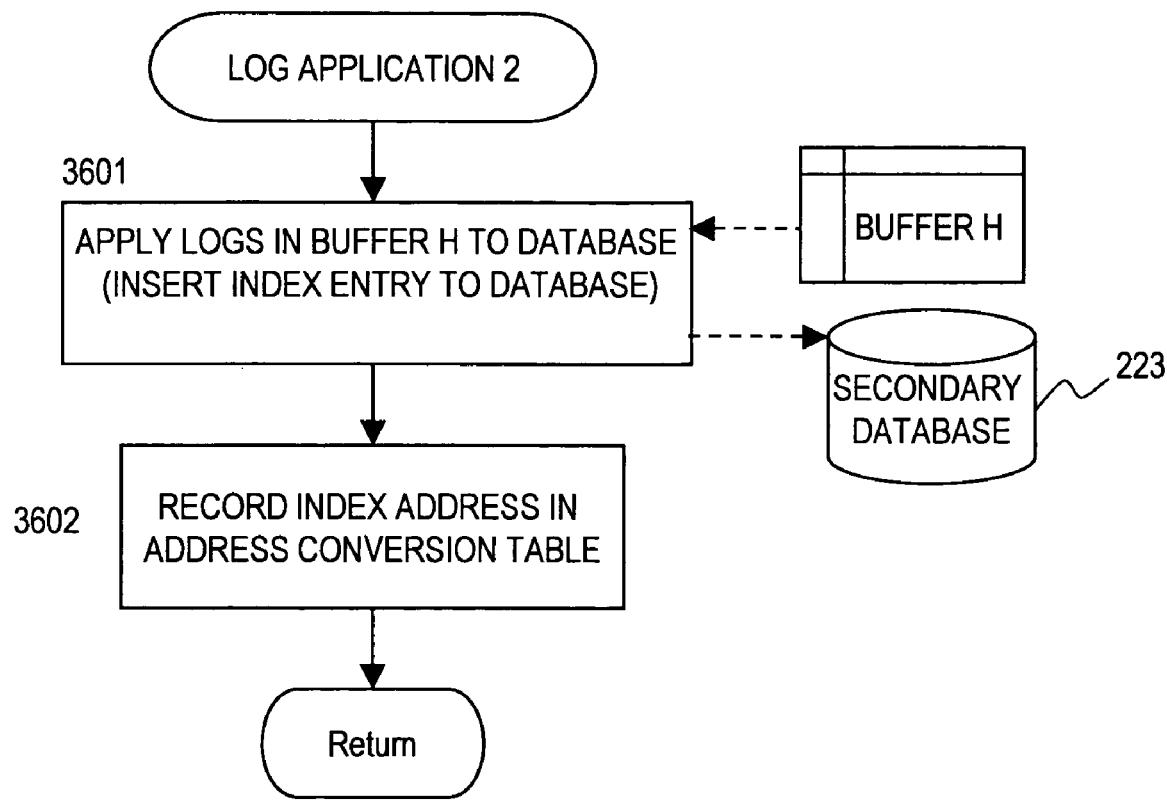
FIG. 37 is a flowchart showing an index log application processing 2 according to the first embodiment of this invention.

FIG. 37 is a flowchart of the index log application processing 2 in the step 3006 shown in FIG. 31.

This processing is executed by the database reorganization processing unit 213.

First, the index logs stored in the buffer H are read so as to be applied to the database in the disk drive 220 (step 3602). More specifically, for an index address indicated by the read index log, an area of the index entry is inserted based on the contents of the index log. Based on the index log, the contents are applied.

Next, the index address to which the index entry is inserted is registered on the address conversion table 226 (step 3602).

After the completion of the index log application processing 2, the process returns to the processing shown in FIG. 31.

In this manner, by the index catching-up processing (FIG. 31), the index logs in the database during the reorganization processing are applied to the reorganized LU.

As described above, in the database system according to this embodiment of this invention, the reorganization processing unit 213 is provided for the storage system 200 so that the storage system 200 can selectively perform the partial reorganization and the total reorganization of the database in response to an instruction from the host computer 100.

In the partial reorganization, the partial reorganization is executed for the extents 20 with the filling rate (density) equal to or lower than the threshold value Th1. As a result, an area required to be reorganized can be precisely detected so that the reorganization processing is executed only for the area required to be reorganized. When the element specifying the reorganization target is the I/O cost, the partial reorganization is executed only for the leaf blocks 42 having a large discontinuous space with a large I/O cost among all the leaf blocks 42. As a result, database responsiveness can be ensured.

As a result, as compared with the total reorganization, the database can be optimized in an extremely short time so as to improve the database responsiveness and to reduce the use of the storage area in an effective manner. In particular, if this invention is applied to a recent large-scale database, the database can be efficiently reorganized in a short time by executing the partial reorganization according to this invention while operating the primary database 222 without stop. Accordingly, it can be ensured that the database performance can be prevented from being degraded. Moreover, since an administrator is not required to examine an area (or a range) to be reorganized, the efforts for database operation can be remarkably reduced.

Although the partial reorganization is performed by using the extent 20 as a unit area of the reorganization in the partial reorganization based on the filling rate in the above-described first embodiment, the partial reorganization may also be implemented using the table data block 30 as a unit area of the reorganization.

Although the full block rate corresponding to a ratio of an actual amount of data to a total amount of data in the extent 20 is used as the filling rate obtained by: the filling rate=the number of full data blocks/a total number of data blocks in the extent 20, in the above-described first embodiment, the filling rate obtained by: the filling rate=a ratio of a free area in the table data block 30 (a rate of a free area in the data block) or the filling rate=a ratio of the number of free data blocks to a total number of data blocks in the extent 20 (a free block ratio) or the like can also be used. When the free area rate in the data block or the free block rate described above is used, it is only necessary that the threshold value Th1 and determination conditions are changed so as to execute the partial reorganization when the ratio exceeds the threshold value Th1.

A space efficiency of the data area is improved in the order of the free block rate, the free area rate in the data block, and the full block ratio, which have been described above. When the free block rate is used, there is a possibility that a free block that cannot accept even one row of data is generated if the reorganization is executed in the extent 20 corresponding to the assembly of the table data blocks 30. When the free area rate in the data block is used, the free area ratio is obtained by garbage collection in the data block. Therefore, overhead for searching the available space in the extent 20 becomes high in some cases. Accordingly, the space efficiency of the data area 1 is improved in the above-described order.

Second Embodiment

Figure 38:
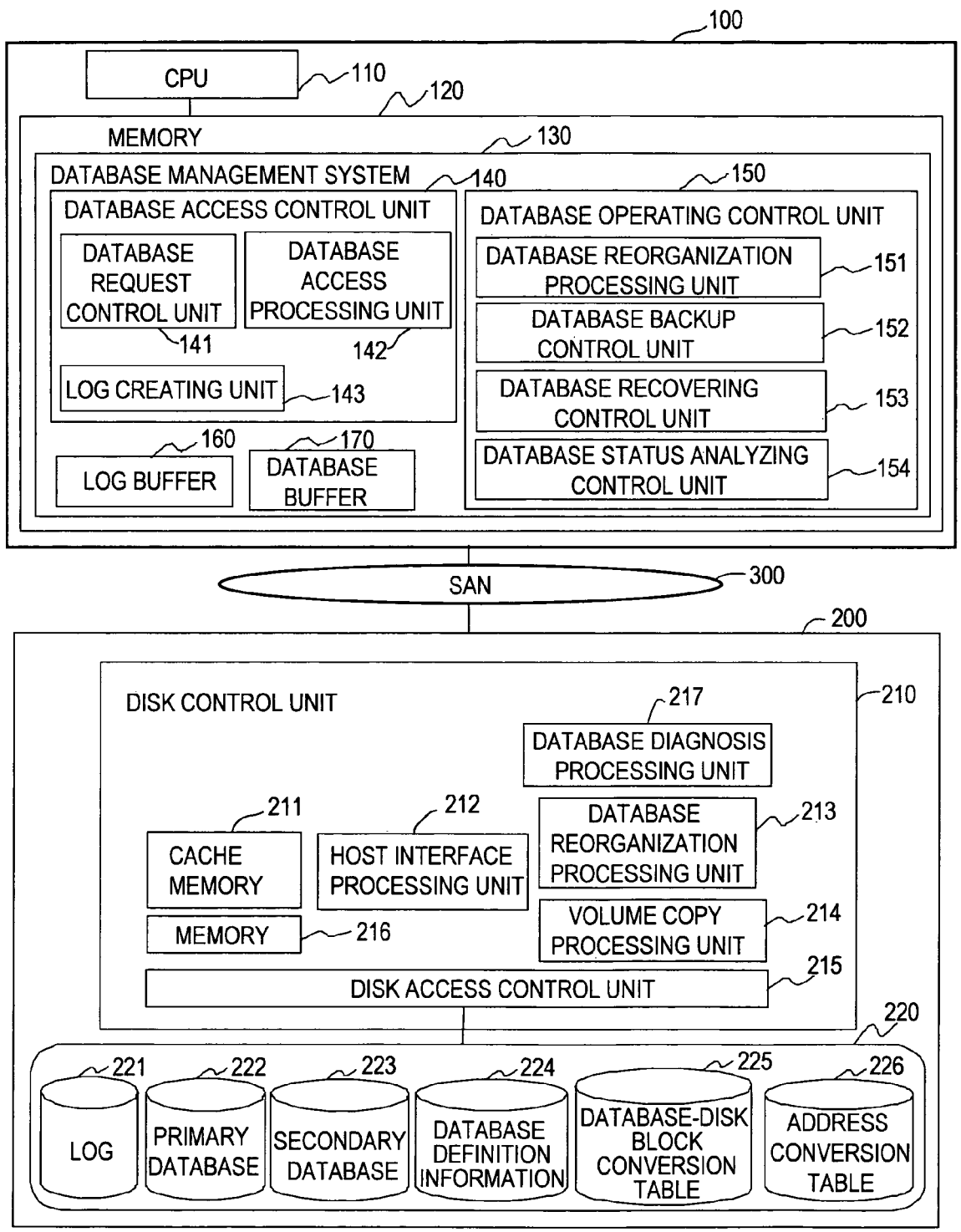
FIG. 38 is a block diagram showing a database system according to a second embodiment of this invention.

FIG. 38 shows a second embodiment where a database diagnosis processing unit 217 for the diagnosis of necessity of database reorganization is provided for the disk control unit 210 of the storage system 200. The other configuration is the same as that in the first embodiment.

In the above-described first embodiment, the database reorganization processing unit 213 implements the reorganization processing in response to an instruction from the host computer 100. On the other hand, in this second embodiment, the database diagnosis processing unit 217 provided for the storage system 200 monitors a status of the database (the primary database 222 or the secondary database 223). When a predetermined condition is established, the database diagnosis processing unit 217 instructs the database reorganization processing unit 213 to execute the partial reorganization so that the storage system 200 autonomously implements the partial reorganization.

The database diagnosis processing unit 217 monitors the database in predetermined cycles. When the occurrence of local fragment is supposed, for example, updated row data exceeds a predetermined rate (for example, 20%) or deleted row data exceeds a predetermined rate of the index entries (for example, 20%), the database diagnosis processing unit 217 issues a command of the partial reorganization to the database reorganization processing unit 213.

The database reorganization processing unit 213 executes at least one of the partial reorganization based on the filling rate in the steps 1512 through 1517 shown in FIG. 13 above and the partial reorganization based on the I/O cost in the steps 1518 through 1526. When only any one of the partial reorganization is executed, the partial reorganization based on the filling rate for reducing a sparse space is preferred.

In the above-described manner, the partial reorganization is automatically executed without any instruction of the reorganization from an administrator or the like. As a result, the fragment in the database space is always kept to the minimum so as to ensure the database responsiveness and to reduce the use of the storage area in an automatic manner. Accordingly, the efforts or cost required for database management can be remarkably reduced.

In the structure shown in FIG. 1, like the above-described database diagnosis processing unit 217, the database status analyzing control unit 154 may monitor the database in predetermined cycles. When the database gets into the state where the occurrence of local fragment is supposed as described above, the database status analyzing control unit 154 may issue a command of the implementation of partial reorganization to the database reorganization control unit 151. Even in this case, the partial reorganization of the database can be autonomously implemented without any intervention of an administrator.

While the present invention has been described in detail and pictorially in the accompanying drawings, the present invention is not limited to such detail but covers various obvious modifications and equivalent arrangements, which fall within the purview of the appended claims.

What is claimed is:

1. A reorganization method of a database stored in a disk drive controlled by a computer, the disk drive comprising: a first volume that stores the database; and a second volume that forms a pair with the first volume to store a replication of the database, the method comprising the steps of:

acquiescing a transaction of the database by the computer;

splitting the pair formed of the first volume and the second volume, and making settings to allow an access only to the database stored in the first volume;

releasing the transaction from the quiescent state;

specifying a sparse space in the database in the second volume, wherein the database in the second volume includes sparse space areas and dense space areas, by selecting from the database in the second volume a leaf block having high discontinuity caused with a plurality of the sparse space areas and dense space areas;

partially reorganizing only the specified sparse space in the second volume and not reorganizing the dense space in the second volume, the reorganizing being executed by storing the same data block of the database in physically continuous areas; and copying the contents of the partially reorganized second volume to the first volume such that the first volume and the second volume are resynchronized and form the pair again, wherein the step of specifying the sparse space distinguishes the sparse space from the dense space in the database in the second volume and includes the step of determining whether the sparse space will be identified by whether a filling rate of unit areas of the second volume is equal to or less than a predetermined threshold or identified by the I/O cost of reading and writing data from and to leaf blocks of the second volume, wherein, if it is determined that the step of specifying the sparse space will be identified by the I/O cost, the step of specifying the sparse space further comprises the steps of:

calculating a value indicating discontinuity for each unit area to be reconfigured as to an index area in the database; and specifying the unit area as a target area of partial reorganization when the value indicating the discontinuity exceeds a predetermined rate, the step of calculating the value indicating the discontinuity calculates a value that indicates a distance between physical locations of adjacent key values on the second volume among key values comprising a reorganization unit area in the index area, the step of specifying the unit area as the target area of the partial reorganization specifies the unit area as a target area of partial reorganization when the distance exceeds a predetermined threshold value, and if it is determined that the step of specifying the sparse space will be identified by the filling rate of the unit areas of the second volume, the step of specifying sparse space further comprises the steps of:

determining whether or not the filling rate of each unit area in the second volume is equal to or smaller than the predetermined threshold; and if the filling rate of a unit area is less than or equal to the predetermined threshold, adding the unit area to a target extent list to be partially reorganized.

2. The reorganization method of the database according to claim 1, further comprising the step of monitoring the database in any of the first volume and the second volume in predetermined cycles, wherein the step of quiescing the transaction is started to execute partial reorganization of the database when the database gets into a predetermined state.

3. The reorganization method of the database according to claim 1, wherein:

the disk drive comprises a third volume that stores a log generated through the access to the database and a fourth volume capable of storing a replication of the contents of the database stored in the second volume; and the step of partially reorganizing the second volume comprises the steps of:

logically copying the specified sparse space in the database stored in the second volume to the fourth volume;

initializing the specified sparse space in the second volume to which the copy is completed;

physically copying the contents of the database stored in the fourth volume to the second volume; and obtaining a log after the quiescence of the transaction from the third volume and applying the log to the database stored in the second volume.

4. A database system comprising:

a database accessed from a host computer; and a storage system comprising a disk drive including a first volume that stores the database and a second volume that forms a pair with the first volume to store a replication of the database, wherein:

the host computer comprises a database reorganization control unit that controls reorganization of the database, the storage system comprises:

a host interface that receives a control signal from the host computer; and a database reorganization processing unit that reorganizes the database stored in the disk drive in response to a command from the database reorganization control unit; and the database reorganization processing unit comprises:

a partial reorganization target specifying unit that specifies a sparse space in the database stored in the second volume, wherein the database in the second volume includes sparse space areas and dense space areas, by selecting from the database in the second volume a leaf block having high discontinuity caused with a plurality of the sparse space areas and dense space areas;

a partial reorganization executing unit that partially reorganizes only the specified sparse space in the second volume and that does not reorganize the dense space in the second volume, the reorganizing being executed by storing the same data block of the database in physically continuous areas; and a resynchronizing unit that copies the contents of the partially reorganized second volume to the first volume such that the first volume and the second volume is resynchronized and form the pair again, wherein the partial reorganization target specifying unit includes means for distinguishing the sparse space from the dense space in the database in the second volume, including means for determining whether the sparse space will be identified by whether a filling rate of unit areas of the second volume is equal to or less than a predetermined threshold or identified by the I/O cost of reading and writing data from and to leaf blocks of the second volume, wherein reorganization target specifying unit comprises an I/O cost calculating unit that, if it is determined that the sparse space will be identified by the I/O cost, calculates a value indicating discontinuity for each unit area to be reconfigured as to an index area in the database, and the unit area is specified as a target area of partial reorganization when the value indicating discontinuity exceeds a predetermined value; and wherein the I/O cost calculating unit calculates a value indicating a distance between physical locations of adjacent key values on the second volume among key values constituting the reorganization unit area of the index area, and if it is determined by the partial reorganization target specifying unit that the sparse space will be identified by the filling rate of the unit areas of the second volume, the partial reorganization target specifying unit includes means for specifying the sparse space including means for determining whether or not the filling rate of each unit area in the second volume is equal to or smaller than the predetermined threshold; and means for adding the unit area to a target extent list to be partially reorganized if the filling rate of a unit area is less than or equal to the predetermined threshold.

5. The database system according to claim 4, wherein:
the storage system comprises a diagnosis processing unit that monitors the database in any of the first volume and the second volume in predetermined cycles; and
the diagnosis processing unit causes, when the database gets into a predetermined state, the database reorganization processing unit to start partial reorganization of the database.

6. The database system according to claim 5, wherein:
the host computer comprises an operating control unit that controls an operation of the database;
the operating control unit quiesces a transaction of the host computer;
the operating control unit splits the pair of the volumes;
the operating control unit makes settings to allow an access to be made only to the database stored in the first volume;
the operating control unit releases the transaction from the quiescent state; and
the operating control unit instructs the database reorganization control unit to start the reorganization.

7. The database system according to claim 4, wherein:
the host computer comprises a status analyzing control unit that monitors the database in any of the first volume and the second volume in predetermined cycles; and
the status analyzing control unit causes, when the database gets into a predetermined state, the database reorganization processing unit to start partial reorganization of the database.

8. The database system according to claim 4, wherein:
the disk drive comprises a third volume that stores a log generated through an access to the database and a fourth volume capable of storing a replication of the contents of the database stored in the second volume;
the database reorganization processing unit logically copies the specified sparse space in the database stored in the second volume to the fourth volume;
the database reorganization processing unit initializes the specified sparse space in the second volume to which the copy is completed;
the database reorganization processing unit physically copies the contents of the database stored in the fourth volume to the second volume; and
the database reorganization processing unit obtains a log of the transaction during the reorganization from the third volume and applies the obtained log to the database stored in the second volume.

* * * * *